US012749587B2

(12) United States Patent
Perry et al.

(10) Patent No.: US 12,749,587 B2
(45) Date of Patent: Sep. 29, 2026

(54) NUCLEAR MODULAR ISOLATED REACTOR SUPPORT SYSTEM ASSEMBLY AND MODULES

(71) Applicant: GE-Hitachi Nuclear Energy Americas LLC, Wilmington, NC (US)

(72) Inventors: Jay Allen Perry, Westpoint, TN (US); Edward Sang Koon Han, Leland, NC (US); John W. Holbrook, II, Wilmington, NC (US); Nathan John Presley, Cookeville, TN (US); Tobias E. Greider, Virginia Beach, VA (US); Daniel LeRoy Pierce, Hampstead, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 617 days.

(21) Appl. No.: 18/178,883

(22) Filed: Mar. 6, 2023

(65) Prior Publication Data

US 2024/0304345 A1 Sep. 12, 2024

(51) Int. Cl.
*G21C 9/04* (2006.01)
*G21C 15/12* (2006.01)
(Continued)

(52) U.S. Cl.
CPC ............... *G21C 9/04* (2013.01); *G21C 15/12* (2013.01); *E04H 9/021* (2013.01); *G21C 13/024* (2013.01)

(58) Field of Classification Search
CPC ........ G21C 9/04; G21C 15/12; G21C 13/024; E04H 9/021
See application file for complete search history.

(56) References Cited

U.S. PATENT DOCUMENTS 3,255,085 A * 6/1966 Clifford ................. G21C 11/02 976/DIG. 26
4,678,623 A * 7/1987 Malandra ............... G21C 15/02 976/DIG. 188
(Continued)

FOREIGN PATENT DOCUMENTS

FR 2915618 A1 * 10/2008 ........... G21C 13/024
JP S62-187289 A 8/1987
(Continued)

OTHER PUBLICATIONS

Gockek, Omer et al., "Seismic risk reduction through seismic isolation," ANP'92 international conference on design and safety of advanced nuclear power plants, 1992, 6 pages.
(Continued)

*Primary Examiner* — Lily C Garner
(74) *Attorney, Agent, or Firm* — Harness, Dickey & Pierce, P.L.C.

(57) ABSTRACT

A reactor support assembly for a nuclear plant includes a cylindrical reactor support structure configured to structurally support a reactor enclosure system on seismic isolators, a collector cylinder configured to at least partially define a riser annulus between the collector cylinder and the reactor enclosure system, a divider wall configured to at least partially define a downcomer annulus between the divider wall and a reactor building, exhaust ducts extending from the collector cylinder and through an interior of the cylindrical reactor support structure. The reactor support assembly is configured to structurally support the reactor enclosure system such that the reactor support assembly and the reactor enclosure system at least partially define a floor structure configured to move independently of an upper building structure that encloses a head access area (HAA) above the floor structure such that the floor structure is
(Continued)

seismically isolated in relation to the upper building structure.

30 Claims, 47 Drawing Sheets

(51) Int. Cl.
*E04H 9/02* (2006.01)
*G21C 13/024* (2006.01)

(56) References Cited

U.S. PATENT DOCUMENTS

| | | | | |
|---|---|---|---|---|
| 4,959,193 A * | 9/1990 | Hunsbedt | G21C 15/18 376/293 |
| 5,043,135 A * | 8/1991 | Hunsbedt | G21C 15/18 376/299 |
| 5,043,136 A * | 8/1991 | Hunsbedt | G21C 15/18 376/293 |
| 5,158,741 A * | 10/1992 | Boardman | G21C 15/18 376/403 |
| 5,190,720 A * | 3/1993 | Hunsbedt | G21C 13/024 376/290 |
| 5,223,210 A * | 6/1993 | Hunsbedt | G21C 15/18 376/293 |
| 5,406,602 A * | 4/1995 | Hunsbedt | G21C 15/18 376/293 |
| 5,499,277 A * | 3/1996 | Hunsbedt | G21C 15/18 376/290 |
| 5,610,962 A * | 3/1997 | Solorzano | G21C 13/024 376/285 |
| 6,160,864 A * | 12/2000 | Gou | G21C 13/024 376/293 |
| 8,036,335 B2 * | 10/2011 | Kasahara | G21C 13/02 376/277 |
| RE48,014 E * | 5/2020 | Hamilton | H05K 9/0081 |
| 10,937,557 B2 * | 3/2021 | Sineath | G21C 15/26 |
| 11,380,450 B2 * | 7/2022 | Sineath | G21C 15/18 |
| 2019/0115114 A1 * | 4/2019 | Sineath | G21C 15/02 |
| 2020/0027594 A1 * | 1/2020 | Hunt | G21C 15/243 |

FOREIGN PATENT DOCUMENTS

| | | |
|---|---|---|
| JP | 2006-342934 A | 12/2006 |
| JP | 2019-074531 A | 5/2019 |

OTHER PUBLICATIONS

Berglund, R. C. et al., "PRISM: Inherently safe and economic reactor," May 29, 1987, 23 pages.

Gluekler, Emil L., "US advanced liquid metal reactor (ALMR)," Progress in Nuclear Energy, vol. 31, No. 1-2, 1997, p. 43-61.

General Electric. GEFR-00793, "PRISM Preliminary Safety Information Document, vol. I, Chapters 1-4," Dec. 1987, 406 pages.

General Electric. GEFR-00793, "PRISM Preliminary Safety Information Document, vol. II, Chapters 5-8," Dec. 1987, 459 pages.

General Electric. GEFR-00793, "PRISM Preliminary Safety Information Document, vol. III, Chapters 9-14," Dec. 1987, 520 pages.

General Electric. GEFR-00793, "PRISM Preliminary Safety Information Document, vol. IV, Chapters 15-17 and Appendices A-E," Dec. 1987, 525 pages.

General Electric. GEFR-00793, "PRISM Preliminary Safety Information Document, vol. V, Appendix F," Jun. 1988, 446 pages.

General Electric. GEFR-00793, "PRISM Preliminary Safety Information Document, vol. VI, Appendix G," May 1993, 547 pages.

Nathan, Stuart, "Metal Foam Provides Lightweight Radiation Shielding," The Engineer, Jul. 22, 2015, https://www.theengineer.co.uk/content/news/metal-foam-provides-lightweight-radiation-shielding/, 7 pages (last visited Mar. 15, 2023).

Shimazu, Yukihide et al., "Tungsten balls charge method radiation shield system," 2009 ISOE Asian ALARA Symposium, Sep. 8-9, 2009, available at https://www.nsra.or.jp/isoe/english/alarasymposium/pdf/atc2009-4-3ga.pdf (last visited Mar. 15, 2023).

Alexnd—Super Light Silica Aerogel Sound Insulation Cotton Hydrophobic Mat Material, https://alexnld.com/product/1pc-25x35cm-3mm-6mm-10mm-super-light-silica-aerogel-sound-insulation-cotton-hydrophobic-mat-material/ (last visited Mar. 15, 2023).

Morgan Advanced Materials—Inorganic Board Product Data Sheet, available at https://www.morganthermalceramics.com/media/2939/inorganic-i-boards_eng.pdf, Oct. 2, 2020 (last visited Mar. 15, 2023).

Morgan Advanced Materials—BTU-BLOCK Board, available at https://www.lynnmfg.com/wp-content/uploads/data/DATA-TC-614-100.pdf (last visited Mar. 15, 2023).

Morgan Advanced Materials—WDS Ultra Plus Board Product Data Sheet, available at https://www.morganthermalceramics.com/media/7564/wdsultraplusboard_eng.pdf, Sep. 30, 2021 (last visited Mar. 15, 2023).

Boyd—Thermal Insulation and Shielding Materials, https://www.boydcorp.com/engineered-materials/insulation-shielding/thermal-insulation-shielding.html (last visited Mar. 15, 2023).

Thermal Ceramics, BTU-Block Board 1807/18, May 2000.

International Search Report and Written Opinion thereof dated May 13, 2024 for corresponding International Application No. PCT/US2024/018344.

International Preliminary Report on Patentability issued Sep. 9, 2025 for corresponding International Application No. PCT/US2024/018344.

* cited by examiner

NUCLEAR MODULAR ISOLATED REACTOR SUPPORT SYSTEM ASSEMBLY AND MODULES

GOVERNMENT SUPPORT

This invention was made with government support under contract number DE-NE0009054, awarded by the U.S. Department of Energy. The government has certain rights in the invention.

BACKGROUND

Field

Example embodiments described herein relate in general to nuclear reactors and in particular to providing seismic isolation and integrated passive cooling of a nuclear reactor.

Description of Related Art

In some nuclear plants, a nuclear reactor, located within a reactor enclosure system, is located within a reactor building that structurally supports the reactor enclosure system on a foundation. The reactor building may include one or more building structures that collectively structurally support and enclose the reactor enclosure system, for example providing containment of the nuclear reactor.

In some nuclear plants, at least a portion (or all) of the reactor building (e.g., a reactor building superstructure) is at least partially seismically isolated by one or more seismic isolators, which may at least partially protect the reactor enclosure system, and the nuclear reactor enclosed therein, from damage due to a seismic event (e.g., an earthquake) at the nuclear plant. The reactor building structure(s) that structurally supports the reactor enclosure system on the one or more seismic isolators may comprise a reinforced concrete structure. As a result, the structural load on the seismic isolators by such building structures may be relatively high. Additionally, the construction of such seismically isolated structures may include fabricating a steel reinforcement structure, positioning the reinforcement structure in place in the reactor building, and then pouring concrete in a mold on-site to form the seismically isolated reactor building structure(s). Such a process may have relatively high cost and complexity and may be relatively time consuming.

In addition, a nuclear plant may include a reactor cooling system that circulates a working fluid (e.g., air) through passages, conduits, or the like to absorb heat rejected from the nuclear reactor. In some cases, where a reactor building structure (e.g., superstructure or the entire reactor building) is seismically isolated by one or more seismic isolators, the reactor cooling system may circulate working fluid away from the nuclear reactor enclosure system through an exhaust duct located beneath a concrete floor structure of the reactor building. Such a concrete floor structure may be relatively thick to provide at least some structural support and containment of the reactor building and/or of the reactor enclosure system, and thus the concrete floor structure may cause the exhaust duct to be vertically spaced downwards from the top of the reactor enclosure system, thereby reducing cooling of the top portion of the reactor enclosure system. In addition, an exhaust portion of the reactor cooling system may be included in the seismically isolated portion of the reactor building, thereby increasing the structural load on the seismic isolators.

SUMMARY

According to some example embodiments, a nuclear plant may include a reactor enclosure system including a nuclear reactor, a reactor building that is configured to structurally support the reactor enclosure system on a foundation and to enclose the reactor enclosure system within an interior of the reactor building, a plurality of seismic isolators coupled to the reactor building, and a Modular Isolated Reactor Support System (MIRSS) assembly. The MIRSS assembly may include a cylindrical reactor support structure that is configured to structurally support the reactor enclosure system on the plurality of seismic isolators such that the MIRSS assembly defines a seismically isolated assembly within the nuclear plant that includes the reactor enclosure system and is seismically isolated from the reactor building. The MIRSS assembly may include a collector cylinder configured to at least partially receive the reactor enclosure system based on the reactor enclosure system being structurally supported by the cylindrical reactor support structure, such that the collector cylinder is configured to at least partially define a riser annulus between an inner cylindrical surface of the collector cylinder and an outer sidewall surface of the guard vessel. The MIRSS assembly may include a divider wall configured to at least partially define a downcomer annulus between an outer cylindrical surface of the divider wall and the reactor building, wherein a bottom opening of the downcomer annulus is in fluid communication with a bottom opening of the riser annulus. The MIRSS assembly may include a plurality of exhaust ducts extending through an interior of the cylindrical reactor support structure from the collector cylinder.

The MIRSS assembly may be configured to direct working fluid to flow downwards through the downcomer annulus to the bottom opening of the downcomer annulus, from the bottom opening of the downcomer annulus to the bottom opening of the riser annulus, upwards through the riser annulus to a top of the riser annulus according to a change in air density based on the working fluid absorbing from both the guard vessel and the collector cylinder, and through one or more exhaust ducts of the plurality of exhaust ducts, from the top of the riser annulus and through the interior of the MIRSS assembly to be discharged from the seismically isolated assembly.

The MIRSS assembly may be configured to couple the one or more exhaust ducts with an opening of a seismically non-isolated exhaust portion of a reactor cooling system that is configured to direct the working fluid to an ambient environment.

The MIRSS assembly may include a flexible duct that is coupled between the one or more exhaust ducts and the opening of the seismically non-isolated exhaust portion of the reactor cooling system. The flexible duct may be configured to establish fluid communication between a seismically isolated portion of the reactor cooling system and the seismically non-isolated exhaust portion of the reactor cooling system.

The MIRSS assembly may include an exhaust manifold structure. The exhaust manifold structure may at least partially define the one or more exhaust ducts and an outlet duct coupled to the one or more exhaust ducts. The outlet duct may be configured to be coupled between the one or more exhaust ducts and the flexible duct.

The exhaust manifold structure may at least partially define at least two exhaust ducts coupled in parallel to the outlet duct.

The MIRSS assembly may include a plurality of MIRSS modules that are coupled together to collectively define the cylindrical reactor support structure, the collector cylinder, the divider wall, and the plurality of exhaust ducts.

Each MIRSS module of the plurality of MIRSS modules may define a separate azimuthal segment of the cylindrical reactor support structure, a separate azimuthal segment of the collector cylinder, and a separate azimuthal segment of the divider wall.

The plurality of MIRSS modules may include a plurality of upper modular structures that collectively define the cylindrical reactor support structure, and a plurality of lower modular structures stacked axially under the plurality of upper modular structures. The plurality of lower modular structures may be stacked such that the plurality of lower modular structures collectively define the divider wall. The plurality of upper modular structures and plurality of lower modular structures may collectively define the collector cylinder.

At least one upper modular structure of the plurality of upper modular structures may at least partially define the one or more exhaust ducts.

The MIRSS assembly may be configured to define at least one shielding chamber within an interior of the MIRSS assembly and radially outward in relation to the collector cylinder, the at least one shielding chamber configured to hold at least one shielding material.

The MIRSS assembly may be configured to direct the working fluid to flow to the downcomer annulus via a heat transfer path passing at least one seismic isolator of the plurality of seismic isolators, such that the MIRSS assembly is configured to cause the working fluid to remove heat from the at least one seismic isolator.

The nuclear plant may further include a heater configured to heat the at least one seismic isolator.

The plurality of seismic isolators may be at least partially thermally isolated from the working fluid directed into the downcomer annulus.

The seismically isolated assembly may define a floor structure of a head access area (HAA) which is enclosed above the floor structure by an upper building structure of the reactor building, such that the floor structure is seismically isolated in relation to the upper building structure that encloses the HAA above the floor structure. The MIRSS assembly may further include an HAA seal configured to establish a seal between the floor structure and the upper building structure.

According to some example embodiments, a Modular Isolated Reactor Support System (MIRSS) module, configured to define an azimuthal portion of an annular structure, may include an upper modular structure that defines a separate azimuthal segment of a cylindrical reactor support structure of the annular structure, such that the upper modular structure is configured to structurally support at least a portion of a structural load of a reactor enclosure system that includes a nuclear reactor. The MIRSS module may include one or more lower modular structures stacked axially under the upper modular structure, where the one or more lower modular structures collectively define an outer sidewall surface defining a separate azimuthal segment of a divider wall of the annular structure. The upper modular structure and the one or more lower modules structures may have respective inner sidewall surfaces collectively defining a separate azimuthal segment of a collector cylinder of the annular structure.

The upper modular structure may be configured to at least partially define a shielding chamber within a module interior of the upper modular structure, wherein the upper modular structure is configured to hold a shielding material within the shielding chamber.

The upper modular structure may be configured to at least partially define one or more exhaust ducts extending from the separate azimuthal segment of the collector cylinder and through a module interior of the upper modular structure.

According to some example embodiments, a MIRSS assembly may include a plurality of MIRSS modules, wherein each MIRSS module of the plurality of MIRSS modules is the MIRSS module as described above. The plurality of MIRSS modules may be azimuthally coupled together to collectively define the annular structure such that the MIRSS assembly includes the cylindrical reactor support structure of the annular structure, the collector cylinder of the annular structure, the divider wall of the annular structure, and a plurality of exhaust ducts extending from the collector cylinder and through an interior of the cylindrical reactor support structure.

The MIRSS assembly may be configured to direct a working fluid to flow downwards through the downcomer annulus to the bottom opening of the downcomer annulus, from the bottom opening of the downcomer annulus to the bottom opening of the riser annulus, upwards through the riser annulus to the top of the riser annulus according to a change in air density based on the working fluid absorbing heat from both the guard vessel and the collector cylinder, and through one or more exhaust ducts of the plurality of exhaust ducts, from the top of the riser annulus and through the interior of the MIRSS assembly to be discharged from the MIRSS assembly.

The MIRSS assembly may be configured to couple the one or more exhaust ducts with an opening of a seismically non-isolated exhaust portion of a reactor cooling system that is configured to direct the working fluid to an ambient environment.

The MIRSS assembly may include a flexible duct that is coupled between the one or more exhaust ducts and the opening of the seismically non-isolated exhaust portion of the reactor cooling system, the flexible duct configured to establish fluid communication between a seismically isolated portion of the reactor cooling system and the seismically non-isolated exhaust portion of the reactor cooling system.

The MIRSS assembly may include an exhaust manifold structure. The exhaust manifold structure may at least partially define the one or more exhaust ducts and an outlet duct coupled to the one or more exhaust ducts. The outlet duct may be configured to be coupled between the one or more exhaust ducts and the flexible duct.

The exhaust manifold structure may at least partially define at least two exhaust ducts coupled in parallel to the outlet duct.

According to some example embodiments, a method for constructing a nuclear plant may include: constructing a lower building structure of a reactor building that is configured to structurally support and enclose a reactor enclosure system that is configured to include a nuclear reactor, the lower building structure including at least one reactor building support surface configured to support a structural load of the reactor enclosure system on a foundation, mounting a plurality of seismic isolators on the at least one reactor building support surface, constructing a Modular Isolated Reactor Support System (MIRSS) assembly, mounting the MIRSS assembly on the plurality of seismic isolators, such that the MIRSS assembly defines the seismically isolated assembly within the nuclear plant, and mounting the reactor enclosure system on the MIRSS assembly, such that the MIRSS assembly structurally supports the reactor enclosure system on the plurality of seismic isolators, and the seismically isolated assembly includes the reactor enclosure system. The MIRSS assembly may include a cylindrical reactor support structure that is configured to structurally support the reactor enclosure system on the plurality of seismic isolators such that the MIRSS assembly is configured to collectively define a seismically isolated assembly within the nuclear plant that includes the reactor enclosure system and is seismically isolated from the reactor building, a collector cylinder configured to at least partially receive the reactor enclosure system based on the reactor enclosure system being structurally supported by the cylindrical reactor support structure, such that the collector cylinder is configured to at least partially define a riser annulus between an inner cylindrical surface of the collector cylinder and an outer sidewall surface of the reactor enclosure system, a divider wall configured to at least partially define a downcomer annulus between an outer cylindrical surface of the divider wall and the reactor building, and a plurality of exhaust ducts extending through an interior of the cylindrical reactor support structure from the collector cylinder.

The method may further include constructing an upper building structure of the reactor building on the lower building structure to complete the reactor building and to enclose the reactor enclosure system within the reactor building. The seismically isolated assembly may be seismically isolated from the lower building structure and the upper building structure, such that the seismically isolated assembly defines a floor structure of a head access area (HAA) which is enclosed above the floor structure by the upper building structure of the reactor building, such that the floor structure is seismically isolated in relation to the upper building structure that encloses the HAA above the floor structure, and the MIRSS assembly further includes an HAA seal configured to establish a seal between the floor structure and the upper building structure.

The lower building structure may include a containment pit that is configured to at least partially receive the reactor enclosure system. The at least one reactor building support surface may at least partially surround the containment pit at a top opening of the containment pit, such that the plurality of seismic isolators are mounted on the at least one reactor building support surface to extend in a circumferential pattern at least partially around the top opening of the containment pit. The mounting of the MIRSS assembly on the plurality of seismic isolators may include lowering the MIRSS assembly at least partially into the containment pit such that the MIRSS assembly is structurally supported on the plurality of seismic isolators to extend downwards at least partially into the containment pit through the top opening of the containment pit, and the MIRSS assembly is configured to structurally support the reactor enclosure system in the collector cylinder to extend downwards at least partially within the containment pit.

The MIRSS assembly may be configured to define at least one shielding chamber within an interior of the MIRSS assembly and radially outward in relation to the collector cylinder, the at least one shielding chamber configured to hold at least one shielding material.

The construction of the MIRSS assembly may include coupling a plurality of MIRSS modules together to collectively define the cylindrical reactor support structure, the collector cylinder, the divider wall, and the plurality of exhaust ducts.

Each MIRSS module of the plurality of MIRSS modules may define a separate azimuthal segment of the cylindrical reactor support structure, a separate azimuthal segment of the collector cylinder, and a separate azimuthal segment of the divider wall, such that the construction of the MIRSS assembly includes azimuthally coupling the plurality of MIRSS modules together.

The method may further include fabricating the plurality of MIRSS modules at one or more remote locations and transporting the plurality of MIRSS modules from the one or more remote locations to the lower building structure, prior to coupling the plurality of MIRSS modules together.

The method may further include coupling the plurality of exhaust ducts of the MIRSS assembly with an opening of a seismically non-isolated exhaust portion of a reactor cooling system that is in fluid communication with an ambient environment.

Coupling the plurality of exhaust ducts with the seismically non-isolated exhaust portion may include coupling a flexible duct between one or more exhaust ducts of the plurality of exhaust ducts and the opening of the seismically non-isolated exhaust portion of the reactor cooling system, such that the flexible duct establishes fluid communication between a seismically isolated portion of the reactor cooling system and the seismically non-isolated exhaust portion.

The method may further include coupling an exhaust manifold structure to the cylindrical reactor support structure such that at least a portion of the exhaust manifold structure extends through the cylindrical reactor support structure to the collector cylinder to at least partially define the one or more exhaust ducts. The method may further include coupling an outlet duct of the exhaust manifold structure to the flexible duct.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1A:
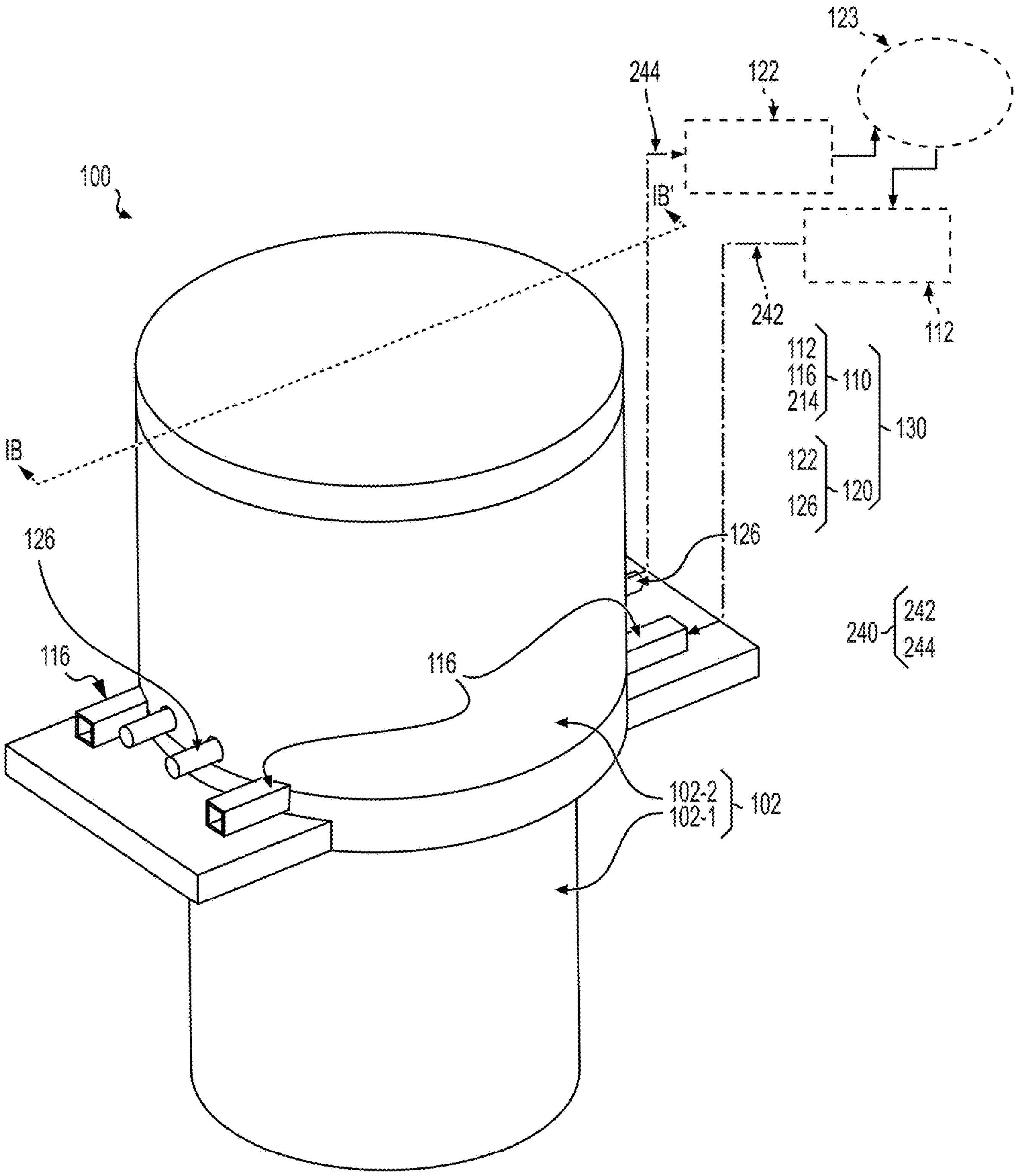
FIG. 1A is a perspective view of a nuclear plant that includes a reactor building which encloses a reactor enclosure system and a MIRSS assembly, according to some example embodiments.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as “below” or “beneath” other elements or features would then be oriented “above” the other elements or features. Thus, the term “below” may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms “a,” “an,” and “the” are intended to include the plural forms as well, unless the context clearly indicates otherwise. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

It will be understood that a “coolant fluid” as described herein may include any well-known coolant fluid that may be used in cooling any part of a nuclear plant and/or nuclear reactor, including water, a liquid metal (e.g., liquid sodium), a gas (e.g., helium), a molten salt, any combination thereof, or the like. It will be understood that a “fluid” as described herein may include a gas, a liquid, or any combination thereof.

The present inventive concepts relate to a unique nuclear reactor support system, also referred to herein interchangeably as a reactor support assembly. The reactor support assembly is configured to control nuclear reactor movement due to significant seismic events and thus is configured to provide improved seismic protection to the nuclear reactor and reactor enclosure system including the same. The reactor support assembly further enables a practical approach for nuclear plant design and construction which enables improved construction efficiency and enables improvements in costs of fabrication and construction of nuclear plant structures, based on the reactor support assembly being modular, simple, and cost-effective. The reactor support assembly may include a Modular Isolated Reactor Support System (MIRSS) assembly that is at least partially comprised of a plurality of structures (e.g., a plurality of MIRSS modules) coupled together or a non-modular Isolated Reactor Support System (IRSS) that is at least partially assembled as a single structure without coupling pre-fabricated modules together. It will be understood that descriptions herein may refer to a MIRSS assembly for simplicity, but it will be understood that a “MIRSS assembly” or a “Modular Isolated Reactor Support System (MIRSS)” as described herein may be any reactor support assembly according to any of the example embodiments, including either of a Modular Isolated Reactor Support System (MIRSS) assembly that is at least partially comprised of a plurality of structures (e.g., a plurality of MIRSS modules) coupled together or a non-modular Isolated Reactor Support System (IRSS) that is at least partially assembled as a single structure without coupling pre-fabricated modules together.

The MIRSS assembly includes a support structure, collectively referred to interchangeably herein as an annular structure, a cylindrical support structure, or the like, that is configured to be seismically isolated from the reactor building, based on being mounted and structurally supported on seismic isolators. The structures comprising the MIRSS assembly may include and/or at least partially define one or more of a cylindrical reactor support structure, a Reactor enclosure system Auxiliary Cooling System (RVACS) divider wall (also referred to herein as a divider wall), an RVACS collector cylinder (also referred to herein as a collector cylinder), and an RVACS intake annulus to head access area seal, also referred to herein as an HAA seal, one or more shielding chambers configured to accommodate one or more shielding materials configured to provide radiation shielding and/or thermal shielding, any combination thereof, or the like. It will be understood that, in some example embodiments, the structures comprising the MIRSS assembly may include a plurality of exhaust ducts extending through an interior of the cylindrical reactor support structure from the collector cylinder, for example further extending to an outer sidewall surface of the MIRSS assembly that is opposite to the inner cylindrical surface of the collector cylinder, such that the exhaust ducts are configured to direct a working fluid out of the collector cylinder and further out of the MIRSS assembly. The exhaust ducts may be defined by structural members of the cylindrical reactor support structure and/or by duct structures of a separate exhaust manifold structure that may be coupled with the cylindrical reactor support structure, but example embodiments are not limited thereto. Once assembled, the various structures and/or components comprising and/or implemented by the MIRSS assembly may be configured to act as one unit (e.g., as a single-piece structure) at normal conditions and in seismic conditions (e.g., during an earthquake).

Figure 1B:
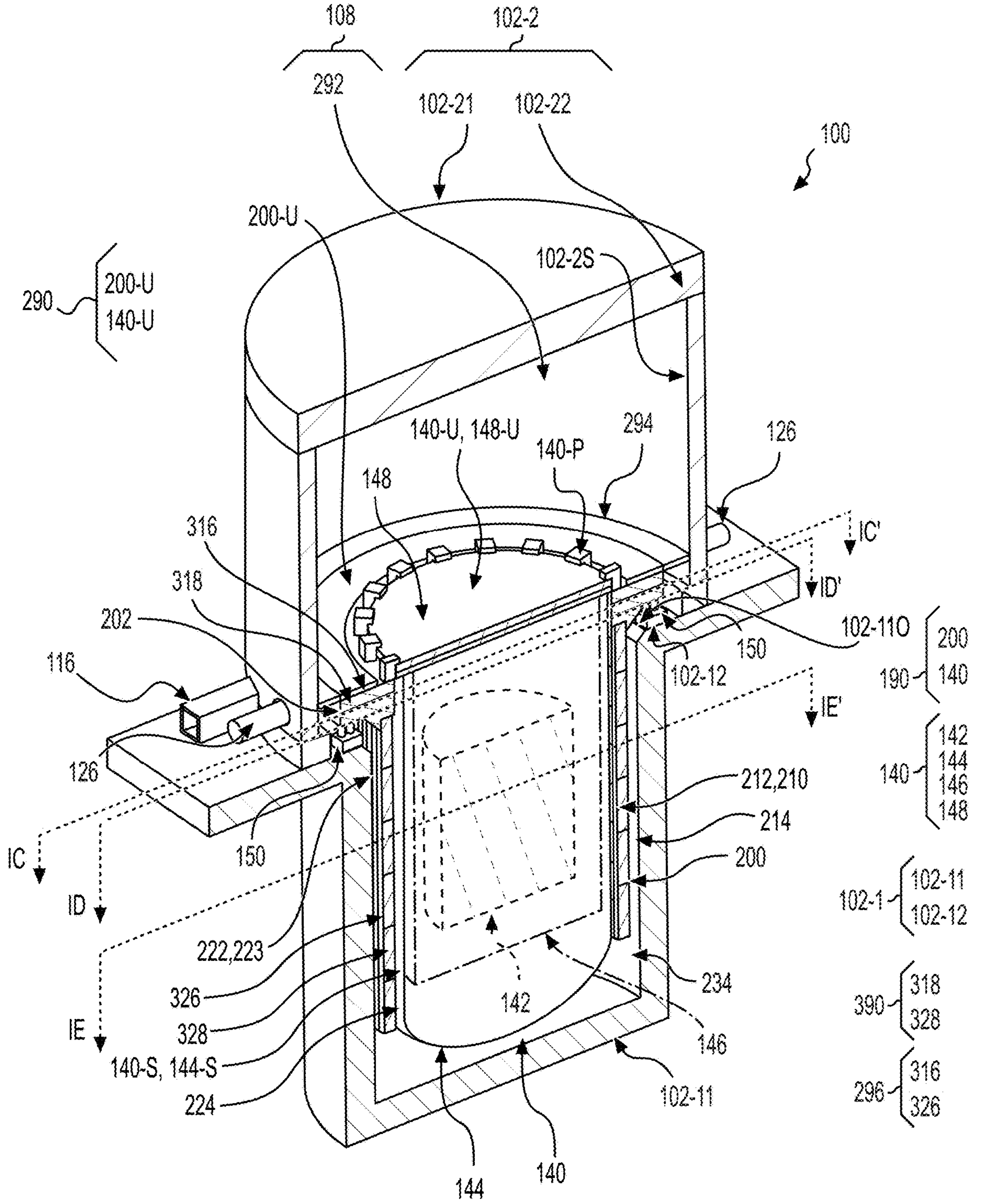
FIG. 1B is a cross-sectional perspective view of the nuclear plant of FIG. 1A along cross-sectional view line IB-IB' in FIG. 1A, according to some example embodiments.
Figure 1C:
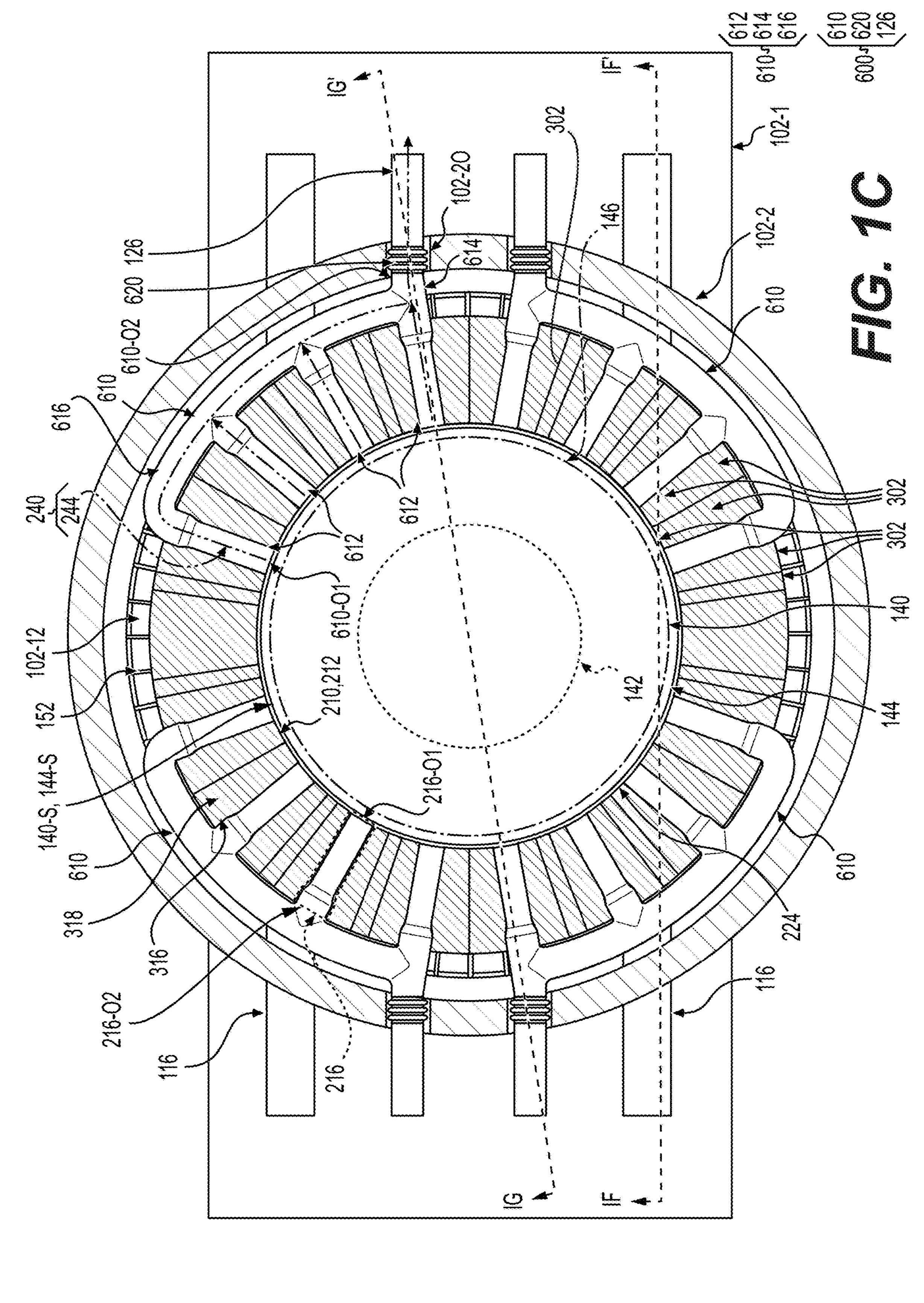
FIG. 1C is a cross-sectional plan view of the nuclear plant of FIG. 1A along cross-sectional view line IC-IC' in FIG. 1B, according to some example embodiments.
Figure 1D:
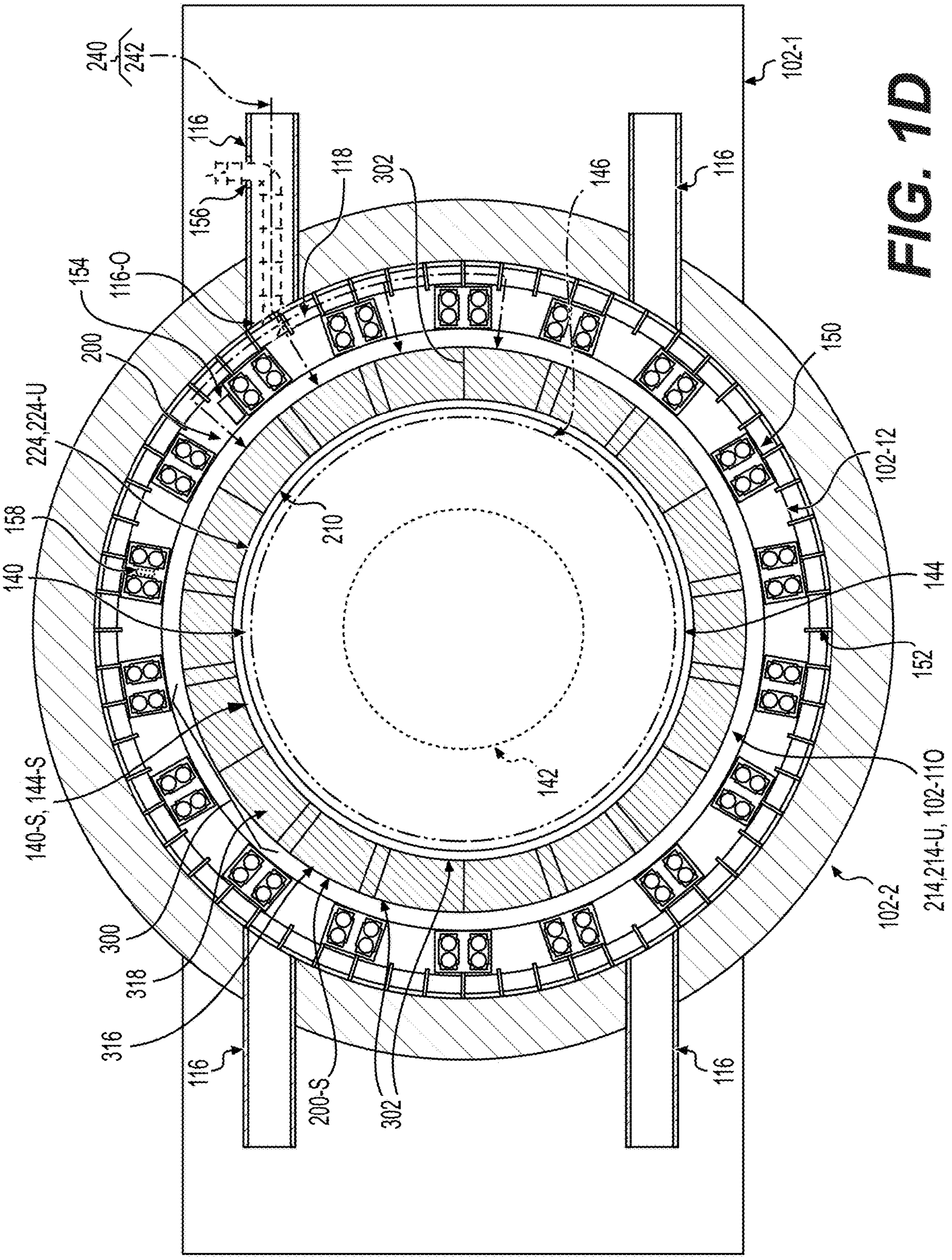
FIG. 1D is a cross-sectional plan view of the nuclear plant of FIG. 1A along cross-sectional view line ID-ID' in FIG. 1B, according to some example embodiments.
Figure 1E:
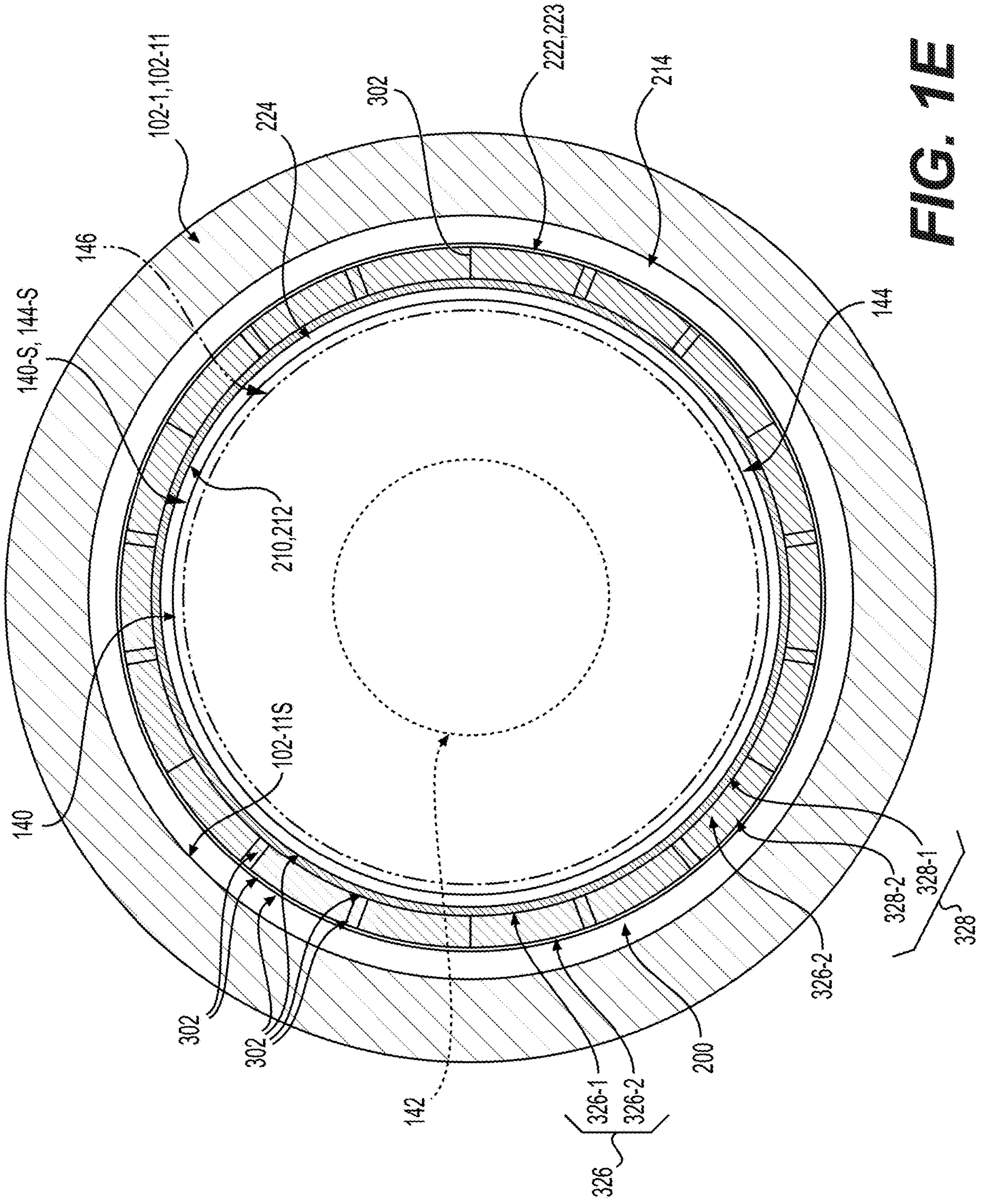
FIG. 1E is a cross-sectional plan view of the nuclear plant of FIG. 1A along cross-sectional view line IE-IE' in FIG. 1B, according to some example embodiments.
Figure 1F:
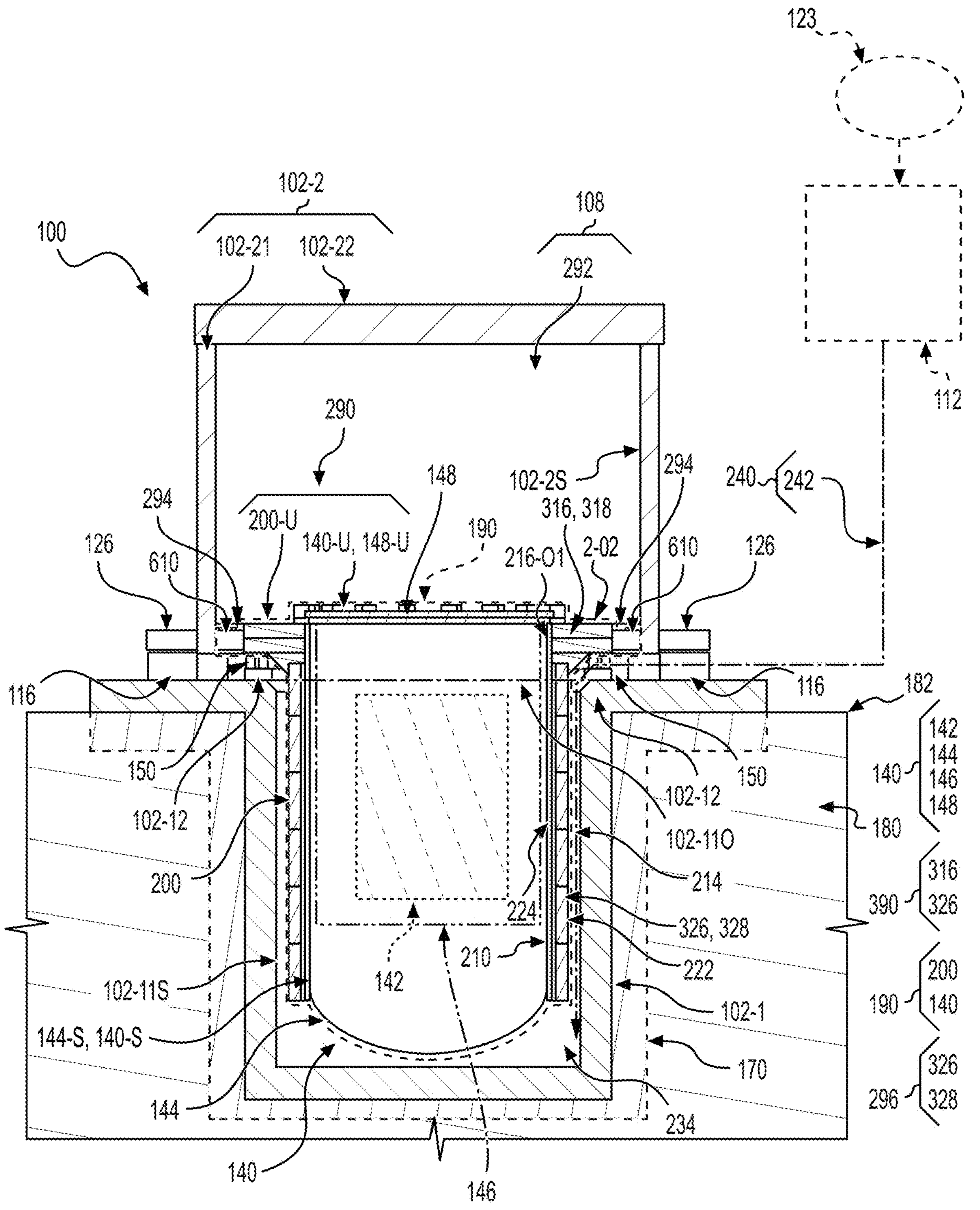
FIG. 1F is a cross-sectional elevation view of the nuclear plant of FIG. 1A along cross-sectional view line IF-IF' in FIG. 1C, according to some example embodiments.
Figure 1G:
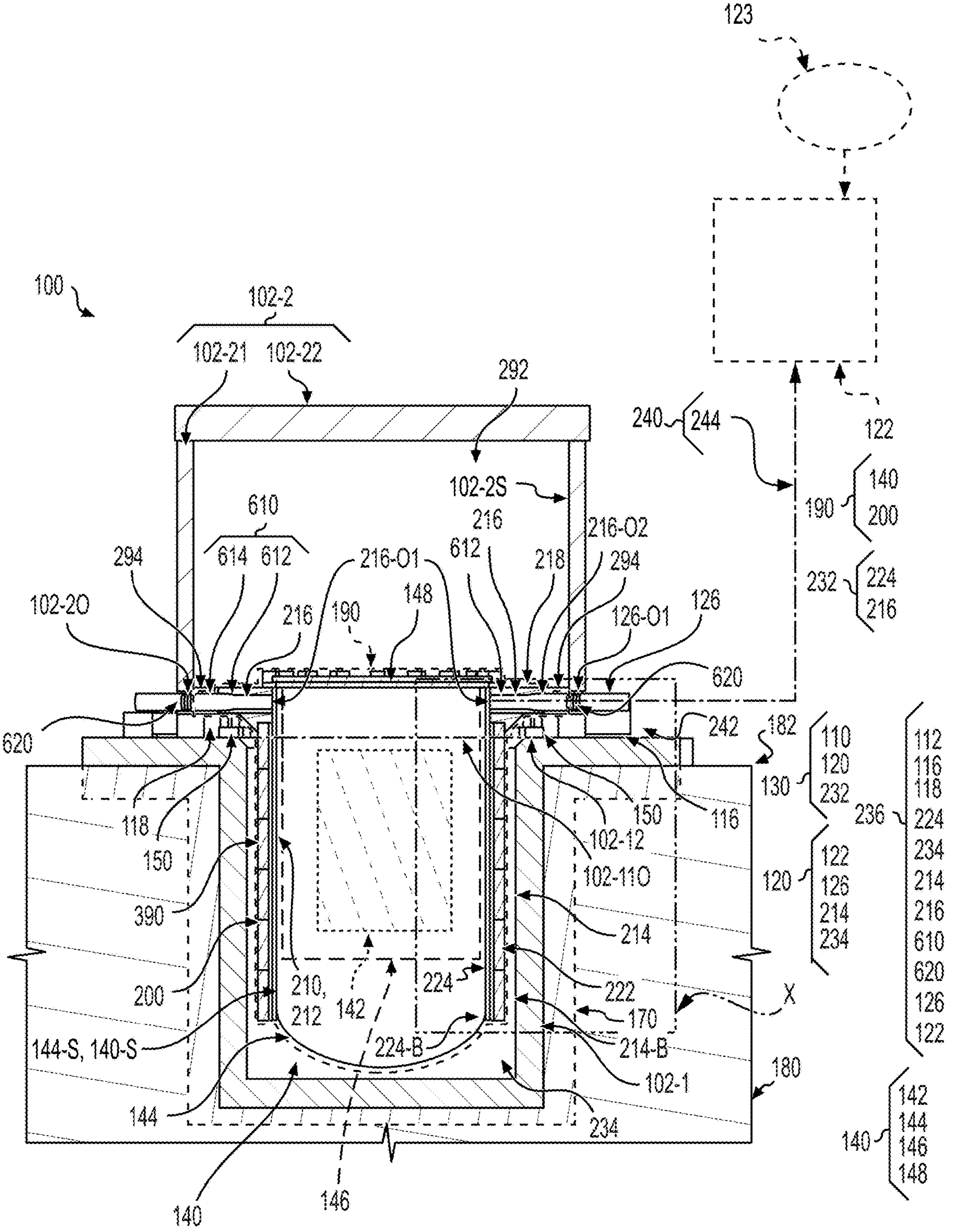
FIG. 1G is a cross-sectional elevation view of the nuclear plant of FIG. 1A along cross-sectional view line IG-IG' in FIG. 1C, according to some example embodiments.
Figure 1H:
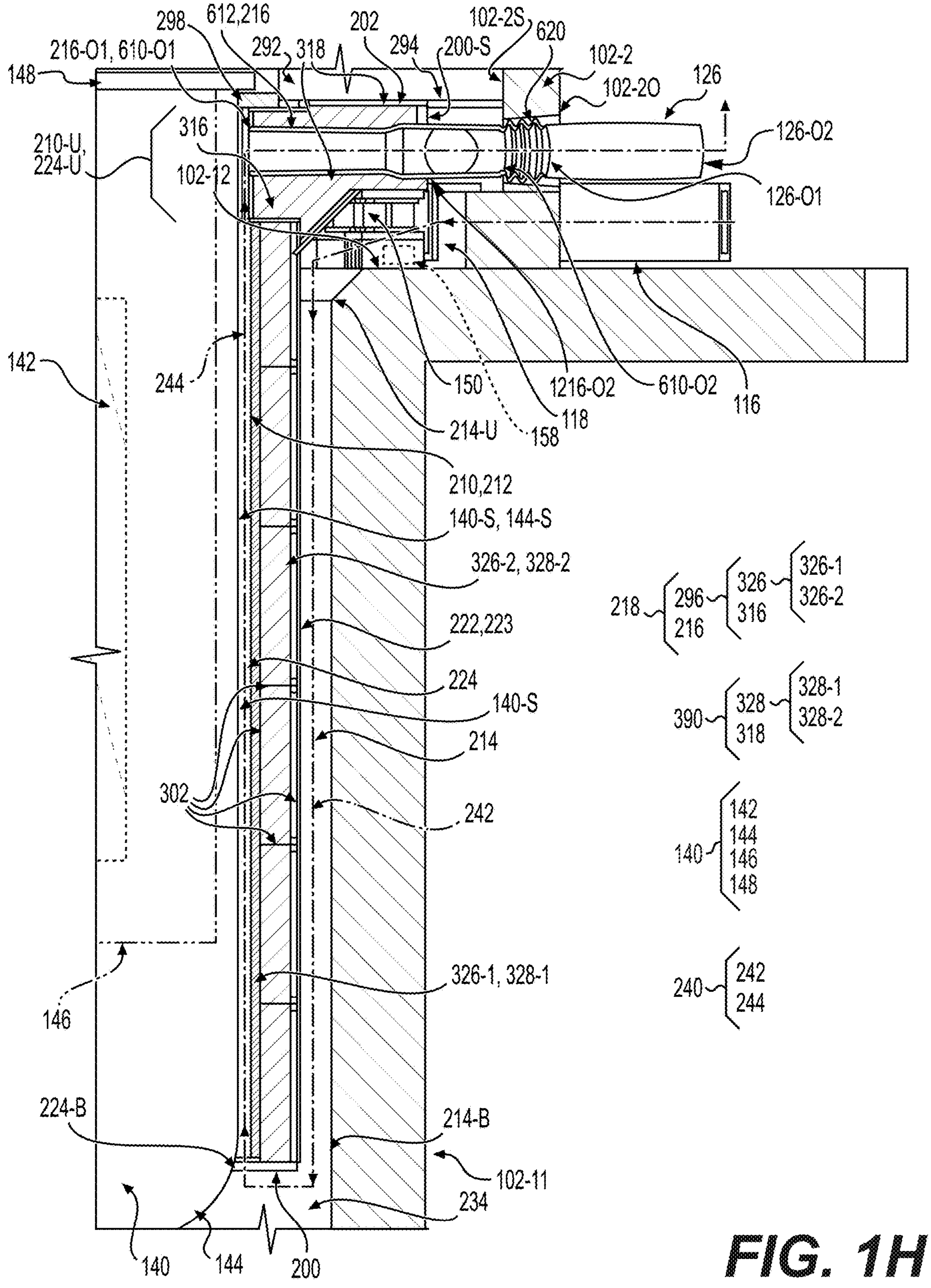
FIG. 1H is a cross-sectional elevation view of region X of the nuclear plant of FIG. 1G, according to some example embodiments.

FIG. 1A is a perspective view of a nuclear plant 100 including a reactor building 102 that encloses a reactor enclosure system 140 and a MIRSS assembly 200, according to some example embodiments. FIG. 1B is a cross-sectional perspective view of the reactor building 102, MIRSS assembly 200, and reactor enclosure system 140 of FIG. 1A along cross-sectional view line IB-IB' in FIG. 1A, according to some example embodiments. FIG. 1C is a cross-sectional plan view of the nuclear plant 100 of FIG. 1A along cross-sectional view line IC-IC' in FIG. 1B, according to some example embodiments. FIG. 1D is a cross-sectional plan view of the nuclear plant 100 of FIG. 1A along cross-sectional view line ID-ID' in FIG. 1B, according to some example embodiments. FIG. 1E is a cross-sectional plan view of the nuclear plant 100 of FIG. 1A along cross-sectional view line IE-IE' in FIG. 1B, according to some example embodiments. FIG. 1F is a cross-sectional elevation view of the nuclear plant 100 of FIG. 1A along cross-sectional view line IF-IF' in FIG. 1C, according to some example embodiments. FIG. 1G is a cross-sectional elevation view of the nuclear plant 100 of FIG. 1A along cross-sectional view line IG-IG' in FIG. 1C, according to some example embodiments. FIG. 1H is a cross-sectional elevation view of region X of the nuclear plant 100 of FIG. 1G, according to some example embodiments.

Figure 2A:
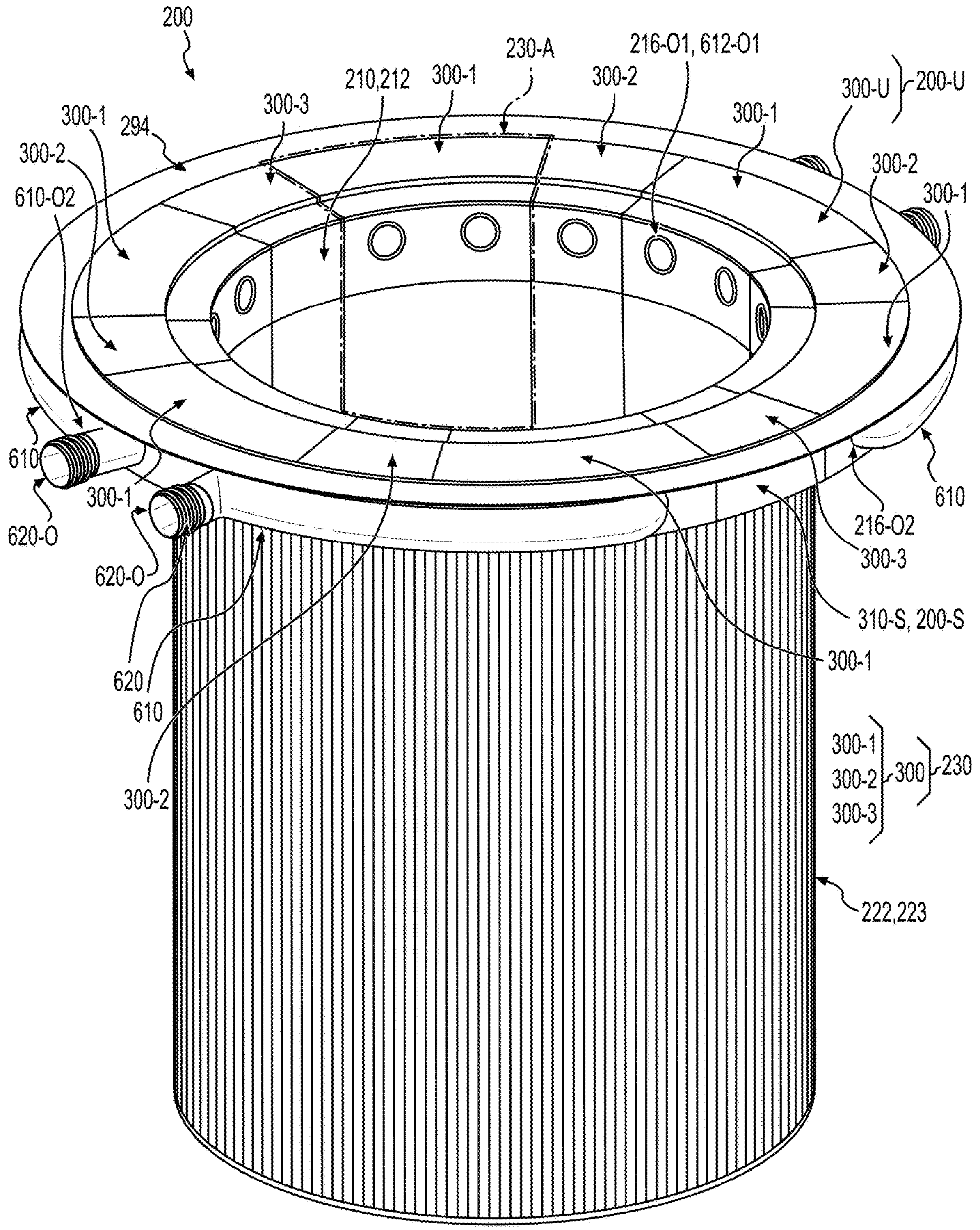
FIG. 2A is a perspective view of a MIRSS assembly, according to some example embodiments.
Figure 2B:
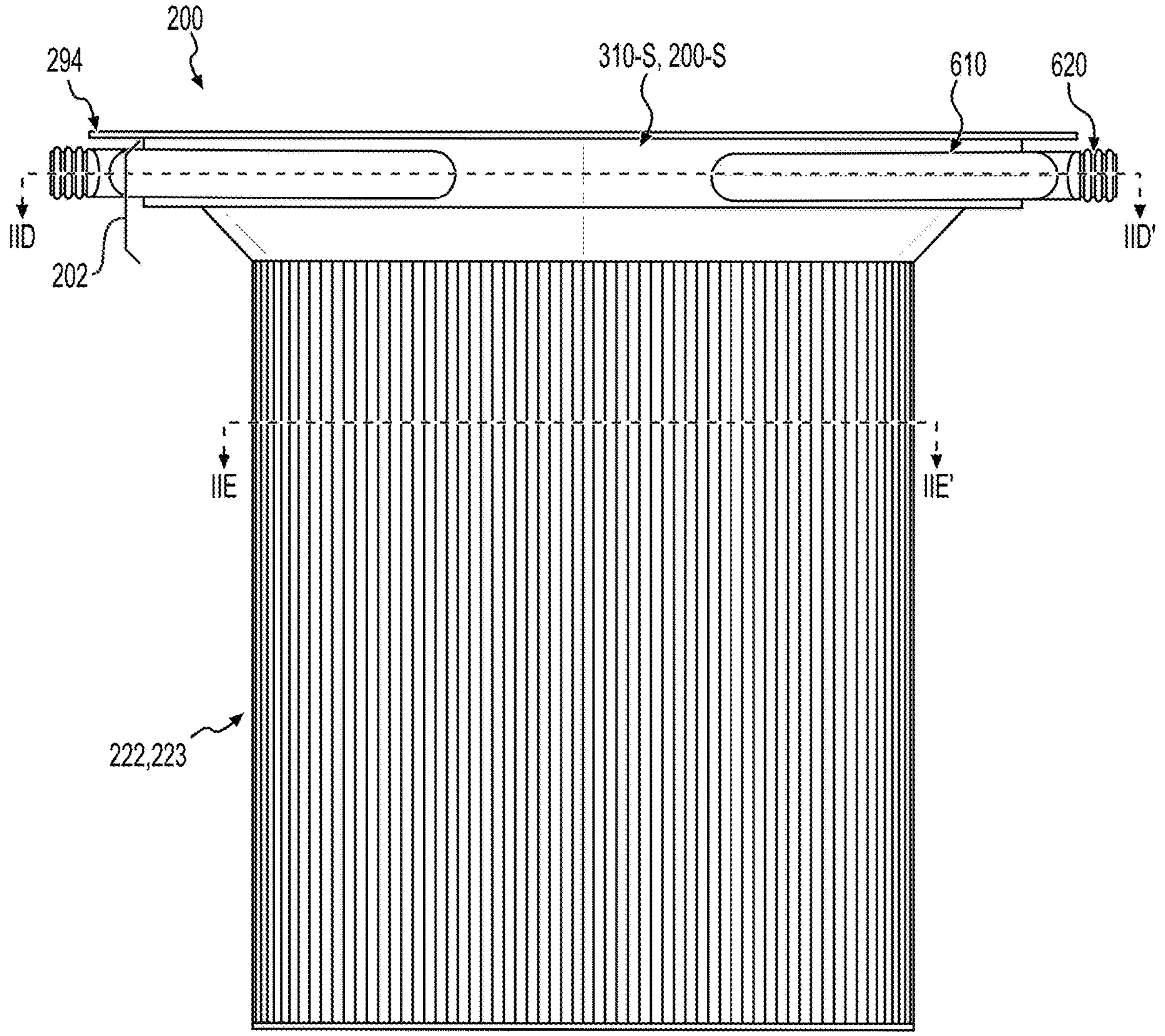
FIGS. 2B and 2C are elevation views of the MIRSS assembly of FIG. 2A, according to some example embodiments.
Figure 2C:
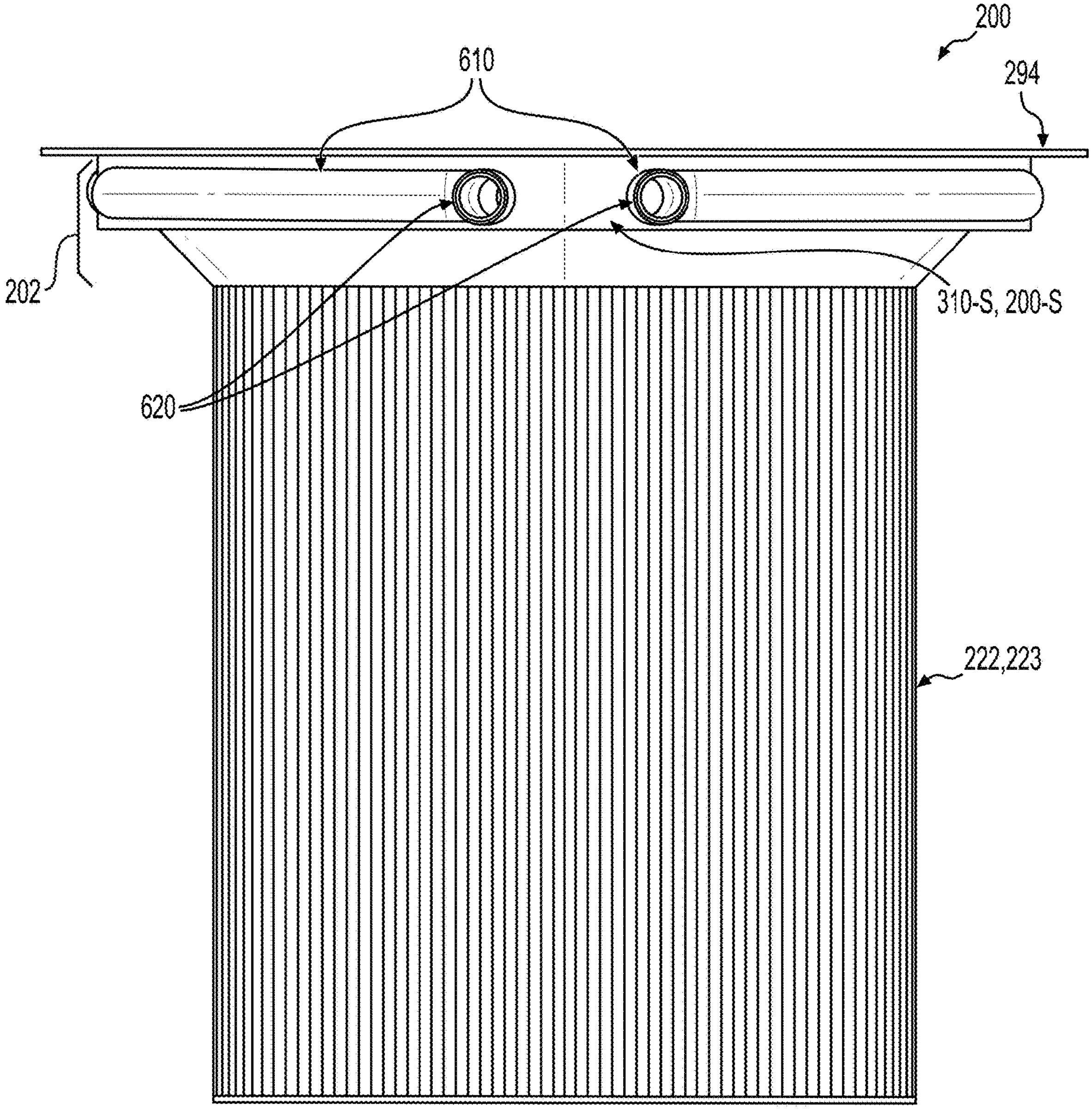
Figure 2D:
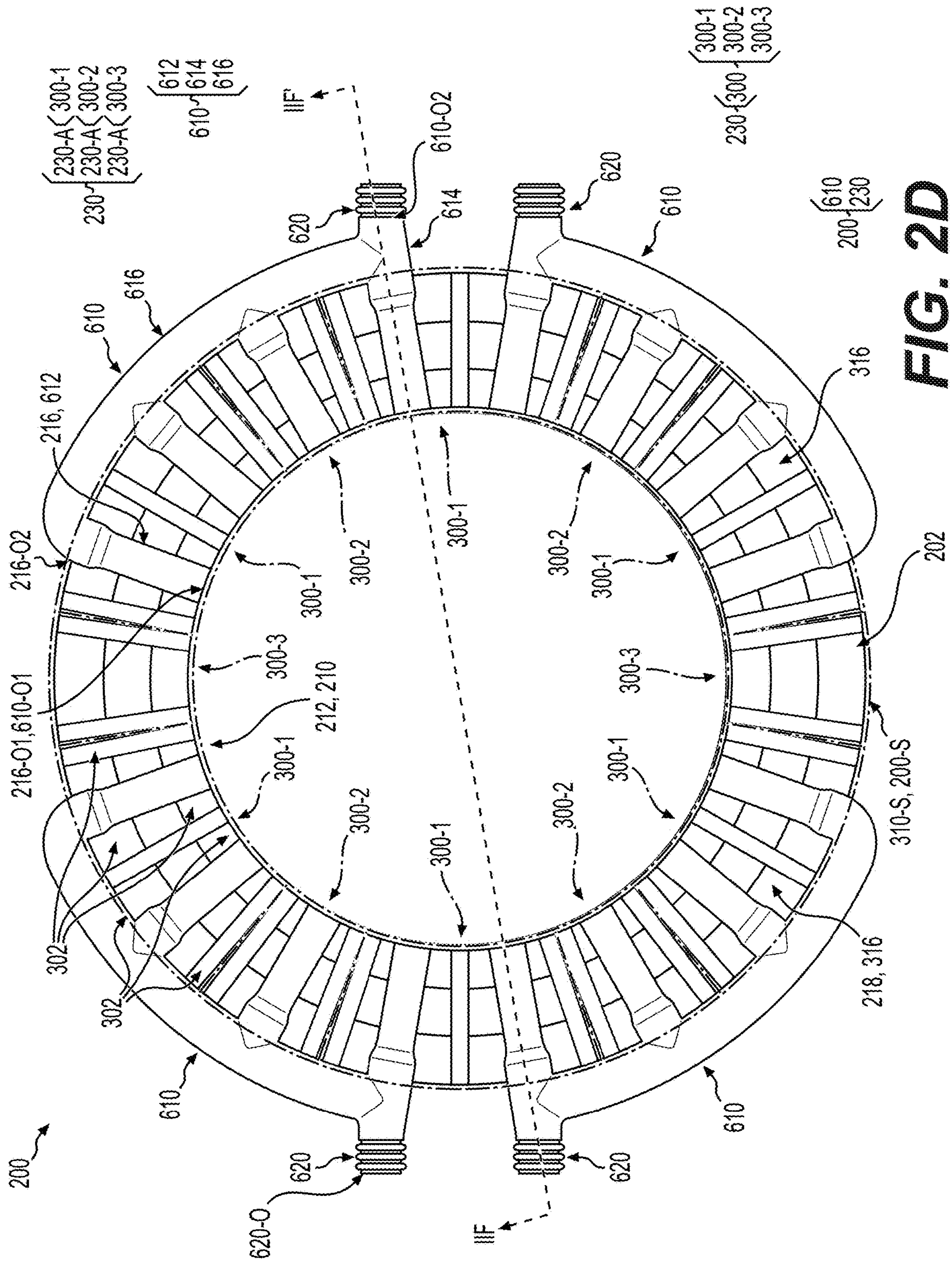
FIG. 2D is a cross-sectional plan view of the MIRSS assembly of FIG. 2A along cross-sectional view line IID-IID' in FIG. 2B, according to some example embodiments.
Figure 2E:
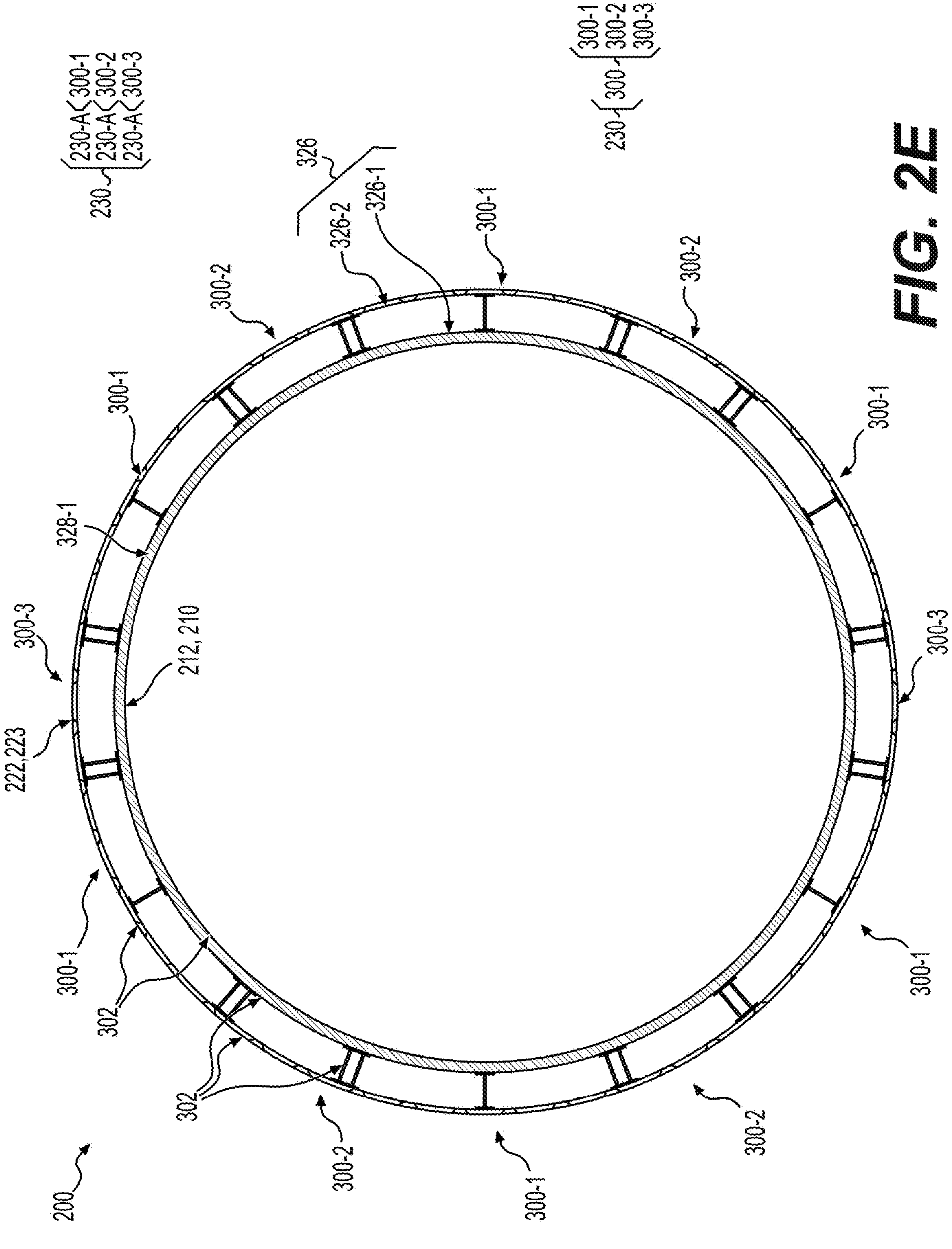
FIG. 2E is a cross-sectional plan view of the MIRSS assembly of FIG. 2A along cross-sectional view line IIE-IIE' in FIG. 2B, according to some example embodiments.
Figure 2F:
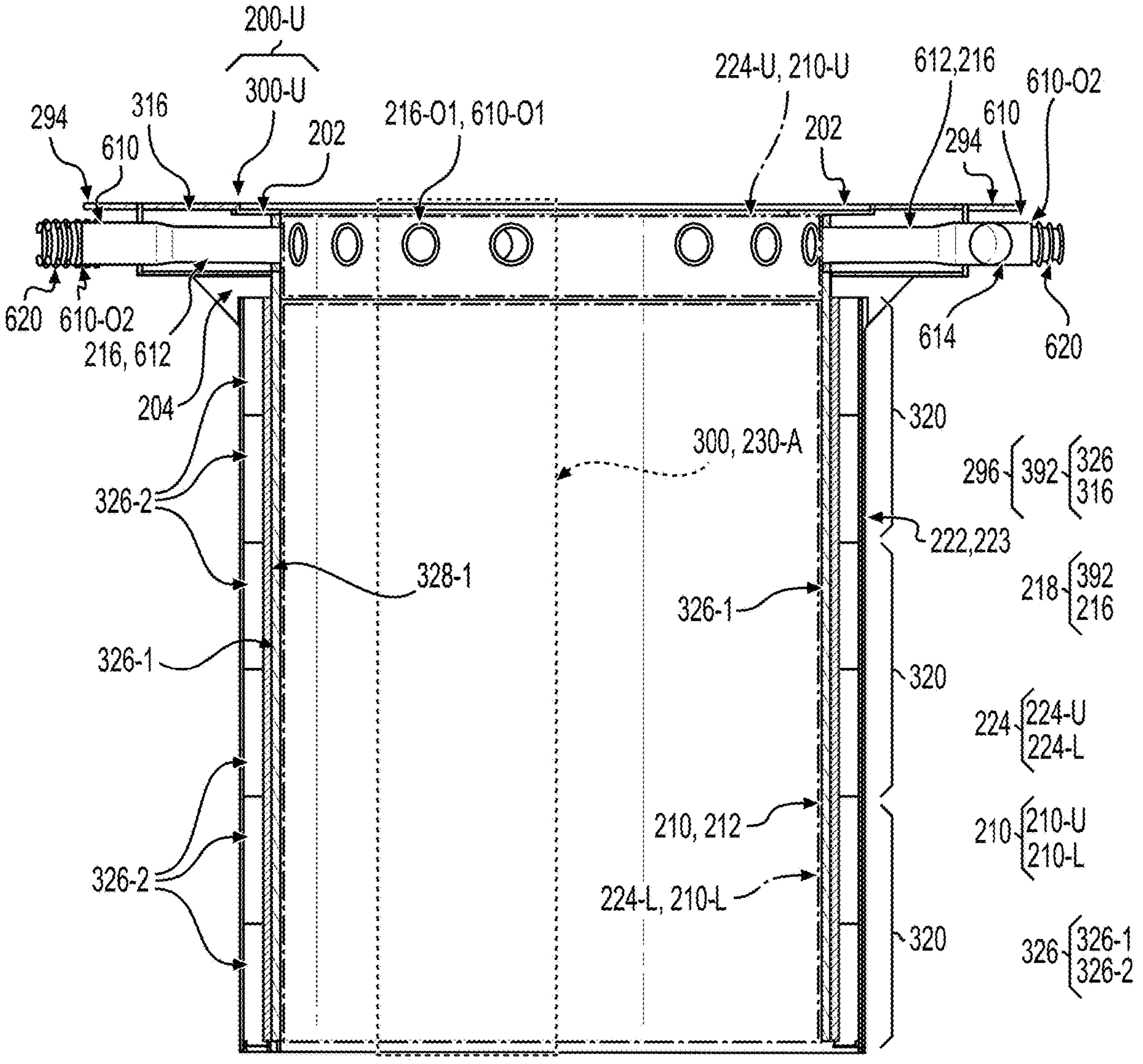
FIG. 2F is a cross-sectional elevation view of the MIRSS assembly of FIG. 2A along cross-sectional view line IIF-IIF' in FIG. 2A, according to some example embodiments.
Figure 2G:
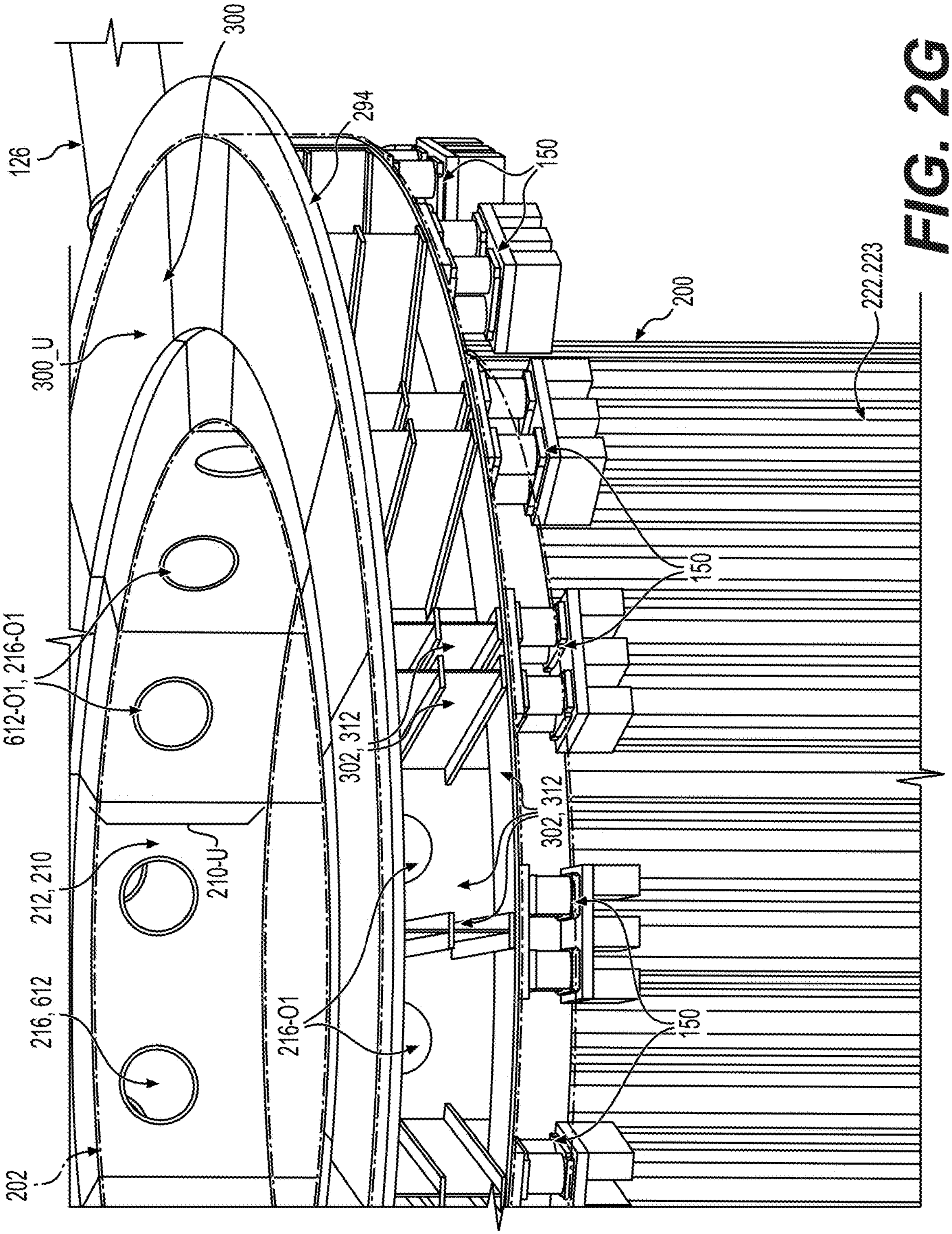
FIG. 2G is a perspective cutaway of the MIRSS assembly of FIG. 2A on a plurality of seismic isolators, according to some example embodiments.

FIG. 2A is a perspective view of a MIRSS assembly 200, according to some example embodiments. FIGS. 2B and 2C are elevation views of the MIRSS assembly 200 of FIG. 2A, according to some example embodiments. FIG. 2D is a cross-sectional plan view of the MIRSS assembly 200 of FIG. 2A along cross-sectional view line IID-IID' in FIG. 2B, according to some example embodiments. FIG. 2E is a cross-sectional plan view of the MIRSS assembly 200 of FIG. 2A along cross-sectional view line IIE-IIE' in FIG. 2B, according to some example embodiments. FIG. 2F is a cross-sectional elevation view of the MIRSS assembly 200 of FIG. 2A along cross-sectional view line IIF-IIF' in FIG. 2A, according to some example embodiments. FIG. 2G is a perspective cutaway of the MIRSS assembly 200 of FIG. 2A on a plurality of seismic isolators, according to some example embodiments.

Referring generally to FIGS. 1A-1H, a nuclear plant 100 (also referred to herein interchangeably as a nuclear power plant) may include a reactor enclosure system 140, a reactor building 102 that is configured to structurally support the reactor enclosure system 140 on a foundation 170 and to enclose the reactor enclosure system 140 within an interior 108 of the reactor building 102, and a MIRSS assembly 200 that is configured to structurally support the reactor enclosure system 140 on seismic isolators 150 that are coupled to the reactor building 102 such that the MIRSS assembly 200 both structurally supports and seismically isolates the reactor enclosure system 140 from the reactor building 102.

In some example embodiments, and as shown in at least FIGS. 1B and 1F-1H, a reactor enclosure system 140 may include a guard vessel 144 (GV), a primary vessel 146 (e.g., reactor vessel), and a head 148 (e.g., reactor head, reactor vessel head, head assembly, head structure, head plate, cap, etc.) and may further be understood to include the nuclear reactor 142. The guard vessel 144 and the head 148 may collectively define an enclosure in which the primary vessel 146 and the nuclear reactor 142 are located. The reactor enclosure system 140 may be interchangeably referred to as a reactor module. The reactor enclosure system 140 is configured to include (e.g., structurally support and enclose) a nuclear reactor 142. The primary vessel 146 may be configured to contain the nuclear reactor 142 and to contain one or more working fluids (e.g., liquid metal, water, gases etc.) circulating in a heat transfer path passing the nuclear reactor 142. The guard vessel 144 may be configured to isolate the primary vessel 146 to reduce, minimize, or prevent leakage of materials, such as the one or more coolant fluids (e.g., liquid metal, water, gases etc.), from the primary vessel 146 into the reactor building 102 and/or external environment. It will be understood that a nuclear reactor 142 as described herein may include or may be interchangeably referred to as a nuclear reactor core. It will be understood that a nuclear reactor 142 as described herein may include any type of nuclear reactor, including but not limited to a Boiling Water Reactor (BWR), a Pressurized Water Reactor (PWR), a liquid metal cooled reactor, a Molten Salt Reactor (MSR), an Advanced Boiling Water Reactor (ABWR), an Economic Simplified Boiling Water Reactor (ESBWR), a BWRX-300 reactor, or the like. The reactor enclosure system 140 may be configured to hold the primary vessel 146 within the guard vessel 144 to define an annular gap space between an outer sidewall surface of the primary vessel 146 and an inner sidewall surface of the guard vessel 144. The reactor enclosure system 140 may be configured to maintain a fixed relative position of the primary vessel 146 and the guard vessel 144 to reduce, minimize, or prevent relative movement of the primary vessel 146 and the guard vessel 144, thereby reducing, minimizing, or preventing closure of the annular gap between the primary vessel 146 and the guard vessel 144 due to seismically-isolated movement of the reactor enclosure system 140 in relation to the reactor building 102. It will be understood that the reactor enclosure system 140 is not limited to example embodiments that include each of the nuclear reactor 142, the primary vessel 146, the head 148, and the guard vessel 144. For example, in some example embodiments, the reactor enclosure system 140 may not include (e.g., may omit) the guard vessel 144, such that the outer sidewall surface 140-S of the reactor enclosure system 140 may be an outer sidewall surface of a primary vessel 146.

The reactor building 102 may include a lower building structure 102-1 and an upper building structure 102-2. The lower building structure 102-1 may be configured to structurally support at least the reactor enclosure system 140 and supporting structure (e.g., the MIRSS assembly 200) on a foundation 170 on the underlying ground 180. In some example embodiments, the foundation 170 may be included as a part of the lower building structure 102-1. In some example embodiments, the lower building structure 102-1 and the foundation 170 may be separate structures, where the lower building structure 102-1 is structurally supported by the foundation 170. The upper building structure 102-2 may at least partially complete an enclosure of an interior 108 of the reactor building 102 that includes a reactor head access area (HAA) 292 above the reactor enclosure system 140.

As shown in FIGS. 1A-1H, the lower building structure 102-1 may include a containment pit 102-11 that may extend at least partially below grade 182 of the underlying ground 180 and may have a top opening 102-110 and an inner containment pit surface 102-11S defining a cylindrical volume space therein. However, it will be understood that example embodiments are not limited thereto, and in some example embodiments the seismic isolators 150 may structurally support the MIRSS assembly 200 and the reactor enclosure system 140 entirely above the seismic isolators 150 on a structural support surface 102-12. It will be understood that, where one element is structurally supported by or on another element, the other element is configured to support some or an entirety (e.g., all) of the structural load (e.g., some or all of the weight) of the one element and may be configured to transfer such structural load to an underlying element or structure upon which the other element is resting (e.g., foundation 170), such that the "structurally supported" one element is understood to be resting upon the structurally supporting element.

As shown in at least FIG. 1D, the seismic isolators 150 may extend in a circumferential pattern around a central axis that may be paraxial or coaxial with a central axis of the MIRSS assembly 200 mounted on the seismic isolators 150. For example, as shown, where the lower building structure 102-1 includes containment pit 102-11, the seismic isolators 150 may extend in a circumferential pattern at least partially around the top opening 102-110 of the containment pit 102-11. As shown, the circumferential pattern in which the seismic isolators 150 extend may be a circular pattern, but example embodiments are not limited thereto. For example, the circumferential pattern may be a polygon pattern having a shape of any polygon, including a square pattern, a rectangular pattern, a nonagon pattern, a decagon pattern, or the like. In another example, the circumferential pattern may be a pattern having a shape of any non-polygon, non-circular shape, including for example an oval pattern, an ellipse pattern, or the like.

Still referring to FIGS. 1A-1H, the nuclear plant 100 may include a reactor cooling system 130, which may be a Reactor Vessel Auxiliary Cooling System (RVACS). The reactor cooling system 130 may be configured to circulate a working fluid through one or more circulation paths 236 to remove heat from the reactor building 102. The reactor cooling system 130 may be configured to circulate working fluid 240 (e.g., air), drawn from the ambient environment 123, through one or more circulation paths 236 extending through the reactor building 102 and further extending through one or more portions of the MIRSS assembly 200 to absorb heat from at least the reactor enclosure system 140 and to be discharged from the reactor building to remove the absorbed heat from the reactor building 102. The reactor cooling system 130 may circulate such working fluid 240 to remove residual heat from the reactor enclosure system 140. The reactor cooling system 130 may circulate such working fluid 240 to provide supplementary cooling of the reactor enclosure system 140 in addition to a separate primary coolant loop (not shown) that may circulate a coolant (e.g., a liquid metal coolant, water coolant, etc.) within the reactor enclosure system 140 to remove heat from the nuclear reactor 142. The reactor cooling system 130 may circulate such working fluid 240 to provide auxiliary and/or emergency cooling of the nuclear reactor 142, primary vessel 146, guard vessel 144, reactor enclosure system 140, or the like in an emergency condition. It will be understood that the one or more circulation paths 236 include, and/or are defined by, conduits and paths of the reactor cooling system 130 collectively extending from the intake system 112 to the exhaust system 122 via the riser annulus 224 and through which the working fluid 240 circulates to remove heat from at least the reactor enclosure system 140. While the working fluid 240 is shown as being circulated from the ambient environment 123, such that the working fluid 240 may be air, it will be understood that example embodiments are not limited thereto, and in some example embodiments the working fluid 240 may be any suitable heat-transfer fluid (e.g., liquid, gas, etc.), and the ambient environment 123 may be a reservoir and/or heat sink structure configured to act as a working fluid heat sink.

In some example embodiments, the reactor cooling system 130 is configured to define the various reactor cooling system circulation paths 236 through which working fluid 240 is circulated to configure the working fluid circulation through the reactor cooling system 130 to be "natural" or "density-driven," so that the circulation of working fluid through the reactor cooling system 130 may be maintained without operation of working fluid moving machines and/or forced-induction machines (e.g., air moving machines, fans, etc.). For example, still referring to FIGS. 1A-1H, a reactor cooling system 130 may include a downcomer annulus 214 that is configured to direct a working fluid 240 drawn from an ambient environment 123 to flow vertically downwards, through the downcomer annulus 214, to a location that is axially at least partially beneath the reactor enclosure system 140 via a bottom opening 214-B of the downcomer annulus. The reactor cooling system 130 may further include a riser annulus 224 that is concentrically arranged (e.g., coaxial) with, and radially inwards from the downcomer annulus 214 around the reactor enclosure system 140 and which is at least partially defined by an outer sidewall surface 140-S of the reactor enclosure system 140, where the respective bottom openings 214-B and 224-B of the downcomer annulus 214 and the riser annulus 224 are in fluid communication with each other (e.g., via an air sink 234 that is located beneath, and open to both of, the downcomer annulus 214 and the riser annulus 224). As described herein, the bottom opening 214-B of the downcomer annulus 214 and the bottom opening 224-B of the riser annulus 224 that are in fluid communication with each other are part of a common (same) open flow path, such that working fluid 240 may flow freely from the downcomer annulus 214 to the riser annulus 224 via the respective bottom openings 214-B and 224-B thereof. As described herein, the bottom opening 214-B of the downcomer annulus 214 may be referred to interchangeably as the downcomer annulus exit, and the bottom opening 224-B of the riser annulus 224 may be referred to interchangeably as the riser annulus inlet. The reactor cooling system 130 may be configured to direct the working fluid 240 to flow from the bottom opening 214-B of the downcomer annulus 214 to flow upwards through the bottom 224-B of the riser annulus 224 to absorb heat in the riser annulus 224.

In some example embodiments, the collector cylinder 210 may absorb heat radiated from the reactor enclosure system 140 (e.g., via radiant heat transfer from the primary vessel 146 to the collector cylinder 210). It will be understood that the heat transfer to the collector cylinder 210 may not include any convective heat transfer from the reactor enclosure system 140 (e.g., the guard vessel 144) to the collector cylinder 210 via the working fluid 240, as the radiant heat transfer from the reactor enclosure system 140 to the collector cylinder 210 may establish a temperature gradient that is directed from the collector cylinder 210 to the working fluid 240. Thus, the collector cylinder 210 may be configured to serve as a heat transfer surface (e.g., the inner cylindrical surface 212 of the collector cylinder 210 may serve as a convective heat transfer surface) for heat transfer to the working fluid 240 in the riser annulus 224, in addition to the reactor enclosure system 140 (e.g., outer sidewall surface 140-S of the reactor enclosure system 140) serving as a heat transfer surface to the working fluid 240 in the riser annulus 224, thereby increasing the collective heat transfer surfaces in the riser annulus 224 to facilitate improved heat transfer to the working fluid 240. As a result, in some example embodiments, the working fluid 240 in the riser annulus 224 may absorb heat (e.g., via convective heat transfer) from both the reactor enclosure system 140 (e.g., from the guard vessel 144) via the outer sidewall surface 140-S of the reactor enclosure system 140 at least partially defining an inner diameter of the riser annulus 224 (e.g., via the outer sidewall surface 144-S of the guard vessel 144) and from the collector cylinder 210 (e.g., via the inner cylindrical surface 212 at least partially defining an outer diameter of the riser annulus 224).

Working fluid 240 that is received into the reactor cooling system 130 from the ambient environment 123 and directed through the downcomer annulus 214 to at least the bottom opening 214-B of the downcomer annulus 214 is identified herein as cold working fluid 242, also referred to herein interchangeably as intake air, cold air, ambient air, intake working fluid, ambient working fluid, or the like. Working fluid 240 that has absorbed heat in the riser annulus 224 (e.g., from the reactor enclosure system 140 and from the collector cylinder 210) is identified herein as hot working fluid 244, also referred to herein interchangeably as exhaust air, hot air, heated air, exhaust working fluid, heated working fluid, or the like. The working fluid 240 that has absorbed heat in the riser annulus 224 (e.g., the hot working fluid 244) may "rise" upwards through the riser annulus 224, according to a change (e.g., a reduction) in air density based on the working fluid 240 having absorbing heat in the riser annulus 224, to a top 224-U of the riser annulus 224 (also referred to interchangeably as a top region of the riser annulus 224) and further towards one or more conduits (e.g., one or more exhaust ducts 216) that are in fluid communication between the top 224-U of the riser annulus 224 and the ambient environment 123. The hot working fluid 244 may "rise" out of the reactor cooling system 130 via the one or more exhaust ducts 216, due to the reduced density of the heated hot working fluid 244 in relation to the colder working fluid 240 entering the bottom opening 224-B of the riser annulus 224 (e.g., the cold working fluid 242).

The vertical upwards flow of working fluid 240 through the top 224-U of the riser annulus 224, and out of the riser annulus 224 to the ambient environment 123 via the one or more exhaust ducts 216, may be induced by and/or may cause additional cold working fluid 242 to be drawn to the bottom of the riser annulus 224 to replace the "rising" hot working fluid 244 and thus to absorb additional heat in the riser annulus 224 (e.g., from respective exposed surfaces 140-S and 212 of the reactor enclosure system 140 and the collector cylinder 210 in the riser annulus 224). As a result, the circulation of working fluid 240 through the reactor cooling system 130 may be induced and maintained without forced induction of such circulation (e.g., by a fan in the reactor cooling system 130). It will be understood that, in some example embodiments, at least a portion of the reactor cooling system 130 (e.g., the intake system 112, exhaust system 122, or the like) may include an air moving device (e.g., a fan) configured to at least partially induce flow of working fluid 240 through a circulation path 236 of the reactor cooling system 130.

As shown, the reactor cooling system 130 may include seismically non-isolated portions, including a seismically non-isolated intake portion 110 that is configured to direct cold working fluid 242 from the ambient environment 123 to the bottom opening 224-B of the riser annulus 224 via the downcomer annulus 214 and a seismically non-isolated exhaust portion 120 that is configured to direct hot working fluid 244 from the MIRSS assembly 200 to the ambient environment 123. The seismically non-isolated intake portion 110 includes an intake system 112 (e.g., an opening that is open to the ambient environment 123), one or more seismically non-isolated intake conduits 116 that are configured to direct cold working fluid 242 from the ambient environment 123 to the downcomer annulus 214, and the downcomer annulus 214 itself. The seismically non-isolated intake portion 110 may further include one or more intake conduits 118 configured to couple one or more seismically non-isolated intake conduits 116 to the downcomer annulus 214, but example embodiments are not limited thereto. The seismically non-isolated exhaust portion 120 may include one or more seismically non-isolated exhaust conduits 126 and an exhaust system 122 (e.g., a chimney) that is open to the ambient environment 123.

As further described herein, at least a portion of the reactor cooling system 130 may include a seismically isolated exhaust portion 232 that is located in fluid communication between the seismically non-isolated intake portion 110 and the seismically non-isolated exhaust portion 120, which may include one or more seismically isolated conduits which are at least partially defined by structures and/or surfaces of a seismically isolated assembly 190 that includes the MIRSS assembly 200 and the reactor enclosure system 140. The reactor cooling system 130 may include one or more conduits, passages or the like which are defined between seismically isolated and seismically non-isolated structures, including intake conduit 118 (which as shown in FIGS. 1A-1H may be an intake annulus) and the downcomer annulus 214. It will be understood that, in some example embodiments, one or more of the conduits 116, 118, 126, the intake system 112, and/or the exhaust system 122 may be omitted from the reactor cooling system 130.

Still referring to FIGS. 1A-1H, the nuclear plant 100 includes a plurality of seismic isolators 150 that are coupled to (e.g., mounted on, structurally supported on, etc.) the reactor building 102 and thus are configured to structurally support one or more structural loads on the reactor building 102. As shown, the reactor building 102 may include a lower building structure 102-1 having one or more structural support surfaces 102-12, and the seismic isolators 150 may be mounted on the one or more structural support surfaces 102-12 so that the seismic isolators 150 are configured to structurally support one or more structural loads on the lower building structure 102-1 via the one or more structural support surfaces 102-12. The seismic isolators 150 may be coupled to (e.g., mounted on) the lower building structure 102-1 based on metal (e.g., steel) elements of the seismic isolators 150 being at least partially embedded in concrete structures of the lower building structure 102-1, but example embodiments are not limited thereto. For example, the seismic isolators 150 may be secured, fixed, etc. to one or more reinforced concrete pedestals that include reinforced steel structures embedded in a concrete of the lower building structure 102-1 via one or more structural support surfaces 102-12. The seismic isolators 150 are configured to structurally support structural loads and are further configured to enable movement of the supported structural loads (e.g., three-dimensional translation and/or rotational movement) in relation to the structural support surfaces 102-12 upon which the seismic isolators 150 are mounted. As a result, as shown in FIGS. 1A-1H, the seismic isolators 150 are configured to seismically isolate the supported structural loads from the reactor building 102.

The seismic isolators 150 may include any known seismic isolators, which may be configured to enable two-dimensional or three-dimensional movement (e.g., translational and/or rotational movement) of a supported structure independently of the structure upon which the seismic isolators are mounted. Such seismic isolators may include, in some example embodiments, one or more spring structures, one or more seismic fluid damper devices, or the like.

Still referring to FIGS. 1A-1H and 2A-2G, the nuclear plant 100 may include a Modular Isolated Reactor Support System (MIRSS) assembly 200 including a annular structure 230 that is configured to structurally support the reactor enclosure system 140 on the seismic isolators 150 to define a seismically isolated assembly 190 and is further configured to at least partially define flow passages of the reactor cooling system 130, at least partially define a reactor head access area (HAA) 292 above the reactor enclosure system 140 and seal the HAA 292 from flow passages of the reactor cooling system, and, in some example embodiments, to further provide shielding (e.g., radiation shielding and/or thermal shielding) of various structures, equipment, and/or spaces that are external to the seismically isolated assembly 190. It will be understood that descriptions herein refer to a MIRSS assembly 200 for simplicity, but any MIRSS assembly 200 or Modular Isolated Reactor Support System (MIRSS) assembly 200 as described herein may be any reactor support assembly according to any of the example embodiments, including either of a Modular Isolated Reactor Support System (MIRSS) assembly that is at least partially comprised of a plurality of structures (e.g., a plurality of MIRSS modules) coupled together or a non-modular Isolated Reactor Support System (IRSS) that is at least partially assembled as a single structure without coupling pre-fabricated modules together.

In some example embodiments, the MIRSS assembly 200 may enable an approach to nuclear plant 100 construction that has improved practicality (e.g., reduced construction costs, time expenditures, complexity, or the like). based on being modular, simple, and cost-effective. The MIRSS assembly 200 may comprise a support structure, also referred to herein as an annular structure 230, that is configured to be seismically isolated from the reactor building 102 in which the nuclear reactor 142 is housed (e.g., enclosed and structurally supported) and is further configured to structurally support the reactor enclosure system 140 (e.g., structurally support the entire structural load of the reactor enclosure system 140) on the seismic isolators that are coupled to the reactor building 102, thereby seismically isolating the reactor enclosure system 140 from the reactor building 102. Such an annular structure 230 may be a steel structure comprising and defined by steel structural members (e.g., beams, plates, girders, etc.) which may be coupled together via known techniques (e.g., welding, riveting, etc.), but example embodiments are not limited thereto. In some example embodiments, the annular structure 230 may include different materials (e.g., carbon steel, stainless steel, etc.).

Since the MIRSS assembly 200 may be seismically isolated from the reactor building structure, the MIRSS assembly 200 may be configured to be assembled (e.g., constructed) independently from the reactor building 102 and subsequently installed (e.g., mounted) in the reactor building construction site (e.g., on seismic isolators 150 that are already mounted on building structures 102-1 and/or 102-2) as a single piece structure. Such assembly and installation of the MIRSS assembly 200 may significantly reduce, minimize, or preclude a support structure construction process that includes embedding reinforcement steel of a cylindrical reactor support structure in concrete of reactor building structure(s) 102-1, 102-2, etc., thereby reducing structural weight of the seismically isolated reactor support structure and reducing cost and/or complexity of construction thereof. The MIRSS assembly 200 may be constructed in parallel with, and independently from, the reactor enclosure system 140. For example, the reactor enclosure system 140, the collector cylinder 210, and the divider wall 222 may be constructed (e.g., fabricated) in parallel. Once assembled, the MIRSS assembly 200 and reactor enclosure system 140 may be lifted as one unit (e.g., as a single-piece structure) and placed into the containment pit 102-11 such that the MIRSS assembly 200 rests on, and is structurally supported by (e.g., solely structurally supported by) the seismic isolators 150. In some example embodiments, the MIRSS assembly 200 may be lifted as one unit and mounted on the seismic isolators 150 independently of the reactor enclosure system 140, which may be subsequently lifted and mounted onto the already-mounted MIRSS assembly 200. In some example embodiments, a portion of the reactor enclosure system 140 (e.g., the guard vessel 144) may be mounted on the MIRSS 200 prior to the MIRSS assembly 200 being mounted on the seismic isolators 150, and a remainder of the reactor enclosure system 140 (e.g., the primary vessel 146, the nuclear reactor 142, etc.) may be coupled to the mounted portion of the reactor enclosure system 140, to complete construction of the reactor enclosure system 140, subsequent to the MIRSS assembly 200 being mounted on the seismic isolators 150. The MIRSS assembly 200 may be configured to enable a lightweight lift due to a lack of shielding material 390 in at least the cylindrical reactor support structure 202 at this step in the assembly process. Once the MIRSS assembly 200 is placed in the desired location (e.g., mounted on the seismic isolators 150), the shielding material 390 can be supplied into the cylindrical reactor support structure 202 (e.g., into one or more shielding chambers 392 thereof). At this point at least a portion of the reactor enclosure system 140 and internal elements thereof (e.g., the guard vessel 144, the primary vessel 146, the nuclear reactor 142, the head 148, etc.) can be lifted into place or assembled within the reactor building 102. In some example embodiments, at least some of the shielding material 390 may be added, supplied, incorporated, or the like into the MIRSS assembly 200 prior to the MIRSS assembly 200 being mounted on the seismic isolators 150 (e.g., prior to the MIRSS assembly 200 being lifted as one unit and mounted on the seismic isolators 150). For example, in some example embodiments, the first lower shielding material 328-1 (e.g., thermal shielding material) may be installed as part of the MIRSS assembly 200 during the construction of the MIRSS assembly 200, prior to the MIRSS assembly 200 being lifted as a single unit and mounted on the seismic isolators 150. In another example, in some example embodiments, the upper shielding material 318 may be supplied into the interior 204 of the cylindrical reactor support structure 202, to partially or entirely fill the portions of such interior 204 not occupied by the exhaust ducts 216, during the construction of the MIRSS assembly 200, prior to the MIRSS assembly 200 being lifted as a single unit and mounted on the seismic isolators 150. In some example embodiments, at least some of the shielding material 390 may be pumped into one or more shielding chambers 392 via a boom pump, but example embodiments are not limited thereto. For example, in example embodiments where the upper shielding material 318 may be steel balls that may be supplied into the interior 204 of the cylindrical reactor support structure 202, the upper shielding material 318 may be placed into the interior 204, dumped into the interior 204 as a bulk material, or otherwise supplied into the interior 204 via mechanisms other than a pump.

As shown in at least FIGS. 1A-1H and 2A-2G, the MIRSS assembly 200 may include structural members 302, which may be steel structural members (e.g., plate steel, steel girders, steel beams, etc.), where steel may be understood herein to include stainless steel, that may collectively establish and/or define at least a cylindrical reactor support structure 202, a divider wall 222 having an outer cylindrical surface 223, a collector cylinder 210 having an inner cylindrical surface 212, an HAA seal 294, and/or one or more shielding chambers 392 configured to hold one or more shielding materials 390 therein.

As further shown, the MIRSS assembly 200 may include exhaust ducts 216 that extend through an interior of the cylindrical reactor support structure 202 from the collector cylinder 210, for example to establish fluid communication from the collector cylinder 210 to a radially outward exterior of the MIRSS assembly 200 via an interior 218 of the MIRSS assembly 200. In some example embodiments, the MIRSS assembly 200 may include exhaust manifold structures 610 that may be coupled to the annular structure 230 (e.g., to the cylindrical reactor support structure 202) and may include one or more exhaust duct structures 612 configured to at least partially define one or more exhaust ducts 216 (e.g., define at least one or more duct sidewalls of the one or more exhaust ducts 216) based on the exhaust manifold structure 610 being coupled to the annular structure 230. However, example embodiments are not limited thereto, and in some example embodiments the MIRSS assembly 200 may not include any separate exhaust manifold structures 610 that are coupled to the annular structure 230, and the exhaust ducts 216 may be defined by structural members 302 of the cylindrical reactor support structure 202. In some example embodiments, the seismic isolators 150 may be further considered to be a part of the MIRSS assembly 200, but example embodiments are not limited thereto. In some example embodiments, the seismic isolators 150 are considered to be separate from the MIRSS assembly 200. Once assembled, the MIRSS assembly components comprising the MIRSS assembly 200 are configured to collectively operate as one unit at normal and in seismic conditions.

When the MIRSS assembly 200 is fully assembled (e.g., constructed) and mounted on the seismic isolators 150, the MIRSS assembly 200 may be configured to act as one unit (e.g., as a single-piece structure) and therefore may be configured to enable a controlled movement of the seismically isolated assembly 190 (including the collector cylinder 210, reactor enclosure system 140, divider wall 222, cylindrical reactor support structure 202, and floor structure 290) independently of the reactor building 102 and the HAA 292 during a seismic event. The MIRSS assembly 200 is configured to enable a close tolerance (e.g., a small radial thickness, annular diameter, etc. of the riser annulus 224) between the reactor enclosure system 140 and the collector cylinder 210 (e.g. between the outer sidewall surface 140-S of the reactor enclosure system 140 and the inner cylindrical surface 212 of the collector cylinder 210), based on both of the reactor enclosure system 140 and the collector cylinder 210 being included in the seismically isolated assembly 190. As a result, a radial thickness of the riser annulus 224 may be fixed or substantially fixed even during seismically-induced movement of the seismically isolated assembly 190 in relation to the reactor building 102. Such close tolerance may in turn improve heat removal by the reactor cooling system 130 via increased hot working fluid 244 velocity (e.g., vertical flow velocity) in the riser annulus 224 and may enable the radial thickness of the downcomer annulus 214 to be increased without increasing the diameter of the containment pit 102-11. As a result, form losses from the cold working fluid 242 flowing down into the containment pit 102-11 may be reduced due to increased space to make the 90 degree turn from the bottom opening 214-B of the downcomer annulus 214 to the bottom opening 224-B of the riser annulus 224. In addition, such improved heat removal by the reactor cooling system 130 may enable the nuclear reactor 142 to be operated at a greater operating temperature and thus with improved operating performance and/or efficiency. Furthermore, because the MIRSS assembly 200 may comprise metal structural members 302, including for example steel structural members 302, the nuclear plant 100 may be configured to operate the nuclear reactor 142 at a greater average operating temperature than nuclear plants where the riser annulus 224 and/or exhaust ducts 216 are at least partially defined by a reactor support structure that at least partially structurally supports the reactor enclosure system 140 on the seismic isolators 150 and comprises concrete and/or reinforced concrete.

The MIRSS assembly 200 is configured to significantly reduce overall nuclear plant 100 construction costs. For example, a major driving cost in current nuclear plant 100 design is the construction which includes but not limited to, excavation, concrete, rebar, and labor, due to nuclear plants 100 utilizing portions of the lower and/or upper building structures 102-1 and/or 102-2 of the reactor building 102 to provide seismic isolation (referred to herein as building isolation). Building isolation configurations can be expensive to construct and analyze. Seismic isolators 150 that are placed under (e.g., which structurally support) the entire reactor building 102 or under a floating containment pit 102-11 are very expensive to construct and difficult to access for maintenance and replacement. The MIRSS assembly 200 mitigates such costs based on enabling the seismic isolators 150 to be mounted on one or more structural support surfaces 102-12 that are above the containment pit 102-11, thereby positioning the seismic isolators 150 above the coolant level in the reactor enclosure system 140 and thereby reducing the risk of damage to the seismic isolators 150 due to a loss of coolant accident (LOCA) event.

The MIRSS assembly 200 is configured to significantly reduce the seismically induced stresses on all reactor enclosure system 140 components (e.g., the nuclear reactor 142, the guard vessel 144, the primary vessel 146, and the head 148). This reduces cost in engineering, materials, and fabrication for the most expensive components and equipment in a nuclear plant 100. These components represent a significant share of nuclear plant cost. The MIRSS assembly 200 may further be configured to reduce relative motion between the reactor enclosure system 140 and the collector cylinder 210 (e.g., between at least the guard vessel 144 and the collector cylinder 210) during seismic events, based on both the collector cylinder 210 and the reactor enclosure system 140 being included in the seismically isolated assembly 190. As a result, the MIRSS assembly 200 is configured to reduce, minimize, or prevent contact and impact damage between the reactor enclosure system 140 and the collector cylinder 210 (e.g., to reduce, minimize, or prevent contact and impact damage between the guard vessel 144 and the collector cylinder 210) and further may be configured to reduce, minimize, or prevent a closure in the riser annulus 224 and thus may reduce, minimize, or prevent the likelihood of reactor cooling system 130 operation being inhibited due to such closure. In addition, the MIRSS assembly 200 may be configured to reduce relative motion between the guard vessel 144 and the primary vessel 146 of the reactor enclosure system 140 during seismic events, based on the reactor enclosure system 140 being included in the seismically isolated assembly 190. As a result, the MIRSS assembly 200 is configured to reduce, minimize, or prevent contact and impact damage between the guard vessel 144 and the primary vessel 146 of the reactor enclosure system 140 and further may be configured to reduce, minimize, or prevent a closure in the annular gap between guard vessel 144 and the primary vessel 146 and thus may reduce, minimize, or prevent the likelihood of reactor cooling system 130 operation being inhibited due to such closure.

As shown in FIGS. 1A-1H and 2A-2G, the collector cylinder 210 of the MIRSS assembly 200 defines a cylindrical space that may accommodate at least a portion of the reactor enclosure system 140 (e.g., at least a portion of the guard vessel 144). As further shown, the MIRSS assembly 200 includes a cylindrical reactor support structure 202 that is configured to structurally support the reactor enclosure system 140, from a top portion 140-P of the reactor enclosure system 140 (which may be a part of a radial edge of the head 148 and/or the guard vessel 144) proximate to a top surface 140-U thereof (which may be a part of the upper surface 148-U of the head 148). As a result, the cylindrical reactor support structure 202 is configured to surround the reactor enclosure system 140 mounted thereon, so that the supported reactor enclosure system 140 (e.g., at least the guard vessel 144) may at least partially "hang" from the cylindrical reactor support structure 202 and at least partially extend downwards from the cylindrical reactor support structure 202 into the cylindrical space defined by the collector cylinder 210. In some example embodiments, a well seal 298, which may be an annular seal, may be located between the cylindrical reactor support structure 202 and the reactor enclosure system 140 (e.g., between the cylindrical reactor support structure 202 and the guard vessel 144) to seal the interface between the reactor enclosure system 140 and the cylindrical reactor support structure 202 and to seal the top 224-U of the riser annulus 224, that is defined between the collector cylinder 210 and the reactor enclosure system 140 (e.g., between the collector cylinder 210 and the guard vessel 144). The well seal 298 may thus seal (e.g., isolate) the top 224-U of the riser annulus 224, and thus at least a portion of the circulation path 236 of the reactor cooling system 130, from the reactor head access area (HAA) 292 that is located above the reactor enclosure system 140 and the MIRSS assembly 200. In some example embodiments, the well seal 298 may be considered to be a portion of the MIRSS assembly 200, including for example a portion of the cylindrical reactor support structure 202. The well seal 298 may comprise (partially or entirely) a flexible material, for example Inconel 625, Inconel 718, Stainless Steel 316, Stainless Steel 304, a fluoroelastomer material (which may be referred to as a fluoroelastomer seal material), a fluorocarbon elastomer (FKM) polymer material, or the like.

As shown in FIGS. 1A-1H and as further shown in FIG. 2G, the MIRSS assembly 200 is configured to be structurally supported, at the cylindrical reactor support structure 202 (e.g., via one or more structural members 302 comprising the cylindrical reactor support structure 202), on the seismic isolators 150 which are themselves coupled to the reactor building 102 on the structural support surface 102-12 of the lower building structure 102-1. As a result, the cylindrical reactor support structure 202 is configured to transfer the entire structural load (e.g., the entire weight) of the MIRSS assembly 200 and the reactor enclosure system 140 supported therein to the reactor building 102 (e.g., the lower building structure 102-1) via the seismic isolators 150. In some example embodiments, and as shown in FIGS. 1A-1H, the entire structural load (e.g., the entire weight) of the MIRSS assembly 200 may be structurally supported by the seismic isolators 150. As a result, the MIRSS assembly 200 and the reactor enclosure system 140 may be seismically isolated from the reactor building 102 by the seismic isolators 150 and thus may be configured to move together with each other and independently of the reactor building 102. Accordingly, the MIRSS assembly 200 and the reactor enclosure system 140 may collectively define a seismically isolated assembly 190 that is seismically isolated from the reactor building 102.

As shown in FIGS. 1A-1H and FIGS. 2A-2G, the divider wall 222 of the MIRSS assembly 200 has an outer cylindrical surface 223 that may face an opposing surface of the reactor building 102 (e.g., inner containment pit surface 102-11S of the containment pit 102-11). Therefore, the outer cylindrical surface 223 of the divider wall 222 may, together with the opposing surface of the reactor building 102, define the downcomer annulus 214 extending vertically between the divider wall 222 of the MIRSS assembly 200 and the reactor building 102. As further shown, the collector cylinder 210 has an inner cylindrical surface 212 that may face an opposing outer sidewall surface 140-S of the reactor enclosure system 140. Therefore, the inner cylindrical surface 212 may, together with the opposing outer sidewall surface 140-S, at least partially define the riser annulus 224 (e.g., define at least the outer and inner annular diameters, respectively, of the riser annulus 224) extending vertically between the collector cylinder 210 of the MIRSS assembly 200 and the reactor enclosure system 140. It will be understood that the outer sidewall surface 140-S of the reactor enclosure system 140 may be an outer sidewall surface 144-S of the guard vessel 144 of the reactor enclosure system 140, but example embodiments are not limited thereto. For example, in some example embodiments where the reactor enclosure system 140 does not include any guard vessels, the outer sidewall surface 140-S of the reactor enclosure system 140 may be an outer sidewall surface of a primary vessel 146 of the reactor enclosure system 140.

As still further shown, the MIRSS assembly 200 may further be configured to define the air sink 234 located beneath the respective bottom openings 224-B and 214-B of the riser annulus 224 and the downcomer annulus 214 (e.g., within the containment pit 102-11 beneath the MIRSS assembly 200). The air sink 234 may be open to both of the bottom openings 224-B and 214-B. As a result, the downcomer annulus 214 and the riser annulus 224 may be isolated from each other in the radial direction from the central, longitudinal axis of the MIRSS assembly 200, the reactor enclosure system 140, and the like and may be further in open fluid communication with each other via the respective bottom openings 214-B and 224-B and the air sink 234.

As shown in at least FIGS. 1A-1H, the reactor cooling system 130 may include seismically non-isolated intake conduits 116 having respective openings 116-O that are open to the downcomer annulus 214, either directly or via an interposing conduit such as one or more intake conduits 118 which may at least partially circumferentially (e.g., azimuthally) surround, and thus may be at least partially defined by, a lower portion of the cylindrical reactor support structure 202 (e.g., as an intake annulus) and may be axially between the cylindrical reactor support structure 202 and the structural support surface(s) 102-12. As a result, the MIRSS assembly 200 may be configured to direct cold working fluid 242 drawn into the reactor cooling system 130 (e.g., via intake system 112 and one or more conduits 116) into a top opening 214-U of the downcomer annulus 214 to flow vertically downwards to a bottom opening 214-B of the downcomer annulus 214 defined between the divider wall 222 and the reactor building 102.

As further shown, heated hot working fluid 244 that "rises" vertically through the riser annulus 224 may rise to a top 224-U of the riser annulus 224 that is adjacent to a top boundary of the riser annulus 224 (e.g., due to displacement at the bottom opening 224-B of the riser annulus 224 by incoming additional cold working fluid 242). As further shown, the MIRSS assembly 200 may include one or more structural members 302 (e.g., steel structural members) that may singularly or collectively define one or more inlet openings 216-O1 at the top 210-U of the collector cylinder 210 that are open (e.g., directly open) to the top 224-U of the riser annulus 224. The one or more structural members 302 of the MIRSS assembly 200 may singularly or collectively define one or more outlet openings 216-O2 in an outer sidewall surface 200-S of the MIRSS assembly 200 (which may be an outer circumferential sidewall of the cylindrical reactor support structure 202). The one or more structural members 302 of the MIRSS assembly 200 may at least partially define one or more exhaust ducts 216 that each extend through an interior 218 of the MIRSS assembly 200 from the collector cylinder 210, for example between one or more inlet openings 216-O1 and one or more outlet openings 216-O2. The MIRSS assembly 200 may be configured to direct heated hot working fluid 244 that rises through the riser annulus 224 to the top 224-U thereof to further flow radially from the top 224-U of the riser annulus 224 at the top 210-U of the collector cylinder 210 and through the interior 218 of the MIRSS assembly 200 (e.g., through the interior 204 of the cylindrical reactor support structure 202) to an exterior of the MIRSS assembly 200 via one or more exhaust ducts 216. As shown, the one or more exhaust ducts 216 may be azimuthally spaced apart around the collector cylinder 210 so as to be configured to enable relatively uniform vertical flow of hot working fluid 244 upwards and out of the top 224-U of the riser annulus 224, thereby mitigating heat buildup in the riser annulus 224 and to improve uniformity of cooling of the reactor enclosure system 140 (e.g., improve uniformity of cooling of at least the guard vessel 144) in the axial and/or azimuthal directions. It will be understood that the interior 218 of the MIRSS assembly 200 may comprise one or more enclosures, cavities, or the like defined by an inner surface of one or more structural members 302 (e.g., beams, plates, girders, or the like, which may be steel beams, steel plates, steel girders, or the like) of the MIRSS assembly 200. It will be understood that "azimuthal" or "azimuthally" may be interchangeably referred to herein as "circumferential" or "circumferentially," respectively.

Still referring to FIGS. 1A-1H and 2A-2G, the portions of the reactor cooling system 130 that are included within and/or defined within the seismically isolated assembly 190 may be considered to be a seismically isolated portion of the reactor cooling system 130, while other portions of the reactor cooling system 130 located external to the seismically isolated assembly 190 may be considered to be seismically non-isolated portions of the reactor cooling system 130. As shown, the MIRSS assembly 200 may be configured to define and/or establish at least a seismically isolated exhaust portion 232 of the reactor cooling system 130, which is configured to be coupled in fluid communication with a seismically non-isolated exhaust portion 120 of the reactor cooling system 130. As shown, the seismically isolated exhaust portion 232 of the reactor cooling system 130 may include the riser annulus 224 and the exhaust ducts 216.

Figure 6A:
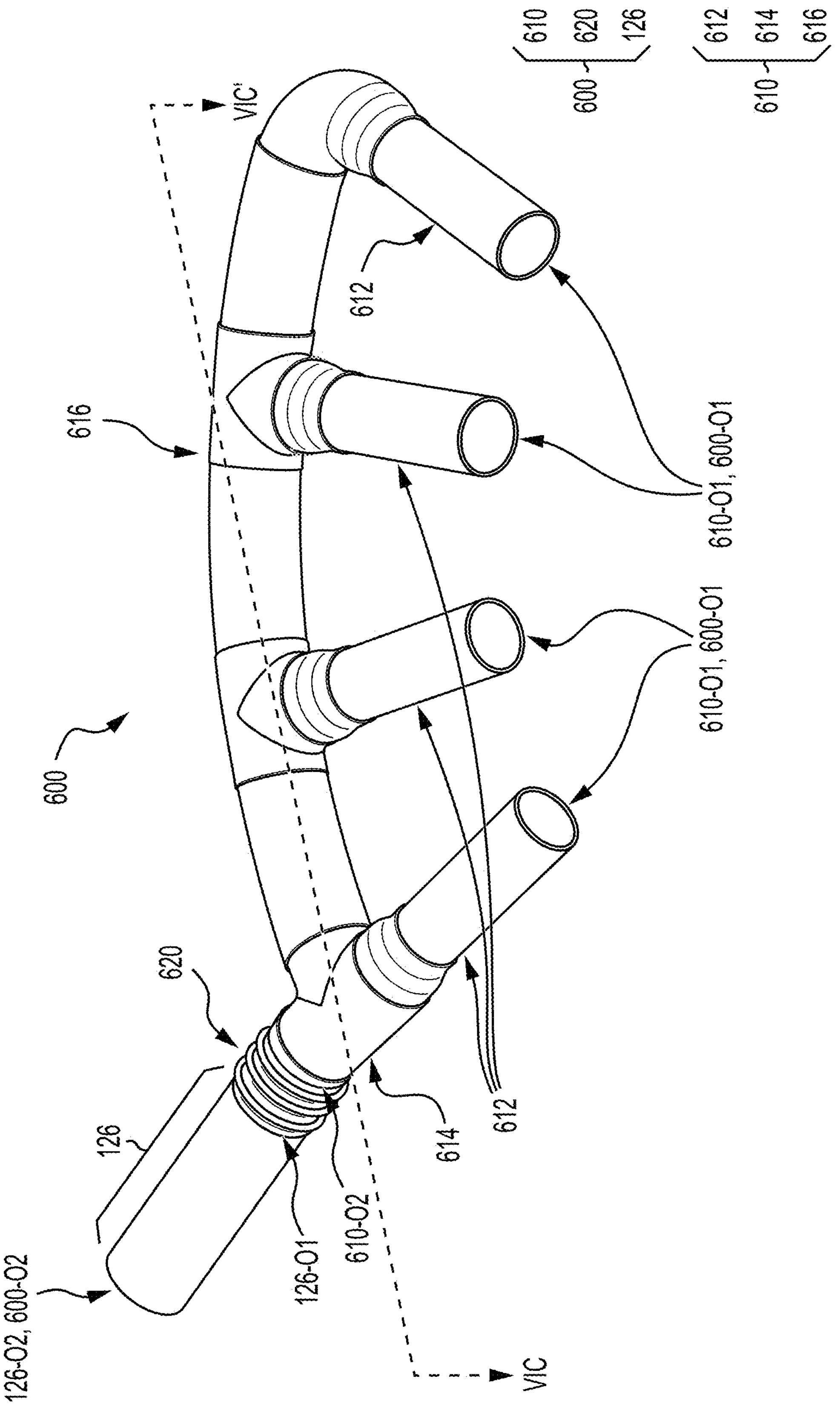
FIGS. 6A and 6B are perspective views of a MIRSS exhaust manifold structure, according to some example embodiments.
Figure 6B:
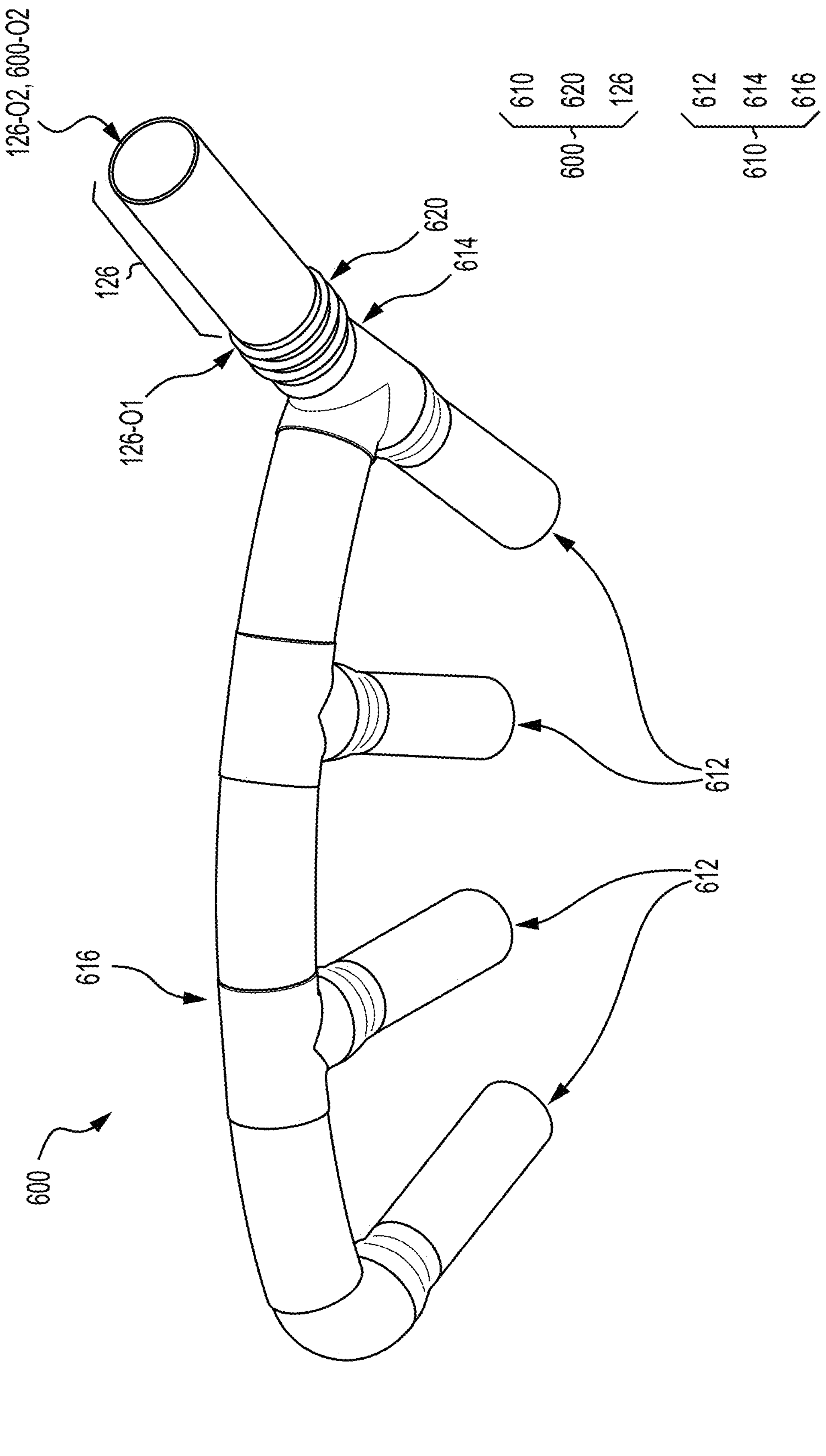
Figure 6C:
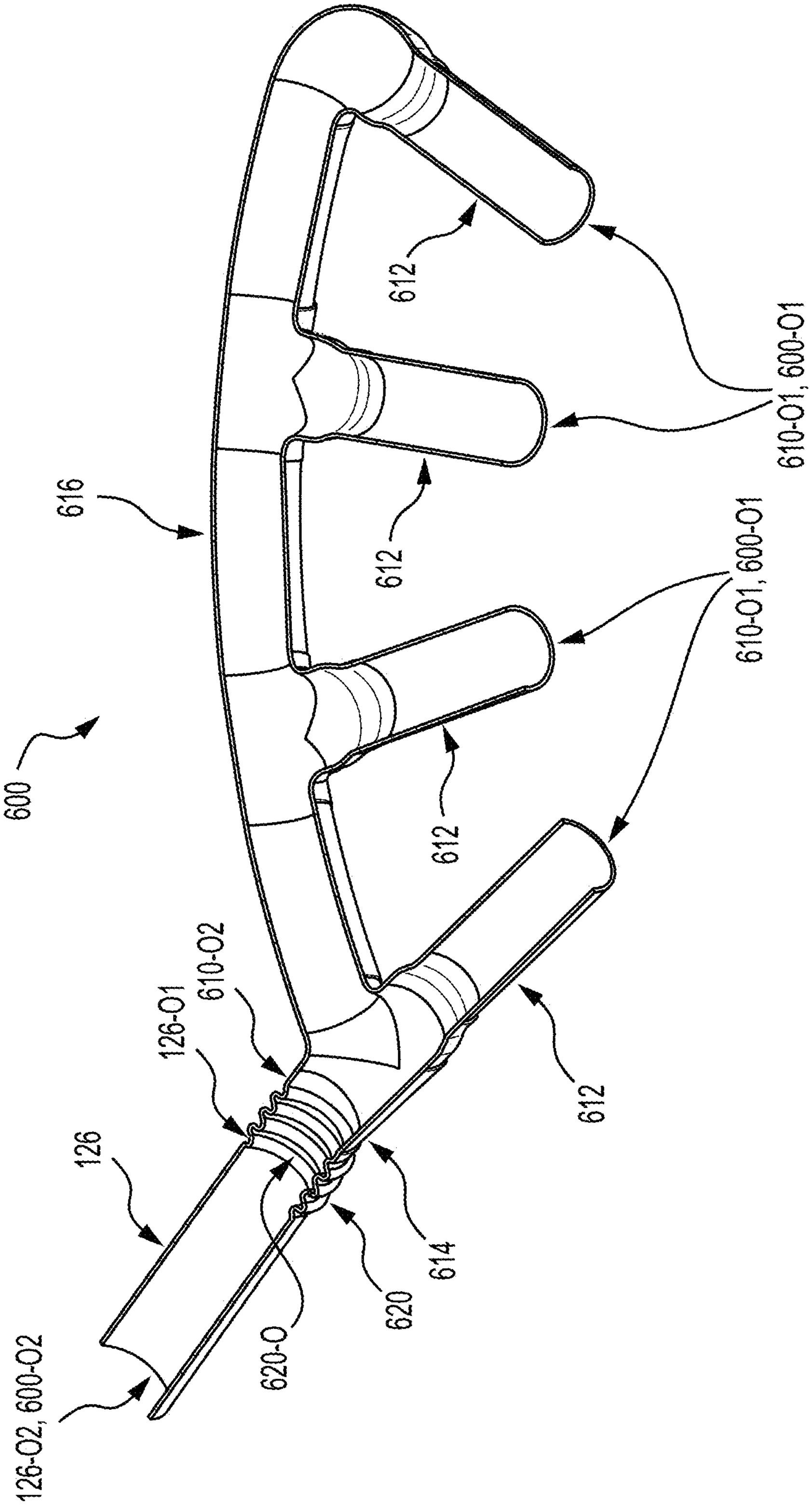
FIG. 6C is a cross-sectional perspective view of the MIRSS exhaust manifold structure of FIG. 6A along cross-sectional view line VIC-VIC' in FIG. 6A, according to some example embodiments.

Still referring to FIGS. 1A-1H and 2A-2G, and as further shown in FIGS. 6A-6C, the MIRSS assembly 200 may include exhaust manifold structures 610 which may be coupled with the annular structure 230 of the MIRSS assembly 200 and which may each be configured to define one or more exhaust ducts 216 and may be further configured to direct hot working fluid 244 out of the top 224-U of the riser annulus 224, via opening 610-O1 which may extend to and/or through opening 216-O1, and out of the MIRSS assembly 200, via an outlet opening 610-O2. The outlet opening 610-O2 of the exhaust manifold structure 610 may be coupled with an opening 126-O1 of a seismically non-isolated exhaust conduit 126 of a seismically non-isolated exhaust portion 120 of the reactor cooling system 130, for example via a flexible duct 620 coupled between openings 610-O2 and 126-O1 and thus establishing fluid communication between the collector cylinder 210 and the non-isolated exhaust portion 120 via one or more conduits of the MIRSS assembly 200. As shown, the seismically non-isolated exhaust conduit 126 may extend through the upper building structure 102-2 via one or more openings 102-2O therethrough, but example embodiments are not limited thereto. In some example embodiments, a flexible duct 620 that is coupled to at least one exhaust duct 216 of the MIRSS assembly 200 (e.g., based on being coupled to a second opening 610-O2 of an exhaust manifold structure 610) may at least partially extend through one or more openings 102-O2 in the upper building structure 102-2 to couple with an opening 126-O1 of a seismically non-isolated exhaust conduit 126.

As shown, the reactor cooling system 130 may define a circulation path 236 that includes at least the intake system 112, one or more seismically non-isolated intake conduits 116, intake conduit 118, downcomer annulus 214, air sink 234, riser annulus 224, exhaust ducts 216, the flexible duct 620, one or more seismically non-isolated exhaust conduits 126, and the exhaust system 122. It will be understood that in some example embodiments one or more of the seismically non-isolated intake conduits 116 and/or the seismically non-isolated exhaust conduits 126 may be omitted. For example, in some example embodiments the seismically non-isolated exhaust conduit 126 may couple directly between the flexible duct 620 and an exhaust system 122, such as a chimney or duct, configured to discharge hot working fluid 244 received from the seismically non-isolated exhaust conduit 126 directly to ambient environment 123.

Because portions of the reactor cooling system 130, and in particular the seismically non-isolated exhaust portion 120, may be located external to the seismically isolated assembly 190 and thus are not structurally supported by the seismic isolators 150 or the MIRSS assembly 200, the MIRSS assembly 200 may be lighter due to reduced structural loads that the cylindrical reactor support structure 202 supports on the seismic isolators, while the MIRSS assembly 200 may still be configured to maintain integrity of the reactor cooling system 130 even during movement of at least the seismically isolated exhaust portion 232 in relation to the seismically non-isolated exhaust portion 120 thereof. In addition, the structural load requirements of the seismic isolators 150 may also be reduced, due to the seismic isolators 150 not structurally supporting at least the seismically non-isolated exhaust portion 120 of the reactor cooling system 130. This may reduce nuclear plant component and construction costs. This may potentially further reduce structural support requirements of the underlying lower building structure 102-1 and/or foundation 170 in the reactor building 102, as the seismically non-isolated exhaust portion 120 (e.g., a chimney of the exhaust system 122) may be located at least partially external to the reactor building 102 and coupled thereto via seismically non-isolated conduits 116 and/or 126. Additionally, as shown, the configuration of the seismically isolated assembly 190 to move independently of the reactor building 102 enables the downcomer annulus 214 that is defined between the MIRSS assembly 200 and the reactor building 102 to deform and accommodate relative movement of the MIRSS assembly 200 in relation to the reactor building 102 while maintaining fluid communication between the intake openings 116-O and the riser annulus 224 via at least the downcomer annulus 214. As a result, the MIRSS assembly 200 may configure the reactor cooling system 130 to have improved reliability based on having resistance to closure of the circulation path 236 due to seismic events while also reducing overall structural loads on the MIRSS assembly 200 and the seismic isolators 150 by enabling portions of the reactor cooling system 130 to be seismically non-isolated and external to the seismically isolated assembly 190. Accordingly, the MIRSS assembly 200 and the seismic isolators 150 may have reduced structural load support requirements and thus may be lighter, thereby enabling the reactor building 102 to be lighter, further reducing reactor building construction costs and complexity.

The MIRSS assembly 200 may be configured to enable greater operational reliability of the reactor cooling system 130 based on significantly reducing baseline form losses. The MIRSS assembly 200 may be configured to enable greater reactor cooling system 130 event response reliability based on reducing, minimizing, or preventing relative motion between reactor cooling system 130 flow conduit surfaces (e.g., between the opposing inner cylindrical surface 212 and outer sidewall surface 140-S defining the riser annulus 224 which are coupled together and included within the seismically isolated assembly 190), which reduces the possibility of localized form losses that could inhibit reactor cooling system 130 operation.

In some example embodiments, the MIRSS assembly 200 may be configured to provide shielding, including radiation shielding (also referred to herein as radiological shielding) and/or thermal shielding, of various parts of the reactor building 102 and/or equipment therein, including for example the seismic isolators 150, from the reactor enclosure system 140 and the nuclear reactor 142 included therein. For example, still referring to FIGS. 1A-1H and 2A-2G, the MIRSS assembly 200 may include structural members 302 that define one or more shielding chambers 392 within an interior 218 of the MIRSS assembly 200 (e.g., within an interior 204 of the cylindrical reactor support structure 202, radially between the collector cylinder 210 and the divider wall 222, etc.). The one or more shielding chambers 392 may at least partially circumferentially surround the reactor enclosure system 140 (e.g., at least the guard vessel 144) and/or the collector cylinder 210 and may be configured to hold at least one shielding material 390 therein. For example, the MIRSS assembly 200 may include structural members 302 (e.g., beams, plates, girders, or the like, which may be steel beams, steel plates, steel girders, or the like) that collectively define one or more upper and/or lower shielding chambers 316 and/or 326 within an interior of the MIRSS assembly 200 which may accommodate (e.g., may be filled with) one or more shielding materials 390. Such one or more shielding materials 390 may include radiation shielding materials and/or thermal shielding materials (e.g., insulation). Such shielding materials may therefore provide shielding of elements located external to the MIRSS assembly 200 in the reactor building 102, including for example the seismic isolators 150, the reactor HAA 292, the downcomer annulus 214, the intake conduit 118, any combination thereof, or the like.

The MIRSS assembly 200 may be configured to improve ease of construction of a nuclear plant 100 based on simplifying the installation of shielding material 390 to provide shielding (e.g., radiation shielding and/or thermal shielding) of various structures and/or areas in the reactor building 102 from the nuclear reactor 142 and/or reactor enclosure system 140. For example, the MIRSS assembly 200 as initially installed in the reactor building 102 on the seismic isolators 150 may initially omit any shielding material 390 in one or more of the shielding chambers 392, so that the weight of the MIRSS assembly 200 during installation (e.g., mounting) on the seismic isolators 150 is relatively low due to the initial absence of shielding material 390 therein. The MIRSS assembly 200 may be hoisted (e.g., lifted) and lowered onto the seismic isolators 150 as a single-piece structure, which may simplify and improve the ease of the installation of the support structure provided by the MIRSS assembly 200 in the reactor building 102, for example thereby significantly reducing a requirement for embedding reinforcement steel in the concrete of the reactor building 102. In addition, the MIRSS assembly 200 may be configured to enable one or more shielding materials 390 to be installed in one or more of the shielding chambers 392 thereof subsequent to the MIRSS assembly 200 being mounted on the seismic isolators 150, for example based on the shielding materials 390 being pumped into the upper shielding chamber 316 defined by the structures of the cylindrical reactor support structure 202.

For example, such supply of shielding material 390 into one or more of the shielding chambers 392 of the MIRSS assembly 200, subsequent to the MIRSS assembly 200 being mounted on the seismic isolators 150, allows for a lightweight lift by crane to the reactor building, as the MIRSS assembly 200 may be at least partially installed (e.g., mounted) in the reactor building prior to the shielding material being installed (e.g., supplied) into the one or more shielding chambers of the MIRSS assembly 200, thereby resulting in the structure being installed by crane being significantly lighter due to absence of the shielding material in the structure during the crane installation (e.g., the crane lift), thereby simplifying installation of the structure in the reactor building. In addition, in some example embodiments, shielding material 390 may be supplied (e.g., pumped) into the lower shielding chambers 326 of the MIRSS assembly which may at least partially define a divider wall 222 between the concentric downcomer annulus 214 and riser annulus 224 to provide shielding from radiation (e.g., gamma and/or neutron radiation) and/or thermal radiation into the intake conduit 118 and/or the downcomer annulus 214.

It will be understood that, in some example embodiments, the MIRSS assembly 200 may be configured to accommodate different shielding materials 390 or combinations of shielding materials 390 in various shielding chambers 392 based upon one or more types of radiation to be shielded by the MIRSS assembly 200, which may be based on a reactor type of the nuclear reactor 142 in the reactor enclosure system 140 that is structurally supported by the MIRSS assembly 200. For example, where the nuclear reactor 142 is a liquid sodium reactor, at least some of the shielding materials 390 in the MIRSS assembly 200 (e.g., the upper shielding material 318) may be radiation shielding materials that are configured to shield against gamma radiation (e.g., gammas). In another example, where the nuclear reactor 142 is a molten salt reactor, at least some of the shielding materials 390 in the MIRSS assembly 200 (e.g., the upper shielding material 318) may be radiation shielding materials that are configured to shield against gamma radiation (e.g., gammas) in addition to neutron radiation (e.g., neutrons).

As described herein, a shielding material 390 (e.g., any of the upper shielding material 318, the first lower shielding material 328-1, or the second lower shielding material 328-2) may include radiation shielding material configured to provide radiation shielding (e.g., to absorb and/or reflect radiation emitted from a source to mitigate radiation penetration through the material), thermal shielding (e.g., thermal insulation, for example fiberglass, calcium silicate, or the like), or any combination thereof. A shielding material 390 may be configured to be poured into a shielding chamber 392 in order to occupy (e.g., fill) the shielding chamber 392. For example, a shielding material 390 may include high density concrete radiation shielding material, including or more of DENSECRETE®, SHIELDBLOCK®, and/or SHIELDGROUT®. In another example, a shielding material 390 may include one or more high density (heavyweight) aggregates, including high-density materials used to produce high-density concrete, including materials such as barite, ferrophosphorus, limonite, hematite, ilmenite, magnetite, goethite, steel punchings, and/or steel shots. In another example, a shielding material 390 may include basalt concrete, steel balls, stainless steel, depleted uranium, deleted uranium composite material, lead, lead composite material, lead metal shots (e.g., 2 mm diameter lead balls), and/or tungsten shots (tungsten balls). In another example, a shielding material 390 may include a chemically bonded oxide-phosphate ceramic having unique radiation shielding characteristics. In another example, a shielding material 390 may include a metal foam material which may include hollow metal spheres of one metal dispersed in a matrix which may comprise the same or a different metal (e.g., stainless steel spheres dispersed in a matrix of high-speed T15 steel, an alloy containing trace amounts of vanadium and tungsten), which may be poured to occupy a shielding chamber 392.

In some example embodiments, a thermal shielding material as described herein may include any material, structure, board, panel, or the like that is configured to provide thermal shielding, thermal insulation, or the like. A thermal shielding material may include a foam material, a ceramic material, an insulator material, or any combination thereof. A thermal shielding material may include glass wool, rock wool, calcium silicate, cellular glass, expanded polystyrene (PS), extruded polystyrene (XPS), polyurethane (PUR), phenolic foam, polyisocyanurate foam (PIR), aerogel (e.g., silica aerogel), one or more vacuum panels (also referred to herein as vacuum insulation panels), one or more BTU-BLOCK® Board 1807/18 boards, one or more WDS® Ultra Plus boards, any combination thereof, one or more SOLIMIDE® thermal insulation foam structures, or the like, but example embodiments are not limited thereto.

Still referring to FIGS. 1A-1H and 2A-2G, the MIRSS assembly 200 may include structural members 302 (e.g., steel structural members) that are configured to radially and concentrically space the collector cylinder 210 and the divider wall 222 apart to establish a thermal expanding break therebetween to mitigate radial heat transfer across the annular space from the collector cylinder 210 to the divider wall 222. Such an annular space, which may include shielding chambers 326, may include one or more thermal shielding materials to radially thermally insulate the collector cylinder 210 from the divider wall 222. For example, the MIRSS assembly 200 may be configured to accommodate a first lower shielding material 328-1 that is a thermal insulating material (e.g., a thermal shielding material) in a first lower shielding chamber 326-1 that is radially between the collector cylinder 210 and the divider wall 222 and is configured to radially thermally insulate the divider wall 222 from the collector cylinder 210 to at least partially establish the thermal expanding break. The first lower shielding material 328-1 may include any thermal shielding material. Such a thermal expanding break may reduce, minimize, or prevent heat transfer (e.g., via wicking) from hot working fluid 244 in the riser annulus 224 to cold working fluid 242 in the downcomer annulus 214 via the MIRSS assembly 200, thereby improving heat transfer performance and "natural" air circulation in the reactor cooling system 130 which is driven at least in part by a difference in density between the cold working fluid 242 and the hot working fluid 244 due to difference in temperature therebetween.

Still referring to FIGS. 1A-1H and 2A-2G, in some example embodiments, the MIRSS assembly 200 is configured to enable inherent cooling of the seismic isolators 150 upon which the MIRSS assembly 200 is mounted. For example, in some example embodiments the MIRSS assembly 200 may at least partially define an intake conduit 118 that includes (e.g., encloses) one or more of the seismic isolators 150 and is in fluid communication with the reactor cooling system circulation path 236, for example between an intake opening 116-O of the seismically non-isolated intake conduit 116 and the top opening 214-U of the downcomer annulus 214. Therefore, the MIRSS assembly 200 may be configured to direct cold working fluid 242 to flow via a heat transfer path passing the seismic isolators 150, such that the seismic isolators 150 are heat transfer communication with, and thus may be cooled by, the cold working fluid 242. In some example embodiments, the seismic isolators 150 may be located in the downcomer annulus 214, one or more intake conduits 118, one or more of the seismically non-isolated intake conduits 116, or the like. Such cooling of the seismic isolators 150 may cause the seismic isolators 150 to be maintained at a desired design temperature range due to the passive nature of the intake flow path through the intake conduit 118 or in the downcomer annulus 214. Having the seismic isolators 150 in the intake flow path (e.g., in the intake conduit 118 or downcomer annulus 214) may configure the nuclear plant 100 to have improved resilience to contingency situations, such as various events or accidents, that may result in increased thermal loads on the seismic isolators 150. In case of an accident or event, the seismic isolators 150 may be protected by such inherent cooling. Such inherent cooling of the seismic isolators 150 may therefore reduce the likelihood of damage or failure of the seismic isolators 150 due to thermal loads, thereby improving the performance and/or reliability of the nuclear plant 100 that includes the MIRSS assembly 200 with inherent cooling of the seismic isolators 150 that structurally support and seismically isolate the MIRSS assembly 200.

Still referring to FIGS. 1A-1H, the nuclear plant 100 may further include one or more heaters 154 that are configured to heat one or more of the seismic isolators 150 located in the intake conduit 118, and thus configured to heat cold working fluid 242 passing therethrough. Such heaters 154 may be configured to provide "local heating" of one or more of the seismic isolators 150 to mitigate or minimize potentially over-cooling of seismic isolators 150 by the cold working fluid 242, for example, in example embodiments where the nuclear plant 100 is exposed to relatively cold environmental conditions such that the cold working fluid 242 is relatively cold for extended periods (e.g., below 0 degrees Fahrenheit). Such heaters 154 may include, for example, an electrical resistance heater, a space heater, or the like. In some example embodiments, the one or more heaters 154 may be coupled to one or more seismic isolators 150 and configured to directly heat the one or more seismic isolators 150 via conduction: for example, the one or more heaters 154 may comprise one or more electrical resistance heaters. In some example embodiments, the one or more heaters 154 may be spaced apart from (e.g., isolated from direct contact with) the seismic isolators 150 and may be configured to heat the cold working fluid 242 prior to the cold working fluid 242 passing in a heat transfer path passing one or more seismic isolators 150. Such heaters 154 therefore may be "upstream" of the one or more seismic isolators 150 within the intake flow path of the cold working fluid 242 flow and may be configured to "pre-heat" cold working fluid 242 prior to the cold working fluid 242 passing via a heat transfer path passing one or more seismic isolators 150. In some example embodiments, the nuclear plant 100 and/or the MIRSS assembly 200 thereof may be configured to direct at least a portion of the hot working fluid 244 to flow in a heat transfer path passing one or more seismic isolators 150 and/or with the intake conduit 118 to provide local heating of the seismic isolators via direct heating of the seismic isolators 150 and/or via "pre-heating" the cold working fluid 242 prior to the cold working fluid 242 passing over one or more seismic isolators 150. For example, the MIRSS assembly 200 may include one or more conduits, ducts, or the like extending into the intake conduit 118 and/or into contact with one or more seismic isolators 150, so that hot working fluid 244 may flow through the one or more conduits to provide local heating of cold working fluid 242 flowing through the intake conduit 118 in a heat transfer path passing the one or more conduits. Such one or more conduits could include at least a portion of the exhaust manifold structure 610, but example embodiments are not limited thereto.

In some example embodiments, the MIRSS assembly 200 is configured to enable a simplified sealing of a head access area (HAA) 292 that can handle seismic motion. For example, as shown in FIGS. 1A-1H, the seismically isolated assembly 190, including upper surfaces 200-U and 140-U of the MIRSS assembly 200 and the reactor enclosure system 140, respectively, may define a floor structure 290 of a reactor head access area (HAA) 292 which is enclosed above the floor structure 290 by an upper building structure 102-2 of the reactor building 102, which may include a cylindrical wall structure 102-21 and a roof structure 102-22, such that the floor structure 290 is seismically isolated in relation to the upper building structure 102-2 that encloses the HAA 292 above the floor structure 290 and is configured to move independently of the upper building structure 102-2 that provides the upper (e.g., wall and ceiling) enclosure of the HAA 292. It will be understood that the upper surface 140-U of the reactor enclosure system 140 may be an upper surface 148-U of a head 148 of the reactor enclosure system 140. As further shown, the MIRSS assembly 200 may include a RAHS (RVACS intake Annulus to HAA Seal), also referred to herein interchangeably as an HAA seal 294, that may be an annular seal that is coupled to an outer sidewall surface 200-S of the MIRSS assembly 200 and is configured to extend radially outwards from the MIRSS assembly 200 to contact an inner sidewall 102-2S of the upper building structure 102-2, thereby closing and sealing an annular gap between the MIRSS assembly 200 and the upper building structure 102-2 that completes the enclosure of the HAA 292. The HAA seal 294 may be configured to separate (e.g., axially isolate) the intake conduit 118 from the HAA 292.

The HAA seal 294 may be a flexible seal that is configured to maintain a seal between the HAA 292 and the intake conduit 118 (and thus, between the HAA 292 and the reactor cooling system 130) during movement of the seismically isolated MIRSS assembly 200 in relation to, and independently of, the seismically non-isolated reactor building structures 102-1, 102-2 that at least partially define the enclosure of the HAA 292. For example, the HAA seal 294 may comprise (partially or entirely) a flexible material, for example Inconel 625, Inconel 718, Stainless Steel 316, Stainless Steel 304, a fluoroelastomer material (which may be referred to as a fluoroelastomer seal material), a fluorocarbon elastomer (FKM) polymer material, or the like. The MIRSS assembly 200 that includes the HAA seal 294 may be configured to enable the HAA 292 to be sealed and to handle (e.g., accommodate) seismic motion of the reactor building 102 and/or of the seismically isolated assembly 190, as the flexible HAA seal 294 is less likely to break during seismic events than a rigid seal and thus is configured to reduce, minimize, or prevent the likelihood of a leak in the HAA 292 to the reactor cooling system 130 due to such breakage, thereby improving reactor cooling system 130 operational reliability. As a result, the HAA seal 294 may configure the MIRSS assembly 200 to improve reliability of the reactor cooling system 130 and maintain isolation integrity of the HAA 292 and reactor cooling system 130 during seismic movements of the seismically isolated assembly 190. As a further or alternative result, the MIRSS assembly 200 is configured to improve maintenance access. For example, the HAA 292 may be a congested zone due to electrical cabinets, piping, and other objects in the area. Work on the seismic isolators 150 and support structures of the MIRSS assembly 200 may be performed under (e.g., beneath) the HAA 292 which is remote (e.g., spaced apart) from the congested zone.

The well seal 298 may be a flexible seal that is configured to maintain a seal between the HAA 292 and the riser annulus 224 (and thus, between the HAA 292 and the reactor cooling system 130) during movement of the seismically isolated MIRSS assembly 200 in relation to, and independently of, the seismically non-isolated reactor building structures 102-1, 102-2 that at least partially define the enclosure of the HAA 292. As a result, the HAA seal 294 and the well seal 298 may be configured to collectively maintain a seal between the HAA 292 and the circulation path 236 of the reactor cooling system 130, thereby maintaining isolation of the HAA 292 from the reactor cooling system 130 and air circulating therethrough.

In some example embodiments, the nuclear plant 100 may be configured to contain radioactive materials (e.g., radionuclides) within the HAA 292 in the reactor building 102, which may include radioactive materials that may enter the HAA 292 from the reactor enclosure system 140 (e.g., from any of primary vessel 146, the guard vessel 144, the nuclear reactor 142, and/or the head 148), materials that may be introduced into the HAA 292 to be further inserted into the primary vessel 146, any combination thereof, or the like. The HAA seal 294 and the well seal 298 may be configured to, individually or in combination with each other and at least the cylindrical reactor support structure 202, provide isolation and/or containment of the HAA 292 from a circulation path 236 of the reactor cooling system 130 (e.g., intake conduit 118, downcomer annulus 214, riser annulus 224, exhaust ducts 216, seismically non-isolated exhaust portion 120, etc.) and air flowing therethrough. Thus, the HAA seal 294 and the well seal 298 may be configured to isolate the circulation path 236, and thus the reactor cooling system 130, from radioactive material (e.g., radionuclides) that may be present and/or contained within the HAA 292.

In addition, in some example embodiments, the HAA seal 294 and the well seal 298 are flexible seals and are configured to flex to maintain isolation of the reactor cooling system 130, and any circulation paths 236 thereof, from the HAA 292 during movement of the seismically isolated MIRSS assembly 200 in relation to, and independently of, the seismically non-isolated reactor building structures 102-1, 102-2 that at least partially define the enclosure of the HAA 292 (e.g., during an earthquake). As a result, a MIRSS assembly 200 that includes the HAA seal 294 and the well seal 298 may be configured to provide improved isolation and/or containment of radioactive materials (e.g., radionuclides) in the HAA 292 during seismic events, thereby reducing, minimizing, or preventing transfer of such radioactive materials into a circulation path 236 of the reactor cooling system 130, and thus potentially into the ambient environment 123, during or due to a seismic event (e.g., earthquake) that causes the seismically isolated MIRSS assembly 200 to move in relation to, and independently of, the seismically non-isolated reactor building structures 102-1, 102-2. It will be understood that the HAA seal 294 and/or the well seal 298 may be configured to flex to maintain isolation of the reactor cooling system 130, and the circulation path 236 thereof, from the HAA 292 during a seismic event, after the conclusion of a seismic event (e.g., immediately after conclusion of the seismic event), before the seismic event, or the like, including before, during, and after movement of the seismically isolated MIRSS assembly 200 in relation to, and independently of, the seismically non-isolated reactor building structures 102-1, 102-2, such that the HAA seal and the well seal 298, collectively or independently, may be configured to provide resilient isolation of the HAA 292 (and potential radioactive materials such as radionuclides therein) from the reactor cooling system 130 and any circulation paths 236 thereof.

In some example embodiments, both the HAA seal 294 and the well seal 298 are flexible seals, but example embodiments are not limited thereto. For example, in some example embodiments only of the HAA seal 294 or the well seal 298 may be a flexible seal (e.g., comprising Inconel 625) while another one of the HAA seal 294 or the well seal 298 may be a rigid, non-flexible seal (e.g., comprising carbon steel).

In some example embodiments, the MIRSS assembly 200 is configured to enable access to the seismic isolators 150 for maintenance, inspection, and repair. This design includes a permanently installed track 152 and, in some example embodiments, a mechanical lift, to complete replacement of seismic isolators 150. For example, as shown in FIGS. 1A-1H, the reactor building 102 may include a circumferential track 152 (e.g., a track including at least two parallel rails) that extends at least partially circumferentially around the circular pattern of seismic isolators 150 on a structural support surface 102-12 around the MIRSS assembly 200. The track 152 may enable equipment to be easily moved around the MIRSS assembly 200 (e.g., on a trolley rolling on the track 152) to access, repair, and/or replace equipment at various azimuthal locations in the reactor building interior 108 beneath the HAA 292.

The track 152 may further extend out of the intake conduit 118 via one or more openings 156, including for example a branch of the track extending through a seismically non-isolated intake conduit 116 via a respective opening 116-O of the seismically non-isolated intake conduit 116 to an opening 156 (e.g., a door, hatch, or the like) in a sidewall of the conduit 116, to enable transport of equipment to and/or from the intake conduit 118 using a trolley (that may include a lift table) that may be configured to move on the track 152 via engaging rail wheels. The track 152 may enable operators to access and replace a seismic isolator 150 that is structurally supporting at least a portion of the MIRSS assembly 200. For example, a portion of the MIRSS assembly 200 that is adjacent to a seismic isolator 150 may be jacked upwards to reduce the structural loads on seismic isolator 150, removing the seismic isolator 150 (e.g., decoupling the seismic isolator 150 from the lower building structure 102-1), placing the removed seismic isolator 150 onto a raised lift table of a trolley that is on the track 152 and then lowering the lift table with seismic isolator 150 on to the trolley. The trolley with the seismic isolator 150 thereon may then be moved at least partially around the intake conduit 118 on the track 152 to an access location at which the seismic isolator 150, alone or together with the trolley, may be removed from the intake conduit 118. For example as shown in at least FIG. 1D, the trolley may further move from the intake conduit 118 on a branch of track 152 that extends out of the intake conduit 118 and through one or more seismically non-isolated intake conduits 116 to an opening 156 (e.g., a door, hatch, or the like) through a sidewall of the one or more seismically non-isolated intake conduits 116 and out of the circulation path 236 of the reactor cooling system 130. In another example, the trolley may move on a track 152 that extends through an opening (e.g., a door, hatch, or the like) in a bulkhead of the upper building structure 102-2 that at least partially defines the intake conduit 118. In another example, the trolley may be moved on the track 152 to a location axially (e.g., vertically) beneath a gap temporarily formed between the MIRSS assembly 200 and the upper building structure 102-2 based on at least partial removal of the HAA seal 294, and the seismic isolator 150 may be lifted (alone or together with the trolley) out of the intake conduit 118 through the gap in the HAA seal 294 into the HAA 292. A replacement seismic isolator 150 may be introduced into the intake conduit 118 via a reverse of the process to remove the seismic isolator 150, such that the replacement seismic isolator 150 may be moved through the intake conduit 118, on a trolley riding on the track 152, to the location from which the removed seismic isolator 150 was removed, and lifting (e.g., via the lift table of the trolley) and installing the replacement seismic isolator 150 at the position from which the removed seismic isolator 150 was removed, at which point the jacks lifting the MIRSS assembly 200 may be lowered to structurally support the MIRSS assembly 200 at least partially on the replacement seismic isolator 150. As a result, the track 152, combined with the structure of the MIRSS assembly 200, may facilitate improved ease of maintenance of equipment in the nuclear plant 100, thereby enabling improved maintenance access to the seismic isolators 150 and further enabling a low cost lifting and handling system for accessing and handling seismic isolators and/or other equipment and structures of the MIRSS assembly 200 in the intake conduit 118 that does not interfere with the congested HAA 292.

In some example embodiments, the MIRSS assembly 200 is configured to enable the inlet openings 216-O1 of the exhaust ducts 216 to be located at a top 210-U of the collector cylinder 210 (also referred to herein interchangeably as a top region, top portion, or the like of the collector cylinder 210) and thus at a top 224-U of the riser annulus 224 defined between the top 210-U of the collector cylinder 210 and an opposing top portion of the outer sidewall surface 140-S of the reactor enclosure system 140 (e.g., an opposing top portion of the outer sidewall surface 144-S of the guard vessel 144, an opposing top portion of an outer sidewall surface of the primary vessel 146 in example embodiments where the reactor enclosure system 140 does not include any guard vessel, etc.). The top 210-U of the collector cylinder 210 and the top 224-U of the riser annulus 224 may be at least partially defined as portions of the collector cylinder 210 and the riser annulus 224, respectively, that are directly adjacent to the respective top edges thereof, which are defined in the outer radial direction by structures (e.g., upper inner sidewall surface 354-U) of the cylindrical reactor support structure 202 (e.g., defined by upper structural members 312 of the upper modular structures 310 of the MIRSS modules 300 at least partially defining the MIRSS assembly 200 as described herein). As a result, the MIRSS assembly 200 may be configured to direct hot working fluid 244 out of the riser annulus 224 adjacent to a top of the reactor enclosure system 140 (e.g., a top of the guard vessel 144), relatively close to the floor structure 290 and thus to reactor head access area (HAA) 292, thereby inducing hot working fluid 244 to flow out of the riser annulus 224 at the top 224-U thereof. Thus, the MIRSS assembly 200 may be configured to reduce, minimize, or prevent the existence of a thermal “dead zone” of stagnant hot working fluid 244 at the top 224-U of the riser annulus 224, thereby providing improved cooling of the top of the reactor enclosure system 140 (e.g., the top of the guard vessel 144) and further providing improved cooling and heat removal in the reactor building 102. The MIRSS assembly 200 may be configured to define the exhaust ducts 216 in relation to the reactor enclosure system 140 (e.g., in relation to at least the guard vessel 144) so that the inlet openings 216-O1 (also referred to herein as exhaust duct inlets, exhaust duct inlet openings, or the like) are at or above a location (in a vertical direction extending perpendicular to grade 182) at which a top of the nuclear reactor 142 and/or a top of at least a working fluid surface level in the primary vessel 146 is located. As a result, the MIRSS assembly 200 may be configured to cause hot working fluid 244 to rise vertically along an entire vertical height of the nuclear reactor 142, the guard vessel 144, or the like to remove heat therefrom, thereby ensuring cooling of the entire vertical height of the nuclear reactor 142, the guard vessel 144, or the like.

In some example embodiments, a nuclear plant may include a reactor cooling system that circulates a working fluid (e.g., air) through passages, conduits, or the like to absorb heat rejected from the nuclear reactor. In some cases, where a reactor building structure (e.g., superstructure or the entire reactor building) is seismically isolated by one or more seismic isolators, the reactor cooling system may circulate working fluid away from the nuclear reactor enclosure system beneath a concrete floor structure of the reactor building, which may be relatively thick to provide at least some structural support of the reactor building and/or of the reactor enclosure system and/or to provide containment thereof, and thus the concrete floor structure may cause the exhaust conduit to be vertically spaced downwards from the top of the reactor enclosure system, thereby reducing cooling of the top portion of the reactor enclosure system (e.g., at least the guard vessel thereof). In addition, the exhaust portion of the reactor cooling system may be included in the seismically isolated portion of the reactor building, thereby increasing the structural load on the seismic isolators.

In some example embodiments, the nuclear plant 100 may include one or more seismic damping mechanisms 158 which are configured to reduce, minimize, or prevent a seismically-induced relative movement of the seismically isolated assembly 190 in relation to the seismic isolators 150 and/or the reactor building 102. The one or more seismic damping mechanisms 158 may be configured to reduce a velocity of such seismically-induced relative movement of the seismically isolated assembly 190 to further reduce the travel of the seismically isolated assembly 190 to reduce or prevent the risk of the seismically isolated assembly 190 contacting a structure of the reactor building 102 and/or to reduce or prevent the risk of the stress (e.g., shear stress) on the seismic isolators 150 exceeding a threshold travel or stress capability of the seismic isolators 150. The one or more seismic damping mechanisms 158 may be coupled to one or more seismic isolators 150 (e.g., adjacent thereto within the intake conduit 118), integrated into one or more seismic isolators 150, or the like. The one or more seismic damping mechanisms 158 may be, for example, a shock absorber. The one or more seismic damping mechanisms 158 may be configured to function as a shock absorber to dampen seismically seismically-induced relative movement of the seismically isolated assembly 190 in relation to the seismic isolators 150 and/or the reactor building 102.

As shown in FIGS. 1A-1H and 2A-2G, the cylindrical reactor support structure 202, the collector cylinder 210, and the divider wall 222 may each have a circular cylindrical shape such that the cylindrical reactor support structure 202, the collector cylinder 210, and the divider wall 222 may each have a circular cross section. However, example embodiments are not limited thereto. For example, in some example embodiments one or more of the cylindrical reactor support structure 202, the collector cylinder 210, or the divider wall 222 may define a non-circular cylinder having a non-circular cross section. For example, one or more of the cylindrical reactor support structure 202, the collector cylinder 210, or the divider wall 222 may define a polygonal cylinder shape having a polygon cross-section. Such a polygon may be any polygon, including for example a square, rectangle, hexagon, nonagon, decagon, or the like. However, it will be understood that the cylindrical reactor support structure 202, the collector cylinder 210, and the divider wall 222 may independently have any shape.

Still referring to FIGS. 1A-1H, the reactor enclosure system 140, including the guard vessel 144, the primary vessel 146, the head 148, and the nuclear reactor 142 are shown to have a circular cross-section in the horizontal plane, such that at least the guard vessel 144, the primary vessel 146, and the nuclear reactor 142 have a circular cylindrical shape, and the head 148 has a circular disc shape. However, it will be understood that example embodiments are not limited thereto. For example, in some example embodiments, one or more of the guard vessel 144, the primary vessel 146, the head 148, or the nuclear reactor 142 may have a non-circular cross-section in the horizontal plane, including for example a polygon cross-section. Such a polygon may be any polygon, including for example a square, rectangle, hexagon, nonagon, decagon, or the like. However, it will be understood that the guard vessel 144, the primary vessel 146, the head 148, and the nuclear reactor 142 may independently have any shape.

Figure 3A:
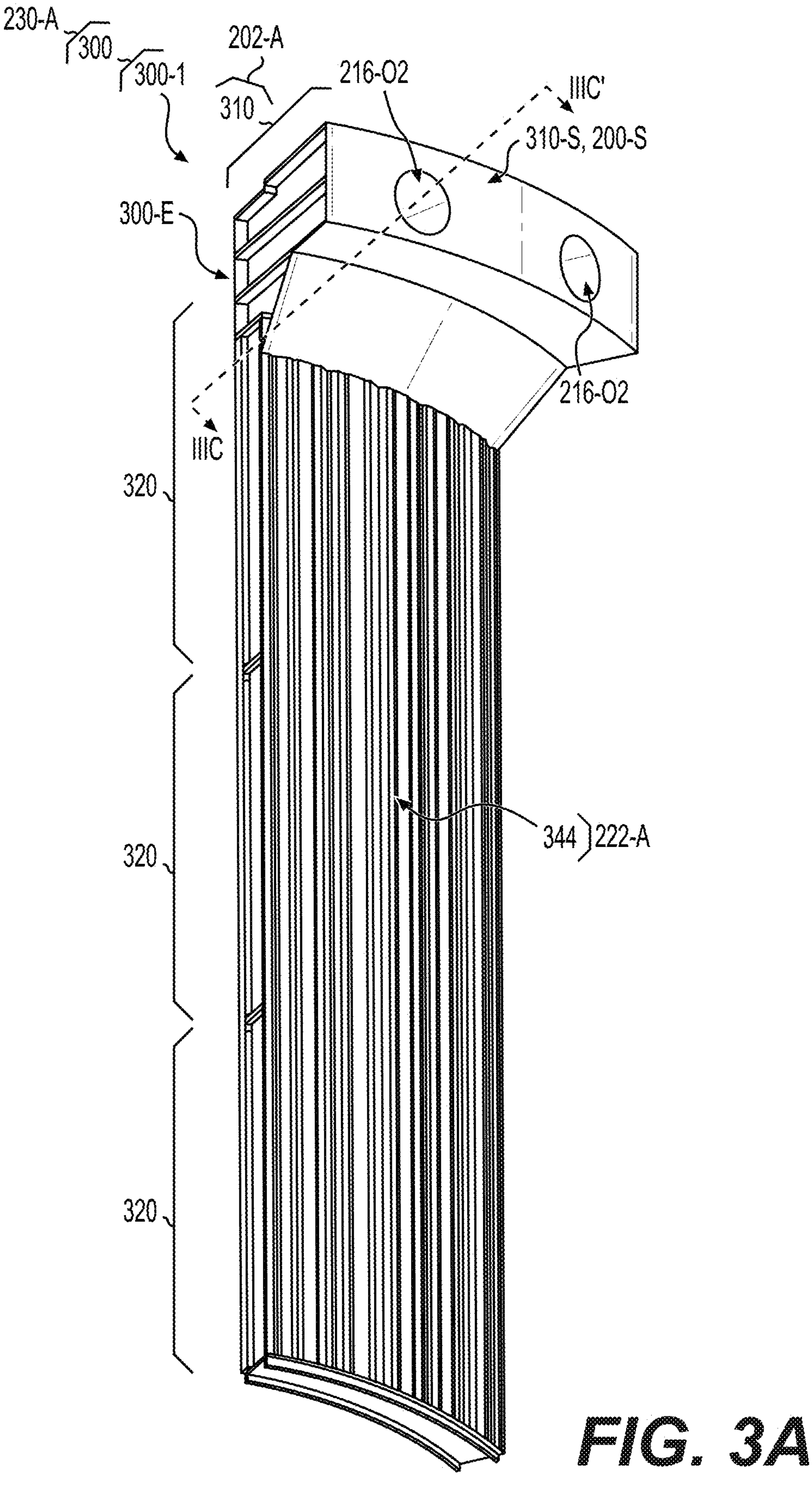
FIGS. 3A and 3B are perspective views of a MIRSS module, according to some example embodiments.
Figure 3B:
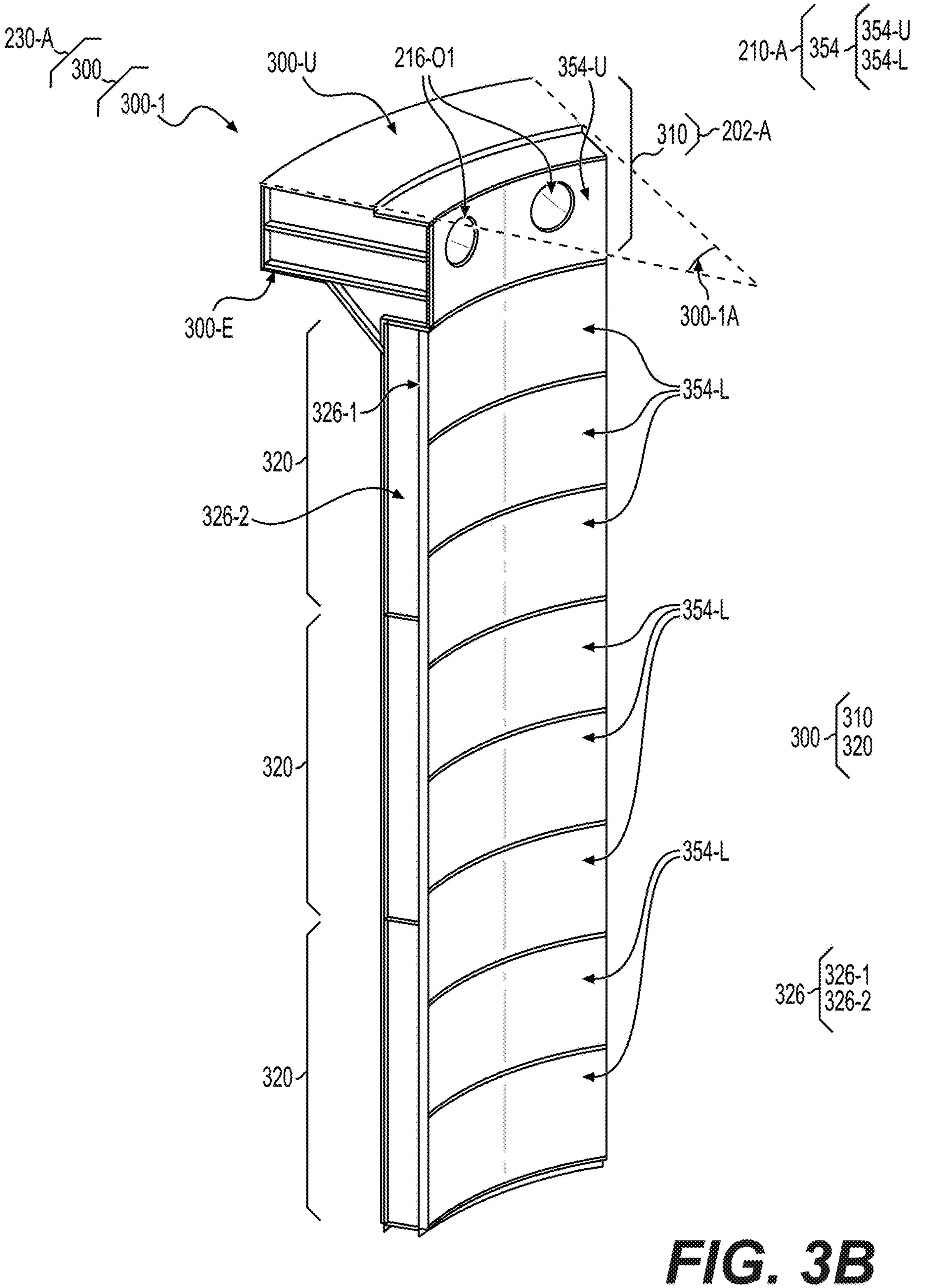
Figure 3C:
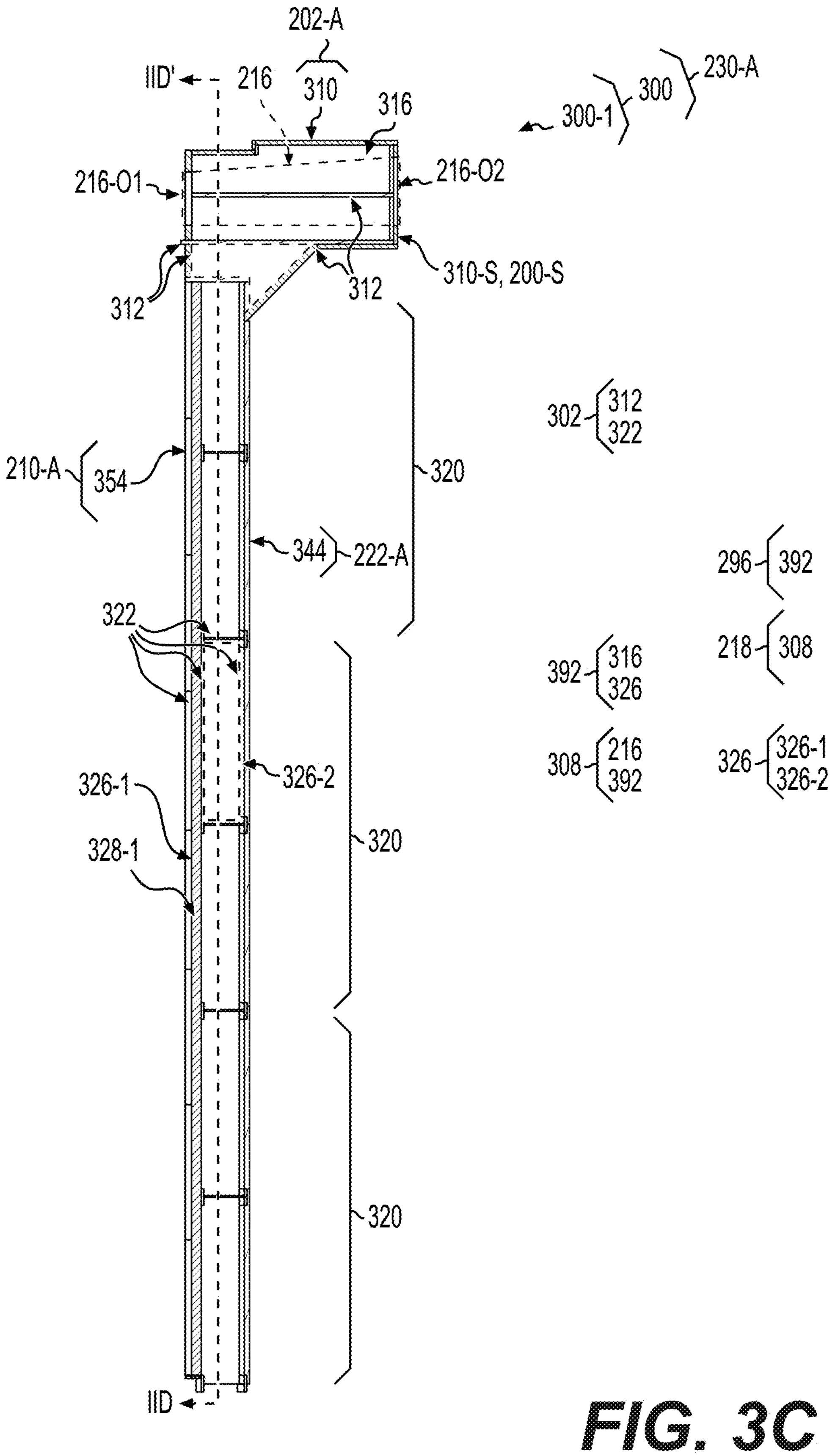
FIG. 3C is a cross-sectional elevation view of the MIRSS module of FIG. 3A along cross-sectional view line IIIC-IIIC' in FIG. 3A, according to some example embodiments.
Figure 3D:
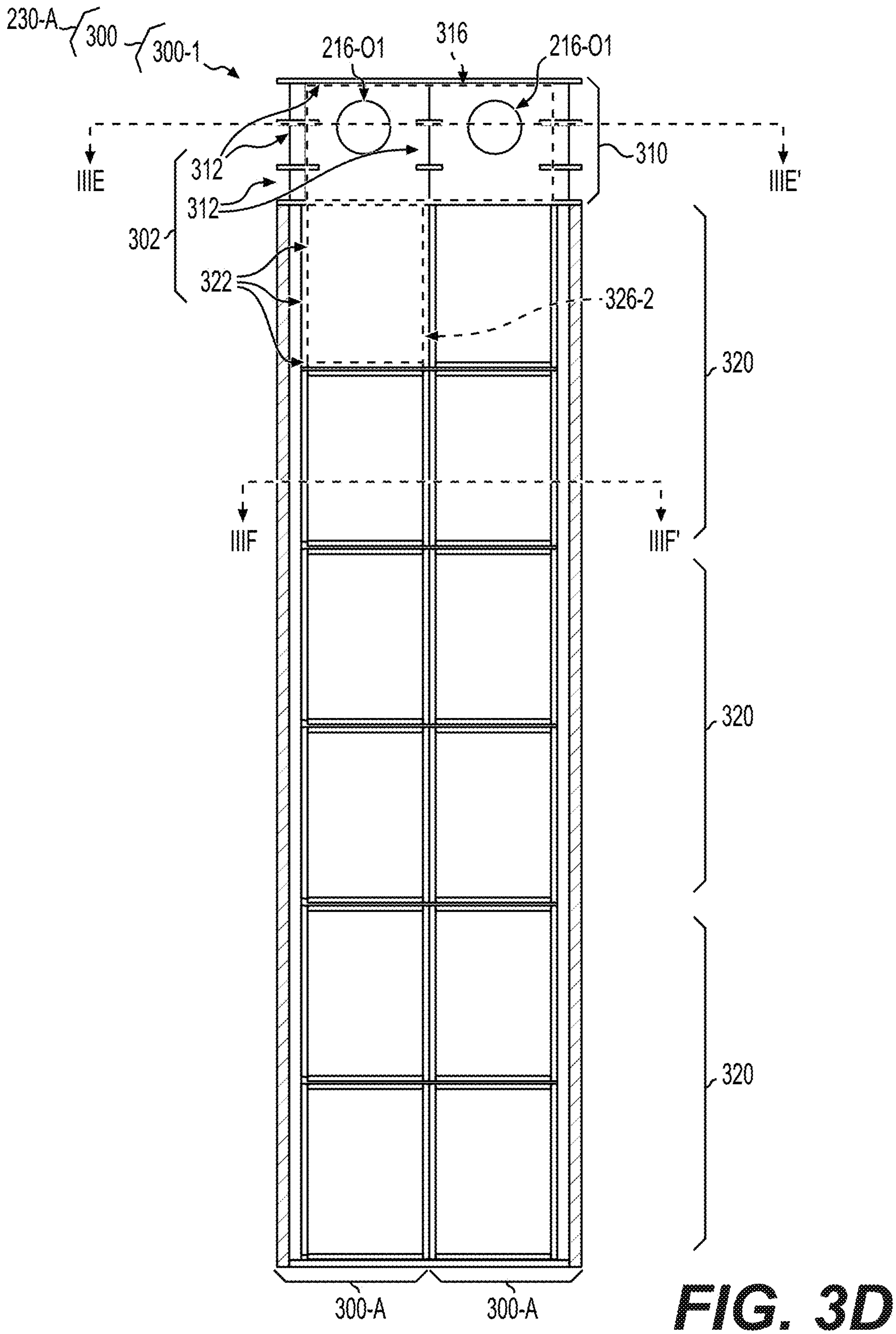
FIG. 3D is a cross-sectional elevation view of the MIRSS module of FIG. 3A along cross-sectional view line IIID-IIID' in FIG. 3C, according to some example embodiments.
Figure 3E:
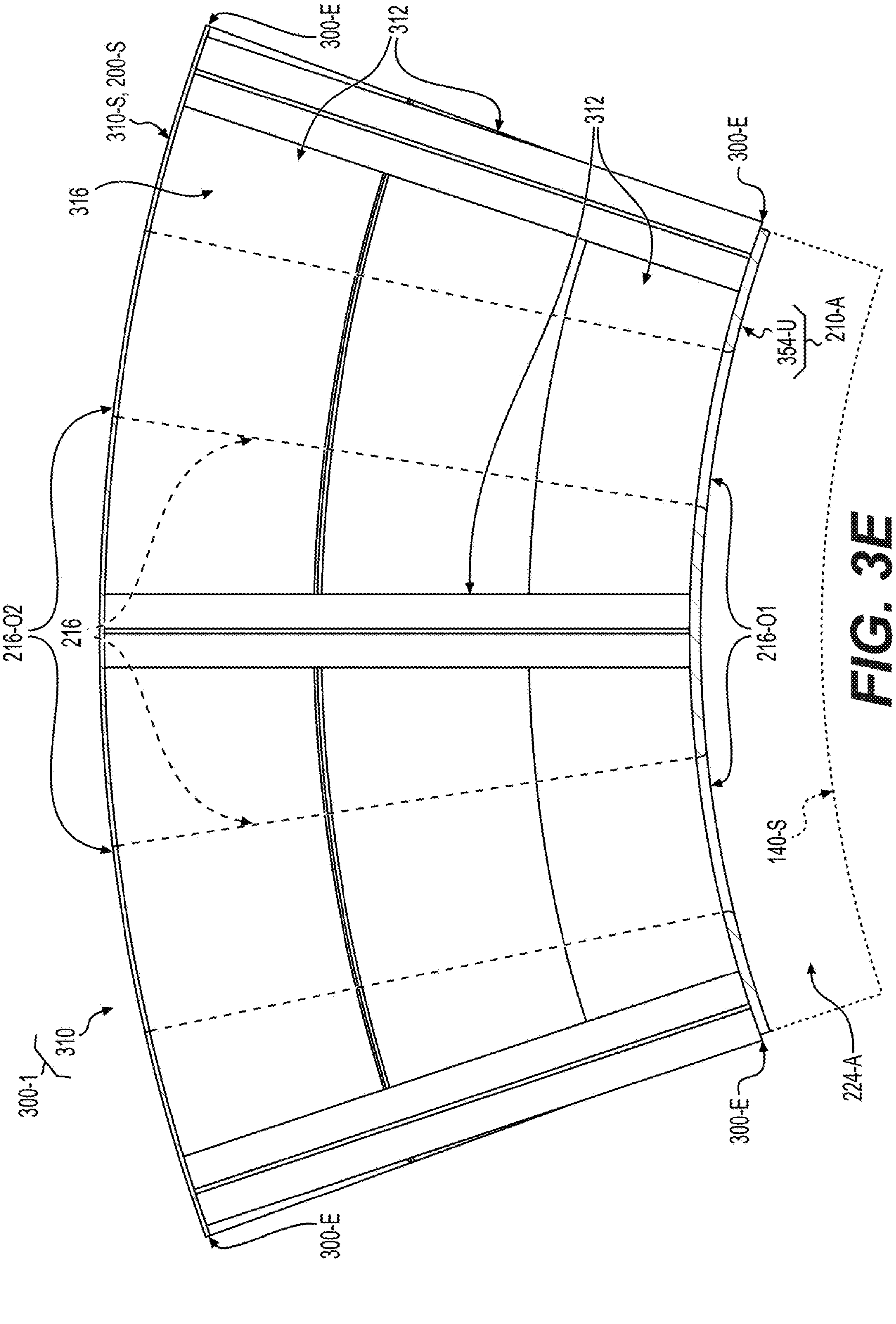
FIG. 3E is a cross-sectional plan view of the MIRSS module of FIG. 3A along cross-sectional view line IIIE-IIIE' in FIG. 3D, according to some example embodiments.
Figure 3F:
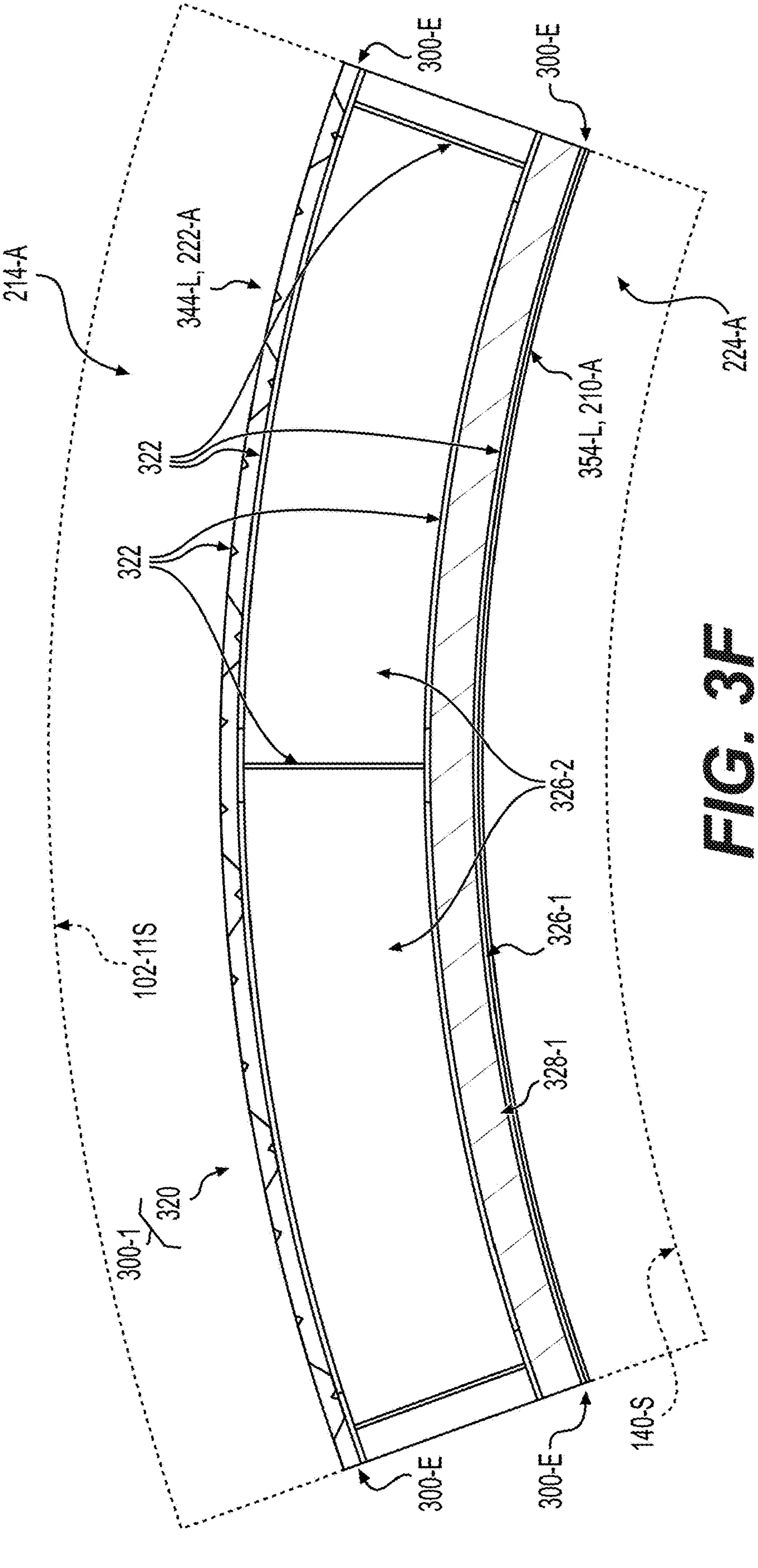
FIG. 3F is a cross-sectional plan view of the MIRSS module of FIG. 3A along cross-sectional view line IIIF-IIIF' in FIG. 3D, according to some example embodiments.

FIGS. 3A and 3B are perspective views of a MIRSS module 300, according to some example embodiments. FIG. 3C is a cross-sectional elevation view of the MIRSS module 300 of FIG. 3A along cross-sectional view line IIIC-IIIC' in FIG. 3A, according to some example embodiments. FIG. 3D is a cross-sectional elevation view of the MIRSS module 300 of FIG. 3A along cross-sectional view line IIID-IIID' in FIG. 3C, according to some example embodiments. FIG. 3E is a cross-sectional plan view of the MIRSS module 300 of FIG. 3A along cross-sectional view line IIIE-IIIE' in FIG. 3D, according to some example embodiments. FIG. 3F is a cross-sectional plan view of the MIRSS module 300 of FIG. 3A along cross-sectional view line IIIF-IIIF' in FIG. 3D, according to some example embodiments.

Figure 4A:
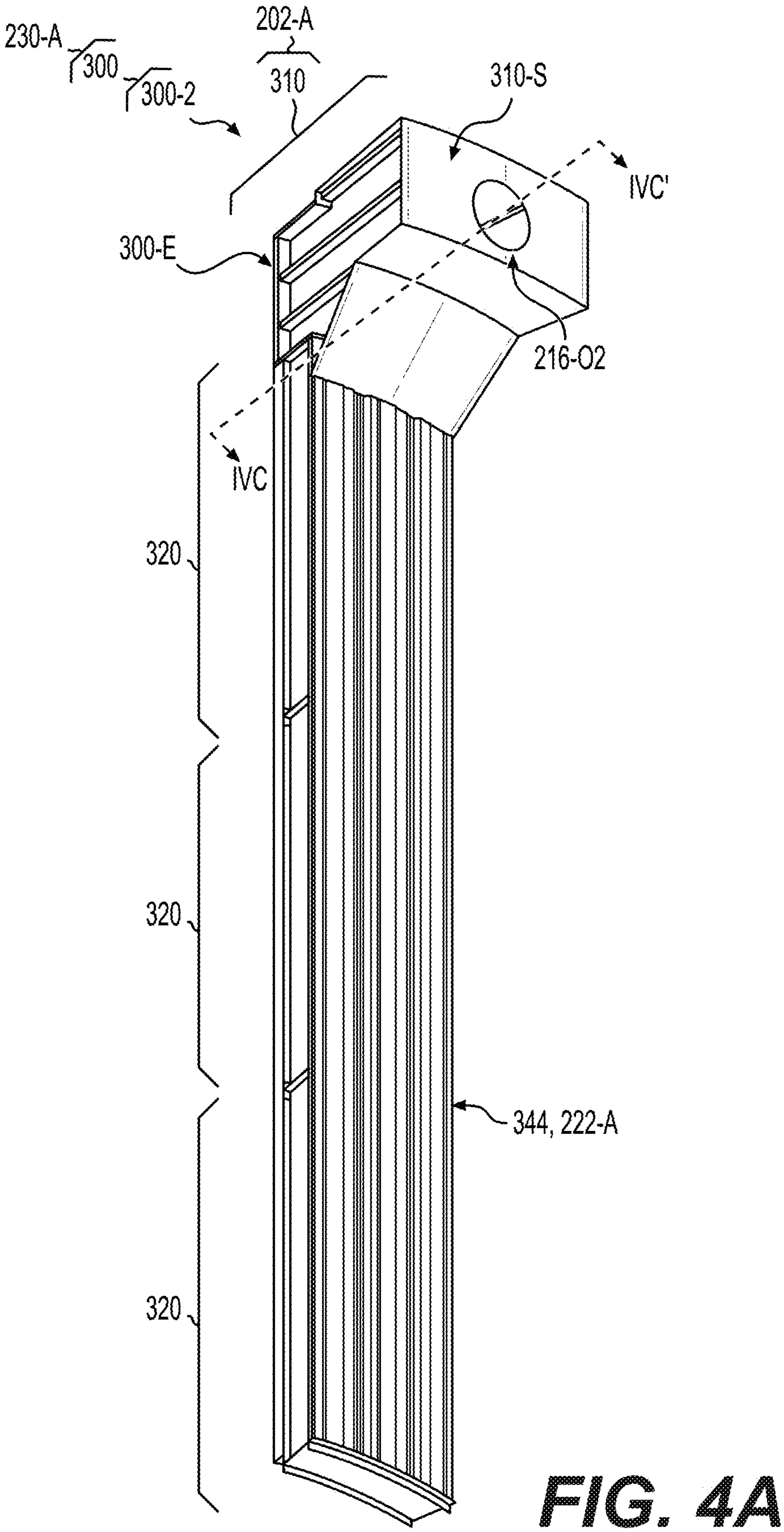
FIGS. 4A and 4B are perspective views of a MIRSS module, according to some example embodiments.
Figure 4B:
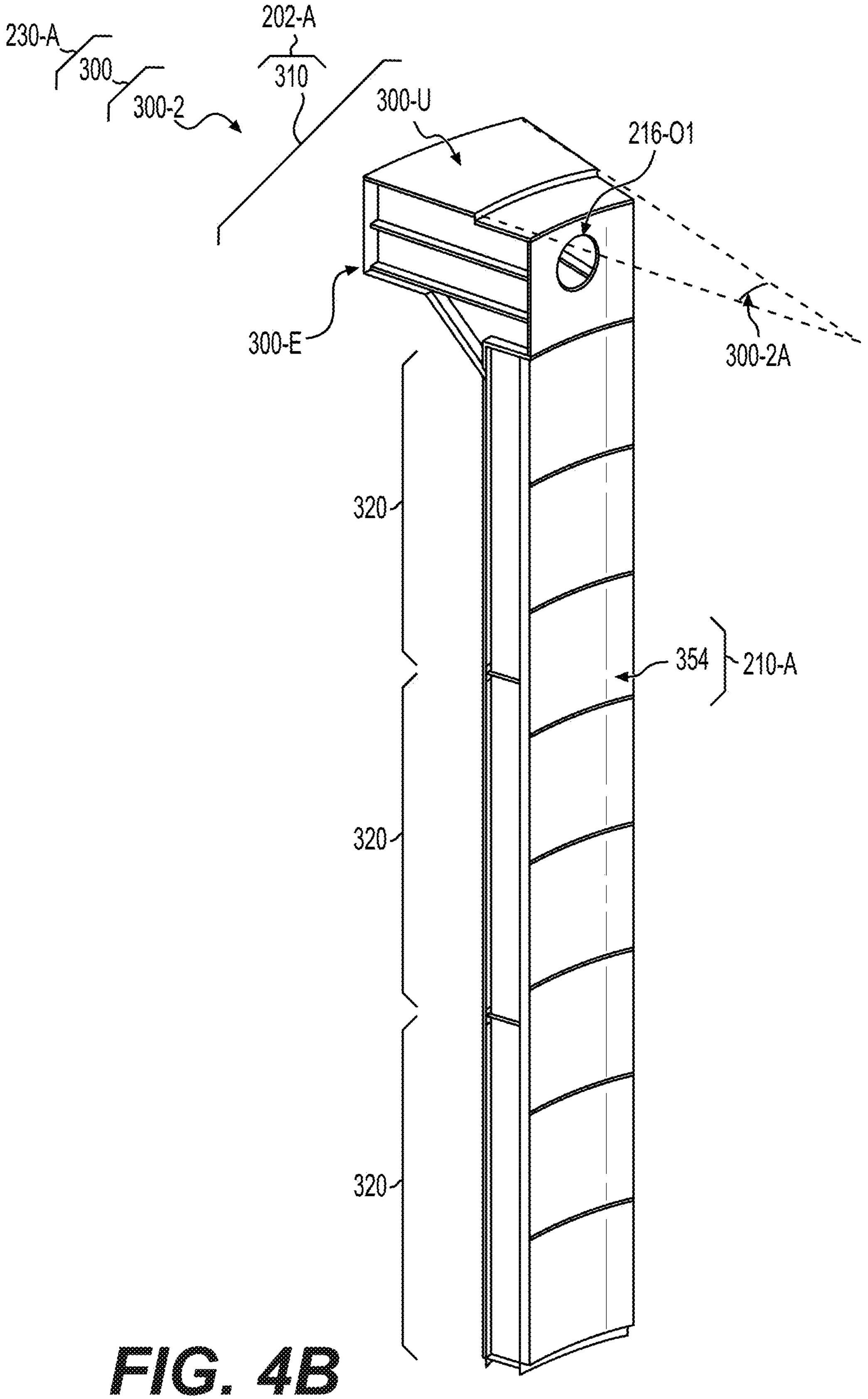
Figure 4C:
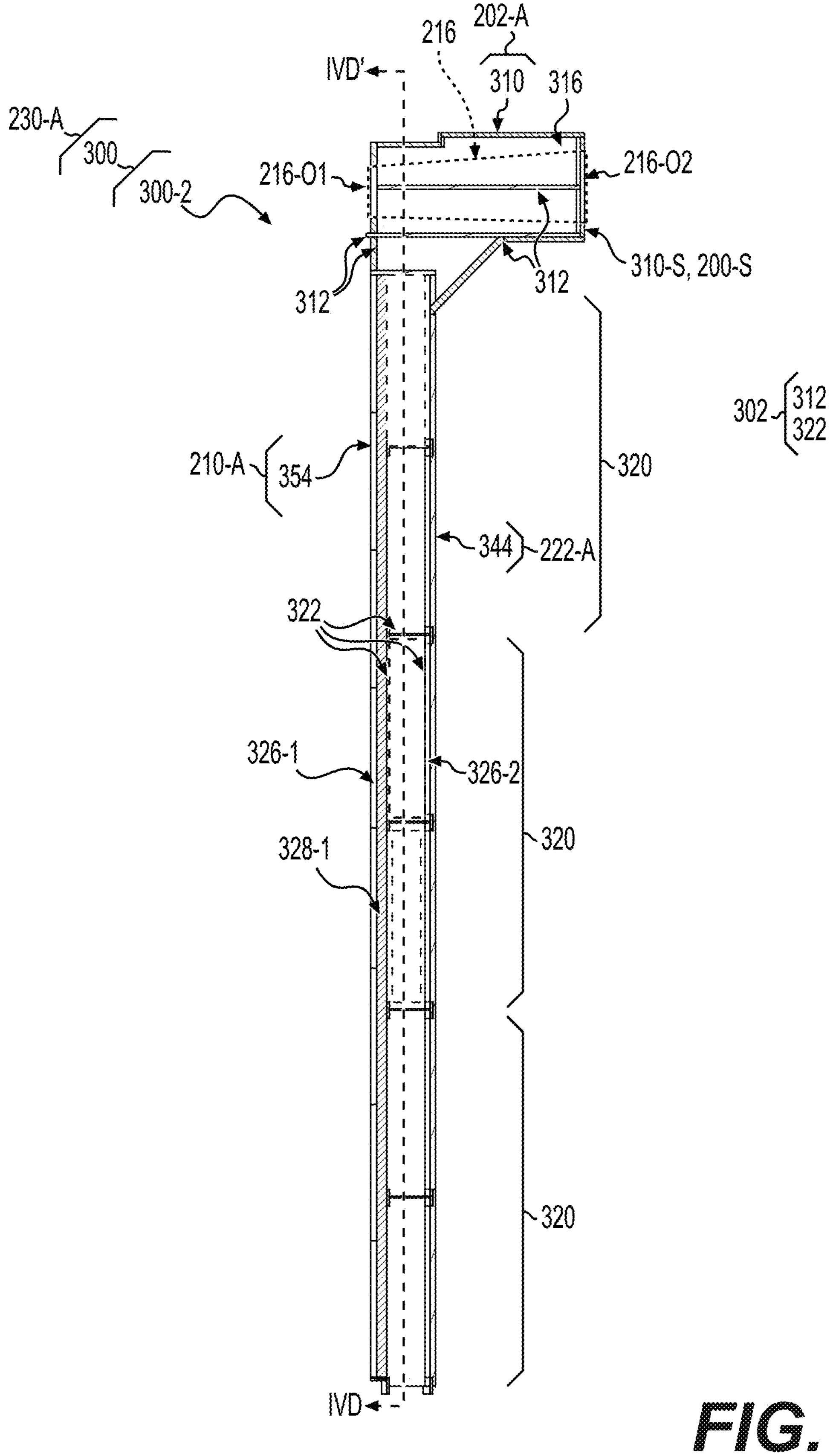
FIG. 4C is a cross-sectional elevation view of the MIRSS module of FIG. 4A along cross-sectional view line IVC-IVC' in FIG. 4A, according to some example embodiments.
Figure 4D:
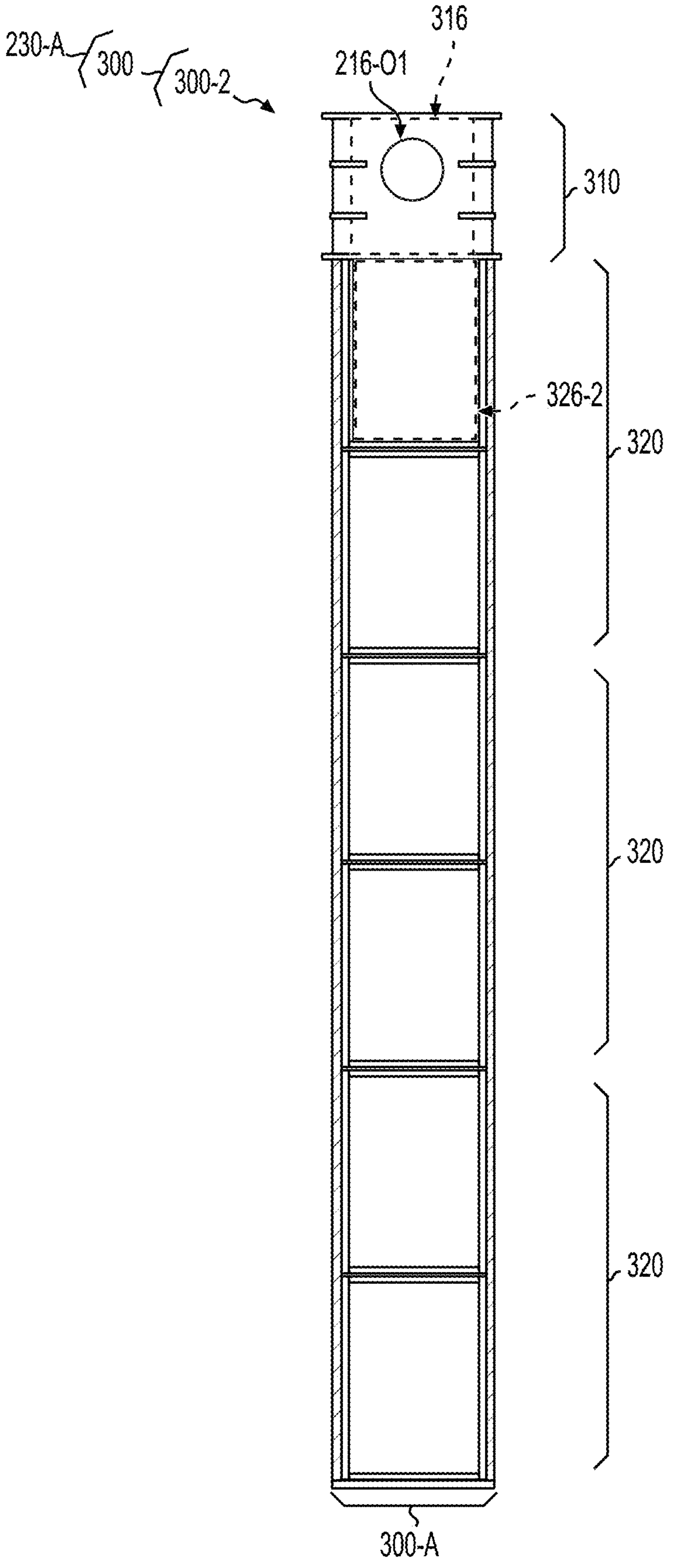
FIG. 4D is a cross-sectional elevation view of the MIRSS module of FIG. 4A along cross-sectional view line IVD-IVD' in FIG. 4C, according to some example embodiments.

FIGS. 4A and 4B are perspective views of a MIRSS module 300, according to some example embodiments. FIG. 4C is a cross-sectional elevation view of the MIRSS module 300 of FIG. 4A along cross-sectional view line IVC-IVC' in FIG. 4A, according to some example embodiments. FIG. 4D is a cross-sectional elevation view of the MIRSS module of FIG. 4A along cross-sectional view line IVD-IVD' in FIG. 4C, according to some example embodiments.

Figure 5A:
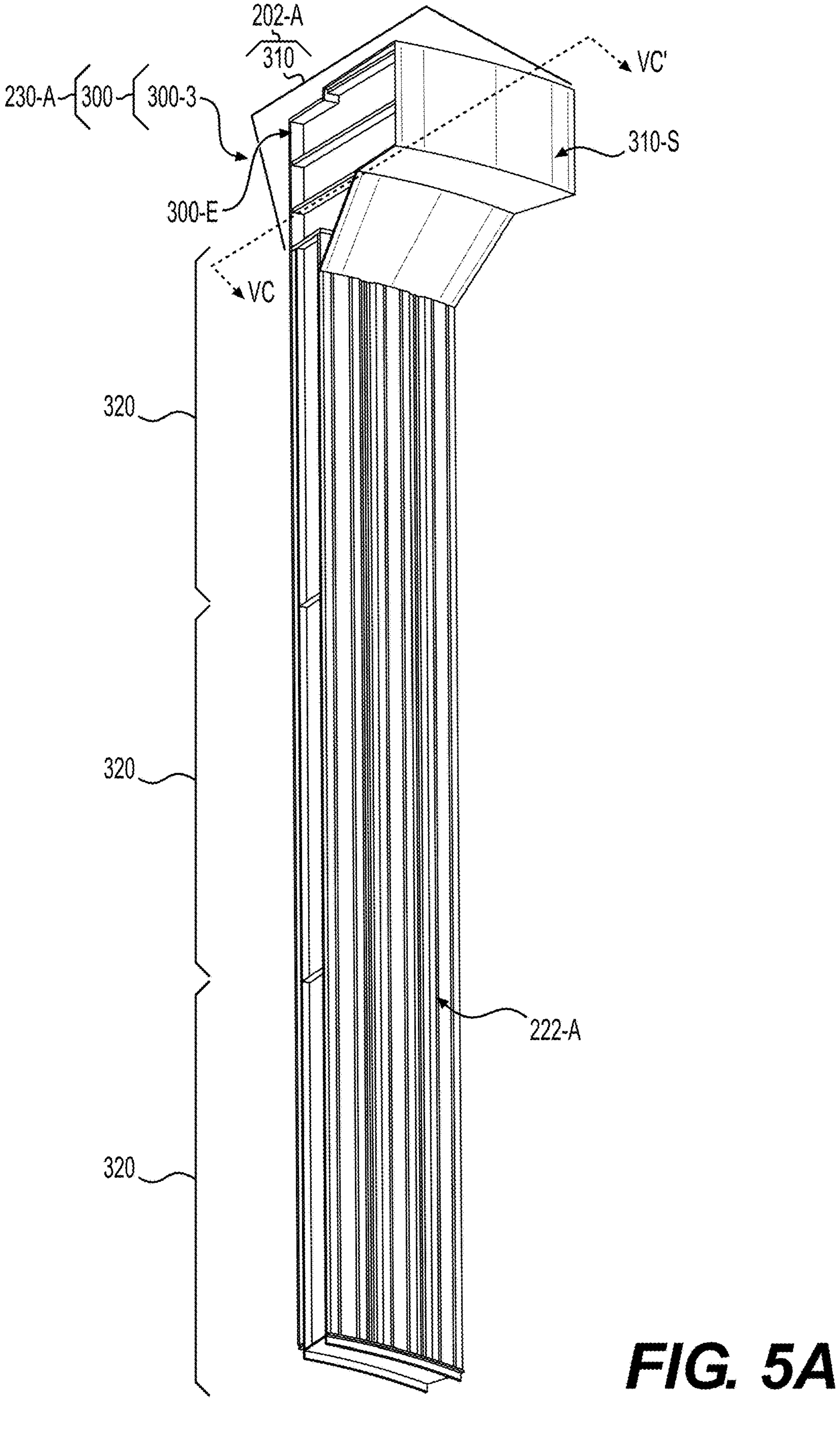
FIGS. 5A and 5B are perspective views of a MIRSS module, according to some example embodiments.
Figure 5B:
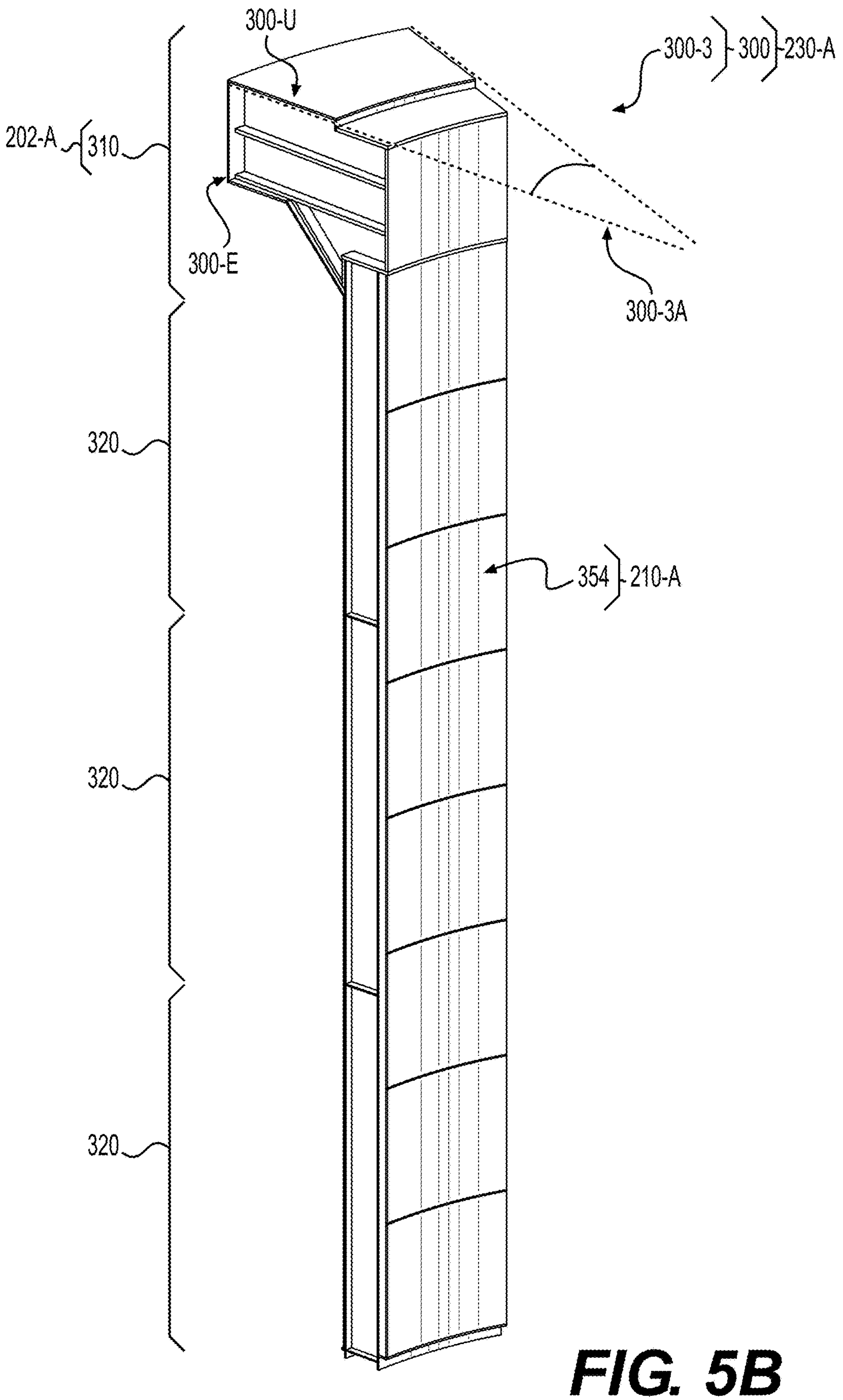
Figure 5C:
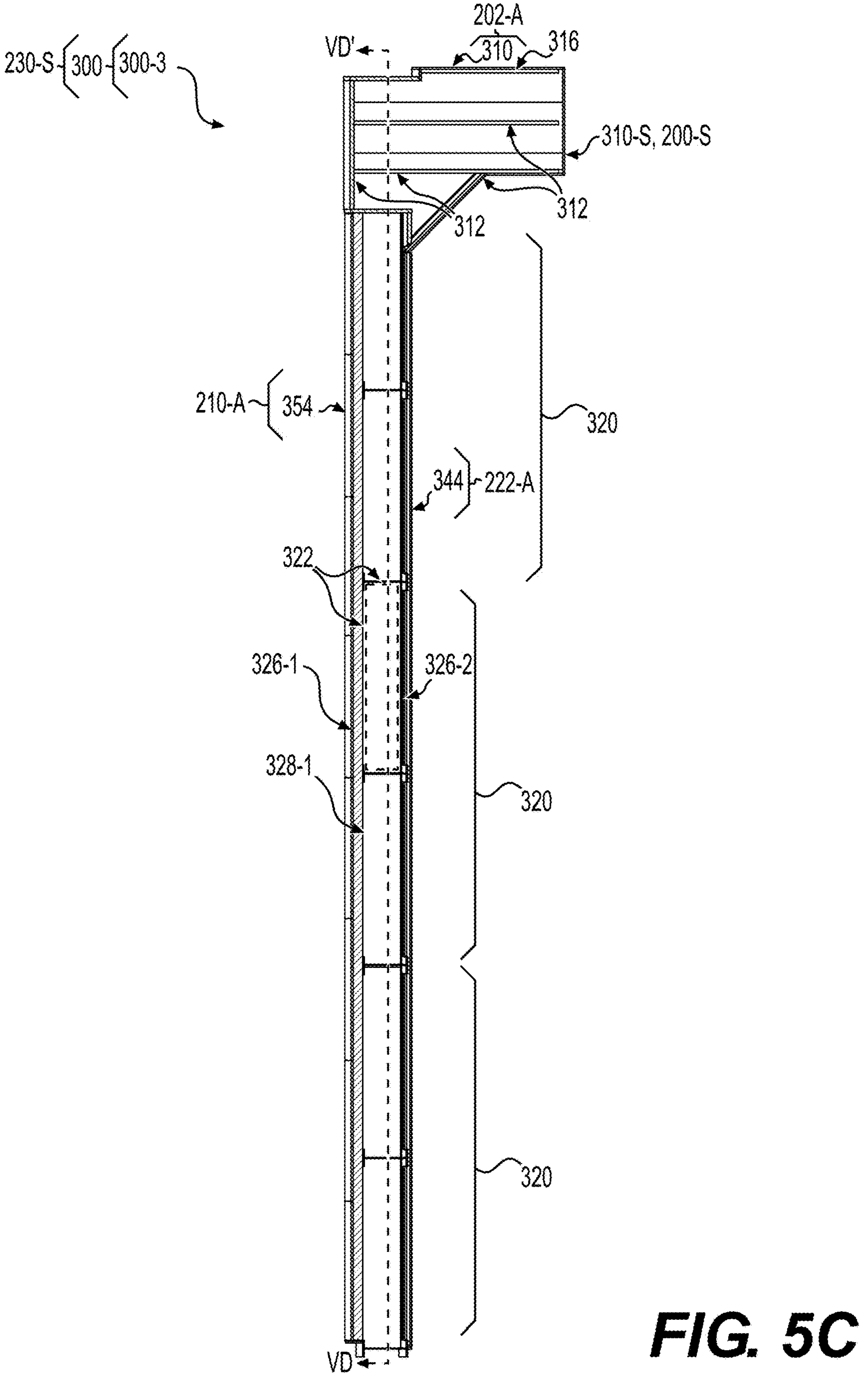
FIG. 5C is a cross-sectional elevation view of the MIRSS module of FIG. 5A along cross-sectional view line VC-VC' in FIG. 5A, according to some example embodiments.
Figure 5D:
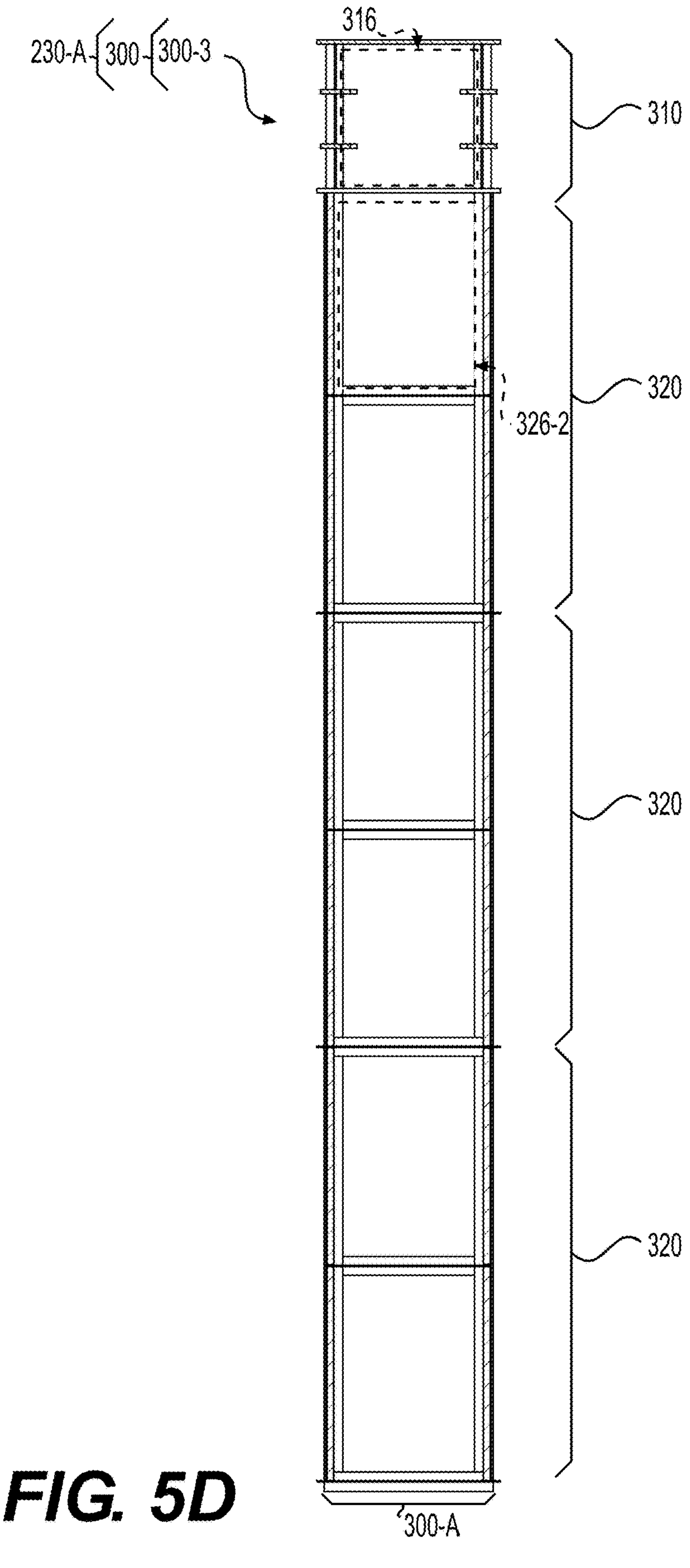
FIG. 5D is a cross-sectional elevation view of the MIRSS module of FIG. 5A along cross-sectional view line VD-VD' in FIG. 5C, according to some example embodiments.

FIGS. 5A and 5B are perspective views of a MIRSS module 300, according to some example embodiments. FIG. 5C is a cross-sectional elevation view of the MIRSS module 300 of FIG. 5A along cross-sectional view line VC-VC' in FIG. 5A, according to some example embodiments. FIG. 5D is a cross-sectional elevation view of the MIRSS module of FIG. 5A along cross-sectional view line VD-VD' in FIG. 5C, according to some example embodiments.

Referring to FIGS. 3A-5D, and as further shown in FIGS. 1A-F and 2A-2G, in some example embodiments the MIRSS assembly 200 is comprised of modular units, referred to herein as MIRSS modules 300, that may be assembled (e.g., coupled together) to construct at least the annular structure 230 of the MIRSS assembly 200. The MIRSS modules 300 may each be fabricated off-site (e.g., at a remote location) from the nuclear reactor building 102 construction site (e.g., by conventional fabrication techniques) and shipped easily to the nuclear reactor building 102 construction site to be coupled together "on site" (e.g., at the reactor building 102 construction site) to at least partially or entirely construct the MIRSS assembly 200. The constructed MIRSS assembly 200 may then be installed, mounted, etc. in place on seismic isolators 150 on the lower building structure 102-1 (e.g., based on being at least partially lowered into the containment pit 102-11) to establish the MIRSS assembly 200 as a seismically isolated structure.

As shown in FIGS. 1A-2G and 3A-5D, each MIRSS module 300 may define a separate azimuthal segment 230-A of the annular structure 230, and a plurality of MIRSS modules 300 (e.g., a combination of MIRSS modules 300-1, 300-2, and 300-3 as shown) may be coupled together azimuthally, for example via coupling opposing azimuthal edges 300-E of adjacent MIRSS modules 300 being coupled together, to define the annular structure 230 and thus at least partially construct the MIRSS assembly 200. Adjacent azimuthal edges 300-E of adjacently coupled MIRSS modules 300 of the MIRSS assembly 200 may be coupled together via various known processes, including welding, bonding via adhesive, riveting, or the like.

As shown in FIGS. 2A-5D, each separate MIRSS module 300 may include an upper modular structure 310 and one or more lower modular structures 320 axially stacked below the upper modular structure 310. The respective upper modular structures 310 of the coupled MIRSS modules 300 may collectively define the cylindrical reactor support structure 202 of the MIRSS assembly 200. Restated, each separate upper modular structure 310 of each separate MIRSS module 300 may define a separate azimuthal portion of the cylindrical reactor support structure 202 and the collector cylinder 210, and each separate combination of lower modular structures 320 of each separate MIRSS module 300 may define a separate azimuthal portion of the divider wall 222. For example, the respective lower modular structures 320 of the coupled MIRSS modules 300 may define the divider wall 222 of the MIRSS assembly 200 and may further, together with the upper modular structures 310, define the collector cylinder 210 of the MIRSS assembly 200. Additionally, as shown, the structural members 302 (e.g., steel structural members) of the MIRSS modules 300, which also comprise the structural members of the MIRSS assembly 200, may be configured to define one or more shielding chambers 392 in the MIRSS modules 300 in which one or more shielding materials 390 may be supplied and thus accommodated.

Additionally, the MIRSS modules 300 may be adjusted (e.g., increased or decreased in size), for example based on including or excluding certain structures comprising the MIRSS modules 300 during fabrication, to configure the MIRSS modules 300, and the resultant MIRSS assembly 200 from the coupling of such MIRSS modules 300, to accommodate different size reactors. For example, different quantities of lower modular structures 320 may be axially stacked under the respective upper modular structures 310 of the coupled MIRSS modules 300 of a MIRSS assembly 200 to adjust an axial height of the resultant MIRSS assembly 200. In another example, the MIRSS modules 300 may include different quantities of azimuthal segments 300-A, and/or different quantities of MIRSS modules 300 may be azimuthally coupled together, to adjust a diameter of the collector cylinder 210 of the MIRSS assembly 200. Additionally, different MIRSS modules 300 at least partially defining different exhaust ducts 216 (e.g., at least the openings 216-O1 and 216-O2 thereof), or the absence thereof in certain MIRSS modules 300, may be coupled together to at least partially construct a MIRSS assembly 200 that is configured to define a particular arrangement and configuration of exhaust ducts 216 to direct hot working fluid 244 out of the collector cylinder 210 and thus to control working fluid flow in the reactor cooling system 130. As a result, the MIRSS assembly 200 and MIRSS modules 300 thereof in some example embodiments are configured to provide improved flexibility to accommodate different size reactors and/or different cooling system flow path configurations with reduced or minimized re-design thereof.

As shown, each MIRSS module 300 may have respective structural members 302, including upper structural members 312 comprising the upper modular structure 310 and lower structural members 322 comprising the lower modular structures 320, may include structural members defining an inner sidewall surface 354 that, when the MIRSS modules 300 are coupled together, defines the collector cylinder 210 having inner cylindrical surface 212. As shown, the inner sidewall surface 354, including upper and lower inner sidewall surfaces 354-U and 354-L thereof, may be concave, such that a collector cylinder 210 collectively defined by the inner sidewall surfaces 354 of a plurality of MIRSS modules 300 coupled together may have a circular cylinder shape having a circular cross section. In addition, the coupled MIRSS modules 300 have respective structural members 302 defining an outer sidewall surface 344 and outer sidewall surface 310-S that, when the MIRSS modules 300 are coupled together, collectively define the divider wall 222 having outer cylindrical surface 223 and the outer sidewall surface 200-S of the MIRSS assembly 200, respectively. As shown, the outer sidewall surface 344 may be convex, such that a divider wall 222 collectively defined by the outer sidewall surfaces 344 of a plurality of MIRSS modules 300 coupled together may have a circular cylinder shape having a circular cross section.

It will be understood that, while the inner sidewall surface 354 and the upper and lower portions 354-U and 354-L thereof are shown in FIGS. 3A-5D to be concave, example embodiments are not limited thereto. For example, in some example embodiments, the inner sidewall surface 354 (including the upper and lower inner sidewall surfaces 354-U and 354-L thereof) may be a flat, planar surface, such that a collector cylinder 210 collectively defined by the inner sidewall surfaces 354 of a plurality of MIRSS modules 300 coupled together may have a polygon cylinder shape having a polygon cross section having a number (quantity) of sides that corresponds to the number of flat, planar “concave” surfaces 354 of the MIRSS modules 300 that are coupled together. It will also be understood that, while the outer sidewall surface 344 is shown in FIGS. 3A-5D to be convex, example embodiments are not limited thereto. For example, in some example embodiments, the outer sidewall surface 344 may be a flat, planar surface, such that a divider wall 222 collectively defined by the outer sidewall surfaces 344 of a plurality of MIRSS modules 300 coupled together may have a polygon cylinder shape having a polygon cross section having a number (quantity) of sides that corresponds to the number of flat, planar “convex” surfaces 344 of the MIRSS modules 300 that are coupled together.

As shown, each upper modular structure 310 may include upper structural members 312, including for example metal plates, plate girders, plate steel, steel beams, I-beams, etc. which collectively at least partially define a top 210-U of the collector cylinder 210 of the assembled MIRSS assembly 200 and thus at least partially define a top 224-U of the riser annulus 224 defined between the MIRSS assembly 200 and a reactor enclosure system 140 supported thereby. The upper structural members 312 may further at least partially define an upper shielding chamber 316, within an enclosure (e.g., cavity) defined by the upper structural members 312, that is configured to accommodate (e.g., hold, be filled with, etc.) an upper shielding material 318 (also referred to herein as a first shielding material) therein. Such an upper shielding material 318 may be supplied (e.g., poured) into the upper shielding chamber 316 (e.g., via an opening, hatch or the like in the upper surface 300-U of the upper modular structure 310) subsequently to the MIRSS modules 300 being coupled together to at least partially construct the MIRSS assembly 200, and the MIRSS assembly 200 further subsequently being mounted on seismic isolators 150 in a reactor building 102 being constructed. As a result, the overall weight of the MIRSS modules 300 and of the MIRSS assembly 200 during the installation process may be reduced. Such reduction in weight may result in simplifying fabrication and construction and installation of the cylindrical reactor support structure 202, collector cylinder 210 and divider wall 222, and shielding provided by the installed MIRSS assembly 200. In addition, such reduction in weight may result in reducing the associated costs of fabrication and construction and installation of the cylindrical reactor support structure 202, collector cylinder 210 and divider wall 222, and shielding provided by the installed MIRSS assembly 200. As shown, each upper modular structure 310 may define a separate upper shielding chamber 316 to include a region of the interior volume of the upper modular structure 310 that excludes one or more exhaust ducts 216 extending through the interior volume. It will be understood that the upper shielding chamber 316 may comprise a cavity that is defined by inner surfaces of one or more upper structural members 312 (e.g., beams, plates, girders, or the like) of the upper modular structure 310, alone or in combination with one or more duct structures (e.g., one or more exhaust duct structures 612) of an exhaust manifold structure 610 coupled to the MIRSS module 300.

As shown in FIGS. 1A-2G and as further shown in FIGS. 3A-3F and 4A-4D, one or more MIRSS modules 300, particularly the upper structural members 312 of one or more MIRSS modules 300, may be configured to at least partially define one or more exhaust ducts 216 of the MIRSS assembly 200, extending between an inlet opening 216-O1 of the MIRSS module 300 and an outlet opening 216-O2 of the MIRSS module 300. For example, the upper structural members 312 of one or more MIRSS modules 300 may define at least one or more inlet openings 216-O1 and one or more outlet openings 216-O2 of one or more exhaust ducts 216. A remainder structure of the one or more exhaust ducts 216 (e.g., one or more duct sidewalls extending between an inlet opening 216-O1 and an outlet opening 216-O2 through an interior of an upper modular structure 310) may be further defined by a separate duct structure (e.g., exhaust duct structure 612 of an exhaust manifold structure 610) that is coupled to the MIRSS module 300 and/or an annular structure 230 at least partially defined by the MIRSS module 300 so that the separate duct structure extends through the outlet opening 216-O2 and at least to the inlet opening 216-O1 to complete the definition of an exhaust duct 216 extending from the collector cylinder 210 and through the interior 308 of the MIRSS module 300 (e.g., from the inlet opening 216-O1 to at least the outlet opening 216-O2). The inlet opening 216-O1 may be defined in an inner sidewall surface 354-U that is configured to define a portion of the top 210-U of the collector cylinder 210 and thus the top 224-U of the riser annulus 224, and the outlet opening 216-O2 may be defined in a convex outer sidewall surface 310-S that is configured to define an outer sidewall surface 200-S of the MIRSS assembly 200 when the MIRSS modules 300 are coupled together. As a result, referring to FIGS. 2A-2G, the MIRSS assembly 200 that comprises coupled MIRSS modules 300 may include a plurality of exhaust ducts 216 extending through respective module interiors 308 of separate, respective MIRSS modules 300 between the top 210-U of the collector cylinder 210 and an outer sidewall surface 200-S of the MIRSS assembly 200. It will be understood that the collective module interiors 308 of the MIRSS modules 300 coupled together to construct (e.g., establish, define, etc.) at least the annular structure 230 may at least partially collectively define the interior 218 of the MIRSS assembly 200. It will be understood that the module interior 308 of each MIRSS module 300 may comprise one or more enclosures, cavities, or the like defined by inner surfaces of one or more structural members 302, including one or more upper structural members 312 and/or one or more lower structural members 322 of the MIRSS module 300, where the one or more upper structural members 312 and/or one or more lower structural members 322 may each include beams, plates, girders, or the like, which may be steel beams, steel plates, steel girders, or the like.

As shown in at least FIGS. 1A-2G, the exhaust ducts 216 may be further at least partially defined (e.g., the duct sidewalls of the exhaust ducts 216 may be defined) by one or more exhaust duct structures 612 of one or more exhaust manifold structures 610 that are coupled with the annular structure 230 so that the exhaust duct structures 612 extend through, at least one outlet opening 216-O2 and at least to at least one inlet opening 216-O1 via one or more respective interior spaces of one or more upper modular structures 310, so that the inlet openings 610-O1 of the one or more exhaust duct structures 612 are open to the top 210-U of the collector cylinder 210 and are configured to receive and direct hot working fluid 244 from the top 224-U of the riser annulus 224 towards the ambient environment 123 via at least the outlet opening 610-O2 of the exhaust manifold structure 610. However, it will be understood that in some example embodiments the upper structural members 312 may define an exhaust duct structure that completes the definition of an exhaust duct 216 through the module interior 308 of the MIRSS module 300 independently of any exhaust manifold structure 610 that is separate from the MIRSS module 300, such that an exhaust manifold structure 610 may be omitted from the MIRSS assembly 200.

As shown in FIGS. 3A-3F and 4A-4D, some MIRSS modules 300-1 and 300-2 of the MIRSS assembly 200 may include one or more openings 216-O1 and 216-O2 and thus may at least partially define one or more exhaust ducts 216 extending therethrough between such openings 216-O1 and 216-O2. Referring to FIGS. 5A-5D, in some example embodiments one or more MIRSS modules 300-3 comprising the MIRSS assembly 200 may omit the openings 216-O1 and 216-O2 and thus may be configured to not define any exhaust ducts 216 extending therethrough.

Accordingly, different combinations of MIRSS modules 300 having upper modular structures 310 that do or do not at least partially define one or more exhaust ducts 216 therethrough, when coupled together, may at least partially construct a MIRSS assembly 200 that is configured to include a particular arrangement and/or configuration of exhaust ducts 216 and therefore is configured to direct a particular arrangement of working fluid 240 flow out of the riser annulus 224 to control heat buildup in the riser annulus 224. Accordingly, the modular nature of the MIRSS assembly 200 via coupling various MIRSS modules 300 which may include or exclude structures at least partially defining one or more exhaust ducts 216 may enable improved flexibility in the design and construction of a MIRSS assembly 200 that provides a particular desired arrangement of exhaust flow paths out of the riser annulus 224 from the reactor enclosure system 140.

As shown in at least FIG. 2G, and as further shown in FIGS. 1A-1H, the upper structural members 312 of the upper modular structure 310, which at least partially define the cylindrical reactor support structure 202 of the MIRSS assembly 200 when the MIRSS modules 300 are coupled together, may be configured to contact and structurally support at least one structural portion 140-P of a reactor enclosure system 140 (which may be a part of the head 148, the primary vessel, 146, and/or the guard vessel 144) and may be configured to rest (e.g., at a bottom surface of a horizontal webbing of one or more plate girders of the structural members 302, at a bottom surface of a plate girder, steel plate or the like) on one or more seismic isolators 150 so as to transfer at least a portion of a structural load of the separate azimuthal segment 230-A and of the reactor enclosure system 140 supported by the MIRSS assembly 200 to the at least one seismic isolator 150.

As shown, each lower modular structure 320 may include lower structural members 322, including for example metal plates, plate girders, plate steel, steel beams, I-beams, etc. which collectively at least partially define a lower portion 210-L of the collector cylinder 210 of the assembled MIRSS assembly 200 and thus at least partially define a lower region 224-L of the riser annulus 224 defined between the MIRSS assembly 200 and a reactor enclosure system 140 supported thereby. The lower portion 210-L of the collector cylinder 210 may be a portion of the collector cylinder 210 that excludes the top 210-U thereof, and the lower portion 224-L of the riser annulus 224 may be a portion of the riser annulus 224 that excludes the top 224-U thereof. The lower structural members 322 may at least partially define the downcomer annulus 214 and the riser annulus 224 at opposite sidewall surfaces 344, 354 of the lower modular structure 320.

The lower structural members 322 may further at least partially define one or more lower shielding chambers 326 that are configured to hold one or more lower shielding materials 328 therein. The one or more lower shielding materials 328 accommodated in one or more lower shielding chambers 326 of the lower modular structures 320 may include the same material or a different material in relation to the upper shielding material 318 accommodated in one or more upper shielding chambers 316 of the upper modular structure 310. For example, the lower structural members 322 of multiple lower modular structures 320 in a given MIRSS module 300 may define an inner lower shielding chamber 326-1 that may extend axially between and/or through multiple axially-stacked (e.g., vertically stacked) lower modular structures 320, and the inner lower shielding chamber 326-1 may accommodate a first lower shielding material 328-1 which may include any thermal shielding material that may be configured to provide thermal shielding, including for example a thermal expanding break between the riser annulus 224 and the downcomer annulus 214 to improve performance of a reactor cooling system 130 that includes such downcomer and riser annuluses 214 and 224 as described herein. In another example, lower structural members 322 of multiple lower modular structures 320 in a given MIRSS module 300 may define one or more outer lower shielding chambers 326-2, located radially between the inner lower shielding chamber(s) 326-1 and the outer sidewall surface 344 at least partially defining the divider wall 222, where the one or more outer lower shielding chambers 326-2 may accommodate a second lower shielding material 328-2, which may be a radiation shielding material that is configured to provide radiological shielding to one or more spaces, structures, or the like which are external to the constructed MIRSS assembly 200.

In some example embodiments, the first lower shielding material 328-1 (e.g., thermal shielding material) may be installed in one or more first lower shielding chambers 326-1 in a MIRSS module 300 during fabrication of the MIRSS module 300 (e.g., as part of or independently of the load-bearing structure of the MIRSS module 300), prior to coupling MIRSS modules 300 together to at least partially construct the MIRSS assembly 200. For example, one or more MIRSS modules 300 may, prior to coupling of multiple MIRSS modules 300 together to form at least a portion of the MIRSS assembly 200 shown in FIGS. 1A-1H and 2A-2H, include the first lower shielding material 328-1 (also referred to herein as a second shielding material) in the inner lower shielding chamber 326-1, while the outer lower shielding chambers 326-2 may be empty and devoid of shielding materials. Such first lower shielding material 328-1 may include any thermal shielding materials, including for example one or more BTU-BOARD® panels, one or more vacuum panels, or the like, that may occupy (partially or entirely) the shielding chamber 326-1.

In some example embodiments, the outer lower shielding chambers 326-2 may initially be empty in an independently fabricated MIRSS module 300 prior to the MIRSS modules 300 being coupled together to at least partially construct the MIRSS assembly 200. The second lower shielding material(s) 328-2 (e.g., radiation shielding material) may be supplied into one or more second shielding chambers 326-2 of one or more MIRSS modules 300 subsequently to the MIRSS modules 300 being coupled together to at least partially construct the MIRSS assembly 200 and the MIRSS assembly 200 then being mounted onto seismic isolators 150 in the reactor building 102 being constructed, such that the second lower shielding material 328-2 (also referred to herein as a third shielding material) may be supplied into the second shielding chambers 326-2 while the MIRSS assembly 200 is already resting on the seismic isolators 150 in the reactor building 102. As a result, the fabricated MIRSS module 300 may be lighter (e.g., may have reduced weight) due to absence of the second lower shielding material 328-2 during initial fabrication and coupling of MIRSS modules 300 to at least partially construct the MIRSS assembly 200, thereby simplifying and reducing costs of fabrication, transport, and coupling of the MIRSS modules 300 to at least partially construct the MIRSS assembly 200 and to further simplifying and reducing costs of construction and installation of the MIRSS assembly 200 onto the seismic isolators 150.

As shown in FIGS. 1A-1H, the shielding chambers 296 of the MIRSS assembly 200 may be filled with various shielding materials 390 upon completion of the nuclear plant 100, where one or more upper shielding materials 318 occupies the collective upper shielding chambers 316 of the MIRSS modules 300 comprising the MIRSS assembly 200, where second shielding materials 328-1 occupied the collective lower inner shielding chambers 326-1 of the MIRSS modules 300 comprising the MIRSS assembly 200, and where third shielding chambers 328-2 occupy the collective lower outer shielding chambers 326-2 of the MIRSS modules 300 comprising the MIRSS assembly 200. As shown in FIGS. 2A-2G, the MIRSS assembly 200 may omit at least some of the shielding materials 390 prior to installation (e.g., mounting) of the MIRSS assembly 200 onto the seismic isolators 150, and such shielding materials 390 may be supplied into one or more shielding chambers 296 subsequent to the MIRSS assembly 200 being mounted on the seismic isolators 150, in order to reduce the weight of the MIRSS assembly 200 during mounting on the seismic isolators 150 and thus to reduce the cost and/or complexity of a construction process that includes such mounting.

As shown in FIGS. 1A-1H and 2A-2G, the MIRSS assembly 200 according to some example embodiments is configured to define at least one shielding chamber 296 (e.g., at least one of the upper shielding chamber 316, the first lower shielding chamber 326-1, and/or a second lower shielding chamber 326-1 of one or more MIRSS modules 300 comprising the MIRSS assembly 200) within an interior 218 of the MIRSS assembly 200 and radially outward in relation to the collector cylinder 210, wherein the at least one shielding chamber 296 is configured to hold at least one shielding material (e.g., one or more of the upper shielding material 318, the first lower shielding material 328-1, or the second lower shielding material 328-2), it will be understood that example embodiments are not limited thereto. For example, in some example embodiments, the MIRSS assembly 200 (and in some example embodiments, the MIRSS modules 300 comprising the MIRSS assembly 200) may entirely omit any shielding chambers 296 and/or shielding materials 390 and the reactor building 102 may include one or more shielding materials external to the MIRSS assembly 200 and configured to provide shielding of one or more spaces, structures, and/or equipment located external to the MIRSS assembly 200 and/or seismically isolated assembly 190.

Referring to FIGS. 2A-2G, 3A-3F, 4A-4D, and 5A-5D, the MIRSS assembly 200 may comprise multiple different MIRSS modules 300, including for example a combination of four first MIRSS modules 300-1, four second MIRSS modules 300-2, and two third MIRSS modules 300-3, where the first to third MIRSS modules 300-1 to 300-3 each have a common vertical height and respective azimuthal sizes which are respective multiples of a base azimuthal size and define respective angular sizes 300-1A, 300-2A, 300-3A, and may have different structures but still configured to be azimuthally coupled together, in order to configure the MIRSS assembly 200 to include different arrangements of exhaust ducts 216, different heights and/or diameters, or the like. Different MIRSS modules 300 may include different azimuthal (e.g., angular) size based on including different quantities of azimuthal segments 300-A having a same azimuthal size and which may include different structural members 302 which may cause the different MIRSS modules 300 to include or omit one or more exhaust ducts 216 therein.

For example, as shown in FIGS. 3A-3F, a first MIRSS module 300-1 may define two azimuthal segments 300-A which are azimuthally adjacent to each other and independently define a separate arc having a first angle, such that the combined two azimuthal segments 300-A of the first MIRSS module 300-1 define an arc having an angular size of 300-1A, where each of the azimuthal segments 300-A defines a separate exhaust duct 216 and thus the first MIRSS module 300-1 at least partially defines multiple (e.g., at least two) exhaust ducts 216. In contrast, as shown in FIGS. 4A-4D and 5A-5D, second and third MIRSS modules 300-2 and 300-3 each define one azimuthal segment 300-A that define a separate arc having respective angular sizes 300-2A and 300-3A (which may be the same angular size and half the angular size of the angular size 300-1A), where the second MIRSS module 300-2 at least partially defines a single exhaust duct 216 and the third MIRSS module 300-3 does not define any exhaust ducts 216 (e.g., no openings 216-O1 or 216-O2). Different combinations of the first to third MIRSS modules 300-1 to 300-3 may define a MIRSS module 300 having various arrangements of exhaust ducts 216 configured to define different particular exhaust flow paths out of the collector cylinder 210 and may further define different diameters of the collector cylinder 210 and therefore further define a diameter of a reactor enclosure system 140 (e.g., a diameter of the guard vessel 144, primary vessel 146, etc.) that may be supported by the MIRSS assembly 200 within the collector cylinder 210.

As shown in FIGS. 1A-1H and 2A-2G, the MIRSS modules 300 that are coupled together to define at least the annular structure 230 of the MIRSS assembly 200 may collectively define the cylindrical reactor support structure 202 of the MIRSS assembly 200 that is configured to structurally support the reactor enclosure system 140 on the plurality of seismic isolators 150 such that the MIRSS assembly 200 defines a seismically isolated assembly 190 within a nuclear plant 100 that includes the reactor enclosure system 140 and is seismically isolated from a reactor building 102. Additionally, the MIRSS modules 300 that are coupled together to define at least the annular structure 230 of the MIRSS assembly 200 may collectively define the collector cylinder 210 of the MIRSS assembly 200, where the collector cylinder 210 is configured to at least partially receive the reactor enclosure system 140 (e.g., receive at least the guard vessel 144) based on the reactor enclosure system 140 being structurally supported by the cylindrical reactor support structure 202, such that the collector cylinder 210 is configured to at least partially define a riser annulus 224 between an inner cylindrical surface 212 of the collector cylinder 210 and an outer sidewall surface 140-S of the reactor enclosure system 140 (e.g., an outer sidewall surface 144-S of the guard vessel 144, an outer sidewall surface of the primary vessel 146 in example embodiments where the reactor enclosure system 140 does not include any guard vessel, etc.). Additionally, the MIRSS modules 300 that are coupled together to define at least the annular structure 230 of the MIRSS assembly 200 may collectively define the divider wall 222 of the MIRSS assembly 200, where the divider wall 222 is configured to at least partially define a downcomer annulus 214 between an outer cylindrical surface 223 of the divider wall 222 and the reactor building 102, wherein a bottom opening 214-B of the downcomer annulus 214 is in fluid communication with a bottom opening 224-B of the riser annulus 224. Additionally, the MIRSS modules 300 that are coupled together to define at least the annular structure 230 of the MIRSS assembly 200 may collectively at least partially define a plurality of exhaust ducts 216 extending through an interior 204 of the cylindrical reactor support structure 202 from the collector cylinder 210 (e.g., extending to an outer sidewall surface 200-S of the MIRSS assembly 200 that is opposite to the inner cylindrical surface 212 of the collector cylinder 210).

As shown in FIGS. 1A-1H, 2A-2G, and 3A-5D, as the MIRSS modules 300 are coupled together (e.g., azimuthally coupled together between azimuthal edges 300-E of adjacent MIRSS modules 300) to collectively define at least the annular structures 230 of the MIRSS assembly 200, it will be understood that the MIRSS modules 300 of the MIRSS assembly 200 may define separate azimuthal segments 230-A of at least the annular structure 230, such that each MIRSS module 300 of the MIRSS modules 300 defining the annular structure 230 defines a separate, respective azimuthal segment 202-A of the cylindrical reactor support structure 202, a separate, respective azimuthal segment 210-A of the collector cylinder 210, and a separate, respective azimuthal segment 222-A of azimuthal segment of the divider wall 222. In addition, as shown in at least FIGS. 1A-1H, 2A-2G, and 3A-5D, in each MIRSS module 300 of the plurality of MIRSS modules 300 defining the annular structure 230, the upper modular structure 310 of the MIRSS module 300 defines a separate, respective azimuthal segment 202-A of the cylindrical reactor support structure 202, such that the respective upper modular structures 310 of the MIRSS modules 300 that are coupled together to define the annular structures 230 of the MIRSS assembly 200 collectively define the cylindrical reactor support structures 202, and the respective interiors (including upper shielding chambers 316) of the upper modular structures 310 of the coupled MIRSS modules 300 collectively define the interior 204 of the cylindrical reactor support structure 202. The upper modular structure 310 of each of such MIRSS modules 300 may or may not at least partially define at least one exhaust duct 216 of the plurality of exhaust ducts 216 of the MIRSS assembly 200. In addition, as shown in at least FIGS. 1A-1H, 2A-2G, and 3A-5D, in each MIRSS module 300 of the MIRSS modules 300 defining the annular structure 230, the one or more lower modular structures 320 stacked axially under the upper modular structure 310 of the MIRSS module 300 collectively defining the separate azimuthal segment 222-A of the divider wall 222 of the MIRSS assembly 200, and the upper modular structure 310 and the one or more lower modular structures 320 of the MIRSS module 300, may collectively define the separate azimuthal segment 210-A of the collector cylinder 210 of the MIRSS assembly 200. As further shown, each separate upper modular structure 310 may define an upper surface 300-U which may be a separate upper surface of the MIRSS module 300 and/or which may define an azimuthal section of the upper surface 200-U of a MIRSS assembly 200, such that the respective upper surfaces 300-U of the coupled MIRSS modules 300 of the MIRSS assembly 200 may collectively define the upper surface 200-U of the MIRSS assembly 200.

As shown in FIGS. 3A-F, 4A-4D, and 5A-5D, in each MIRSS module 300 of the plurality of coupled MIRSS modules 300 of a annular structure 230 of a MIRSS assembly 200, where each MIRSS module 300 includes an upper modular structure 310 and one or more lower modular structures 320 stacked axially under the upper modular structure 310, the one or more lower modular structures 320 may collectively define a outer sidewall surface 344 defining a separate azimuthal segment 222-A of a divider wall 222 of the annular structure 230, and the upper modular structure 310 and the one or more lower modular structures 320 may have respective inner sidewall surfaces 354-U and 354-L that collectively define a separate azimuthal segment 210-A of a collector cylinder 210 of the annular structure 230.

As shown, each separate azimuthal segment 210-A of the collector cylinder 210 that is defined by a separate MIRSS module 300 may be configured to at least partially define a separate azimuthal segment 224-A of the riser annulus 224 between the inner sidewall surface 354 at least partially defining the separate azimuthal segment 210-A of the collector cylinder 210 and an opposing azimuthal segment of the outer sidewall surface 140-S of the reactor enclosure system 140 which may be an opposing azimuthal segment of the outer sidewall surface 144-S of the guard vessel 144, an outer sidewall surface of the primary vessel 146 in example embodiments where the reactor enclosure system 140 does not include any guard vessel, or the like. Restated, in a MIRSS assembly 200 structurally supporting the reactor enclosure system 140 such that the reactor enclosure system 140 and the collector cylinder 210 collectively at least partially define the riser annulus 224, the respective azimuthal segments 210-A of the collector cylinder 210 that are defined by the respective MIRSS modules 300 of the MIRSS assembly 200 may at least partially define separate, respective azimuthal segments 224-A that collectively define the riser annulus 224 that is at least partially defined between the collector cylinder 210 and the reactor enclosure system 140. As further shown, each separate azimuthal segment 222-A of the divider wall 222 that is defined by a separate MIRSS module 300 may be configured to at least partially define a separate azimuthal segment 214-A of the downcomer annulus 214 between the outer sidewall surface 344 at least partially defining the separate azimuthal segment 222-A of the divider wall 222 and an opposing azimuthal segment of the reactor building 102 (e.g., the inner containment pit surface 102-11S of the containment pit 102-11). Restated, in a MIRSS assembly 200 structurally supported and seismically isolated from a reactor building 102, such that the divider wall 222 of the MIRSS assembly 200 and the reactor building 102 (e.g., containment pit 102-11) collectively at least partially define the downcomer annulus 214, the respective azimuthal segments 222-A of the divider wall 222 that are defined by the respective MIRSS modules 300 of the MIRSS assembly 200 may at least partially define separate, respective azimuthal segments 214-A that collectively define the downcomer annulus 214 that is at least partially defined between the divider wall 222 and the reactor building 102.

The MIRSS modules 300 according to any of the example embodiments may be fabricated offsite in relation to a nuclear reactor building 102 construction site (e.g., fabricated at one or more remote sites) based on implementation of conventional fabrication techniques (e.g., welding, cutting, riveting, etc. of steel structural members 302, which may include plate girders, plate steel, steel beams, I-beams, or the like) and may be shipped easily (together or separately) to the reactor building 102 construction site for assembly via coupling the MIRSS modules 300 together (e.g., via coupling opposing azimuthal edges 300-E of separate adjacent MIRSS modules 300 together via welding, riveting, bonding, or the like).

The modular configuration of the MIRSS assembly 200, via coupled MIRSS modules 300, may be configured to simplify overall project construction and fabrication of a nuclear plant 100, particularly the construction of structures to structurally support and seismically isolate the reactor enclosure system 140 and to define air flow passages of the reactor cooling system 130. On-site fabrication of such structures (e.g., the MIRSS modules 300) may be complex. For example, such on-site fabrication of such structures may include separation of certain materials used in the construction of such structures from other materials used in the construction of other portions of the reactor building 102, for example to protect the separated materials from contamination. In some example embodiments, the MIRSS modules 300 which may be coupled together to at least partially construct the MIRSS assembly 200 may be further fabricated off site (e.g., at one or more remote locations that are external to the nuclear plant 100), transported to the reactor building 102 construction site at the nuclear plant 100 together or separately, and then coupled together at the construction site (e.g., adjacent to the reactor building 102 being constructed) to construct at least a portion of the MIRSS assembly 200 which may then be installed (e.g., mounted) on seismic isolators 150 as a single-piece structure (e.g., via hoisting and lowering the coupled-together annular structure 230 onto the seismic isolators 150 via operation of one or more cranes). Off-site fabrication of the structures of the MIRSS assembly 200 (e.g., MIRSS modules 300, exhaust manifold structures 610, etc.) and then transporting such fabricated structures to the reactor building 102 construction site to be coupled together and then to install the constructed MIRSS assembly 200 as a single-piece structure on the seismic isolators 150 may reduce costs associated with logistical upkeep of construction areas/labor at the reactor building 102 construction site. The modular design of the MIRSS assembly 200 based at least in part upon coupling MIRSS modules 300 together may enable flexible and conventional fabrication methods to fabricate the MIRSS modules. For example, MIRSS modules 300 may utilize a plate girder design of structural members 302 allowing the use of water jet, plasma cutter, or laser cutting operations for ease of fabrication of the structural members 302 of the MIRSS modules 300 and assembly of such structural members 302 into the MIRSS modules 300 themselves (e.g., using welding of the structural members 302 together using one or more jigs). It will be understood that the upper and lower modular structures 310 and 320 of a MIRSS module 300 may be coupled together, to form the MIRSS module 300, based on coupling the respective upper and lower structural members 312 and 322 of the upper modular structure 310 and an uppermost lower modular structure 320 together, and further coupling respective lower structural members 322 of axially-adjacent lower modular structures 320 together, via known processes, including welding, riveting, or the like. In some example embodiments, separate upper and lower modular structures 310 and 320 of a given MIRSS module 300 may be fabricated independently and subsequently coupled together to form the given MIRSS module 300.

The MIRSS assembly 200 that comprises MIRSS modules 300 coupled together to at least partially define the annular structures 230 of the MIRSS assembly 200 may be configured to simplify construction techniques used to construct a nuclear plant 100 and may be further configured to enable flexibility in fabrication techniques and arrangements of structures, shielding, and conduits of the MIRSS assembly 200. In some example embodiments, where the MIRSS assembly 200 comprises MIRSS modules 300 (alone or in combination with exhaust manifold structures 610) which may be fabricated remotely at various locations and then transported to the reactor building construction site to be coupled together to construct the MIRSS assembly 200, the MIRSS assembly 200 may be configured to enable asynchronous fabrication thereof relative to other structures included in the reactor building 102, thereby reducing, minimizing, or preventing construction bottleneck concerns in the construction of the reactor building 102. In addition, the MIRSS assembly 200 may be configured to reduce seismic design demands on the entire reactor enclosure system 140, allowing for a significantly more economical structural design of some of the most expensive equipment required for the nuclear plant 100. The MIRSS assembly 200 may enable a more compact arrangement of equipment within the reactor building 102, reducing civil structural costs based on reducing excavation, backfill, and concrete pour requirements.

While FIGS. 3A-5D illustrate MIRSS modules 300 that each include at least one upper modular structure 310 and one or more lower modular structures 320 stacked axially beneath, it will be understood that example embodiments are not limited thereto. For example, in some example embodiments, the MIRSS module 300 may be constructed as a single piece structure, instead of including separate upper and/or lower modular structures 310 and/or 320.

While FIGS. 3A-5D show MIRSS modules 300 comprising azimuthal segments 230-A of the annular structure 230, where each MIRSS module 300 includes an upper modular structure 310 and one or more lower modular structures 320 stacked axially, and where multiple such MIRSS modules 300 may be azimuthally coupled together to construct the annular structure 230 and thus to at least partially construct the MIRSS assembly 200, it will be understood that example embodiments are not limited thereto. For example, in some example embodiments, the MIRSS modules 300 may include separate upper modular structures 310 and lower modular structures 320 which may be independently fabricated at one or more sites (e.g., one or more remote sites that are remote from the reactor building 102 construction site) and transported independently or together (without being coupled together) to the reactor building 102 construction site, and the MIRSS assembly 200 may be constructed based on axially stacking and coupling separate groups (e.g., rings) of lower modular structures 320 on top of each other and then coupling the upper modular structures 310 (e.g., individually or as a constructed cylindrical reactor support structure 202) on the coupled sets (e.g., rings) of lower modular structures 320 to at least construct the annular structure 230 and to at least partially construct the MIRSS assembly 200.

While FIGS. 1A-2G illustrate a MIRSS assembly 200 that includes a plurality of MIRSS modules 300 coupled together to collectively establish the annular structure 230 and thus at least partially define the MIRSS assembly 200, it will be understood that example embodiments are not limited thereto. For example, in some example embodiments, the MIRSS assembly 200 shown in FIGS. 1A-2G may be a non-modular Isolated Reactor Support System (IRSS) that is at least partially constructed as a single piece structure, instead of being constructed based on coupling multiple MIRSS modules 300 together. As a result, in some example embodiments the MIRSS assembly 200 shown in FIGS. 1A-2G may be a non-modular Isolated Reactor Support System (IRSS) that includes the collector cylinder 210, the cylindrical reactor support structure 202, the divider wall 222, and one or more exhaust ducts 216 (and in some example embodiments further including one or more shielding chambers 296) may not comprise any MIRSS modules 300. In some example embodiments, the MIRSS assembly 200 may be a non-modular Isolated Reactor Support System (IRSS) that is at least partially constructed within the reactor building 102 construction site, for example constructed on the lower building structure 102-1 and at least partially within the containment pit 102-11, without separately fabricating and coupling separate MIRSS modules 300 together.

FIGS. 6A and 6B are perspective views of a MIRSS exhaust manifold structure 610, according to some example embodiments. FIG. 6C is a cross-sectional perspective view of the MIRSS exhaust manifold structure 610 of FIG. 6A along cross-sectional view line VIC-VIC' in FIG. 6A, according to some example embodiments.

Referring to FIGS. 6A to 6C and further referring to FIGS. 1A-1H and 2A-2G, a MIRSS assembly 200 may include one or more exhaust manifold structures 610 including at least one exhaust duct structure 612 having a first opening 610-O1 and coupled to at least one outlet duct 614 having a second opening 610-O2. The one or more exhaust manifold structures 610 may be configured to be coupled with the annular structures 230 (e.g., to one or more MIRSS modules 300, to the cylindrical reactor support structure 202, etc.), for example such that one or more exhaust duct structures 612 of the exhaust manifold structures 610 may extend through an interior 218 of the MIRSS assembly 200 (e.g., through respective one or more outlet openings 216-O2 and at least to respective one or more inlet openings 216-O1), so that an inlet opening 610-O1 defined by the one or more exhaust duct structures 612 is open to (e.g., extends to and/or extends into) the collector cylinder 210 defined by the annular structure 230 of the MIRSS assembly 200 and thus is configured to be open to a riser annulus 224 defined between the collector cylinder 210 and an outer sidewall surface 140-S of the reactor enclosure system 140 (e.g., an outer sidewall surface 144-S of the guard vessel 144, an outer sidewall surface of the primary vessel 146 in example embodiments where the reactor enclosure system 140 does not include any guard vessel, etc.), when the reactor enclosure system 140 is coupled to the MIRSS assembly 200. Thus, an exhaust duct structure 612 of the exhaust manifold structure 610 may define one or more duct sidewalls of an exhaust duct 216. As a result, one or more exhaust ducts 216 of the MIRSS assembly 200 may be at least partially defined by at least one or more exhaust duct structures 612 of one or more exhaust manifold structures 610.

As shown in at least FIGS. 1A-2G, an exhaust manifold structure 610 may be coupled to the annular structure 230 so that at least one exhaust duct structure 612 of the exhaust manifold structure 610 may at least partially define an upper shielding chamber 316 in the MIRSS assembly 200. As a result, an upper shielding material 318 may be supplied (e.g., poured) into the upper shielding chamber 316 to fill the chamber while the exhaust duct 216 that is defined by the upper structural members 312 of the upper modular structure 310 and at least the exhaust duct structure 612 of the exhaust manifold structure 610 enables working fluid 240 to flow out of the riser annulus 224 and through the exhaust manifold structure 610 to an exterior of the MIRSS assembly 200 while remaining isolated from the upper shielding material 318.

As shown in at least FIGS. 1A-1H, the exhaust manifold structures 610 may be considered to be part of the constructed MIRSS assembly 200 and may be considered to be part of the seismically isolated assembly 190 and thus included in a seismically isolated exhaust portion 232 of a reactor cooling system 130. The exhaust manifold structures 610 may be configured to be coupled at respective second openings 610-O2 thereof, to respective openings 126-O1 of respective seismically non-isolated exhaust conduits 126.

As further shown, the second opening 610-O2 of an exhaust manifold structure 610 may be configured to be coupled to a flexible duct 620 that is configured to be coupled between, and to establish fluid communication between opposing openings 610-O2 and 126-O1 of the exhaust manifold structure 610 and the seismically non-isolated exhaust conduit 126 and thereby to maintain integrity of the reactor cooling system circulation path 236 during movement of the seismically isolated assembly 190 with seismically isolated exhaust portion 232 independently of the reactor building 102 and seismically non-isolated exhaust portion 120. In some example embodiments, the one or more flexible ducts 620 may be considered to be a part of the MIRSS assembly 200, but example embodiments are not limited thereto. In some example embodiments, the one or more flexible ducts 620 may be considered to be external to the MIRSS assembly 200.

As shown, in some example embodiments the exhaust manifold structure 610 may include one or more exhaust duct structures 612 that are configured to at least partially define one or more exhaust ducts 216 of the MIRSS assembly 200 (e.g., define one or more duct sidewalls thereof). The exhaust manifold structure 610 may further include an outlet duct 614 that is configured to couple with a seismically non-isolated exhaust conduit 126 and thus is configured to be coupled between the one or more exhaust ducts 216 (at least partially defined by the one or more exhaust duct structures 612) and the flexible duct 620 to be configured to direct the hot working fluid 244 from the exhaust manifold structure 610 and into a seismically non-isolated exhaust portion 120 of the reactor cooling system 130. As shown, the exhaust manifold structure 610 may include at least two exhaust duct structures 612 coupled in parallel to the outlet duct 614 via a collector duct 616, such that the exhaust manifold structure 610 at least partially defines at least two exhaust ducts 216 coupled in parallel to the outlet duct 614, but example embodiments are not limited thereto.

Referring to FIGS. 1A-1G, 2A-2F, and 6A-6C, in some example embodiments, an exhaust manifold assembly 600 includes each of the exhaust manifold structure 610, the flexible duct 620, and the seismically non-isolated exhaust conduit 126 that are coupled together as a single assembly. A shown, the one or more first openings 610-O1 of the exhaust manifold structure 610 may define a first opening 600-O1 of the exhaust manifold assembly 600, and an opposite opening 126-O2 of the conduit 126 from the first opening 126-O1 that is connected to the flexible duct 620 may define a second opening 600-O2 of the exhaust manifold assembly 600. The exhaust manifold assembly 600, including coupled exhaust manifold structure 610, flexible duct 620, and the seismically non-isolated exhaust conduit 126 may be coupled to one or more MIRSS modules 300 and/or a MIRSS assembly 200 to include the exhaust manifold structure 610 in the MIRSS assembly 200, while the seismically non-isolated exhaust conduit 126 may be coupled to a reactor building structure and/or one or more separate non-isolated portions of the reactor cooling system 130 (e.g., to a seismically non-isolated exhaust conduit 126).

In some example embodiments, the exhaust manifold assembly 600 may omit the seismically non-isolated exhaust conduit 126, such that the exhaust manifold assembly 600 that may be coupled with a MIRSS module 300 and/or MIRSS assembly 200 may include the exhaust manifold structure 610 and the flexible duct 620 coupled thereto with an exposed opening 620-O of the flexible duct 620. The exposed opening 620-O of the flexible duct 620 may then be coupled to a seismically non-isolated exhaust conduit 126 of the seismically non-isolated exhaust portion 120 of the reactor cooling system 130 subsequently to the exhaust manifold assembly 600 being coupled with the MIRSS module 300 and/or MIRSS assembly 200 (e.g., subsequently to the MIRSS assembly 200 being mounted on seismic isolators 150 on a lower building structure 102-1, such that the exposed opening of the flexible duct 620 may then be coupled to a seismically non-isolated exhaust conduit 126 as part of further construction subsequently to such mounting as part of completing the reactor building 102).

The flexible duct 620 may include a bellows, flexible seal, expandable seal, or the like which is configured to flex (e.g., elastically flex) in response to movement of the exhaust manifold structure 610 in relation to the seismically non-isolated exhaust conduit 126 without compromising the sealing of the flow path extending through the flexible duct 620 between the exhaust manifold structure 610 and the seismically non-isolated exhaust conduit 126, thereby to maintain integrity of the reactor cooling system circulation path 236 during movement of the seismically isolated assembly 190 with seismically isolated exhaust portion 232 independently of the reactor building 102 and seismically non-isolated exhaust portion 120. The flexible duct 620 according to some example embodiments may comprise (partially or entirely) a flexible material, for example Inconel 625, Inconel 718, Stainless Steel 316, Stainless Steel 304, a fluoroelastomer material (which may be referred to as a fluoroelastomer seal material), a fluorocarbon elastomer (FKM) polymer material, or the like.

In some example embodiments, the exhaust manifold assembly 600 may omit both the seismically non-isolated exhaust conduit 126 and the flexible duct 620, such that the exhaust manifold assembly 600 is the exhaust manifold structure 610. The exhaust manifold structure 610 may be coupled to one or more MIRSS modules 300 and/or a MIRSS assembly 200 that includes multiple coupled MIRSS modules 300 concurrently with the outlet opening 610-O2 of the exhaust manifold structure 610 being exposed. The exposed opening 610-O2 may be coupled to the flexible duct 620, and the flexible duct 620 may be coupled to the seismically non-isolated exhaust conduit 126, subsequently to the exhaust manifold structure 610 being coupled to one or more MIRSS modules 300 and/or a MIRSS assembly 200 that includes multiple coupled MIRSS modules 300.

Still referring to FIGS. 6A-6C, in some example embodiments, the exhaust manifold structure 610 may include multiple exhaust duct structures 612 which may be configured to extend through separate, respective outlet openings 216-O2 of one or more MIRSS modules 300 and to further extend to separate, respective inlet openings 216-O1 to at least partially define separate, respective exhaust ducts 216. The multiple exhaust duct structures 612 may be coupled in parallel with an outlet duct 614 of the exhaust manifold structure 610 via a collector duct 616. As a result, and as shown for example in FIG. 2D, a single exhaust manifold structure 610 may at least partially define multiple azimuthally spaced separate exhaust ducts 216.

While the example embodiments of an exhaust manifold structure 610 shown in FIGS. 6A-6C include four separate exhaust duct structures 612 coupled in parallel with the outlet duct 614 via the collector duct 616, it will be understood that an exhaust manifold structure 610 may include different quantities of exhaust duct structures 612 configured to at least partially define different quantities of exhaust ducts 216. For example, an exhaust manifold structure 610 may include any quantity of separate exhaust duct structures 612 coupled in parallel with the outlet duct 614 via the collector duct 616, including two separate exhaust duct structures 612, three separate exhaust duct structures 612, five separate exhaust duct structures 612, or the like. In another example, the exhaust manifold structure 610 may include a single exhaust duct structure 612 coupled in series with an outlet duct 614 where the collector duct 616 is omitted from the exhaust manifold structure 610. In some example embodiments, the exhaust manifold structure 610 may include a single duct structure that defines both a single exhaust duct structure 612 and a single outlet duct 614 coupled in series.

As shown in FIGS. 6A-6C and as further shown in FIGS. 1A-1H and 2A-2G, the exhaust duct structure(s) 612, outlet duct 614, and collector duct 616 of the exhaust manifold structure 610 may each have a circular cross section, such that the exhaust duct structure(s) 612, outlet duct 614, and collector duct 616 may be considered to be circular cylindrical ducts and may at least partially define one or more exhaust ducts 216 to be circular cylindrical ducts having one or more circular cylindrical duct sidewalls having a circular cross-section. But example embodiments are not limited thereto, and in some example embodiments the exhaust duct structure(s) 612, outlet duct 614, and collector duct 616 may each independently have a cylindrical shape that is different from a circular cylinder and has a non-circular cross section and may define one or more exhaust ducts 216 to have non-circular cylinder duct sidewalls. For example, one or more of the exhaust duct structure(s) 612, the outlet ducts 614, or the collector duct 616 may have a polygonal cylinder shape that has a polygon cross-section. Such a polygon may be any polygon, including for example a nonagon, decagon, or the like.

Figure 7A:
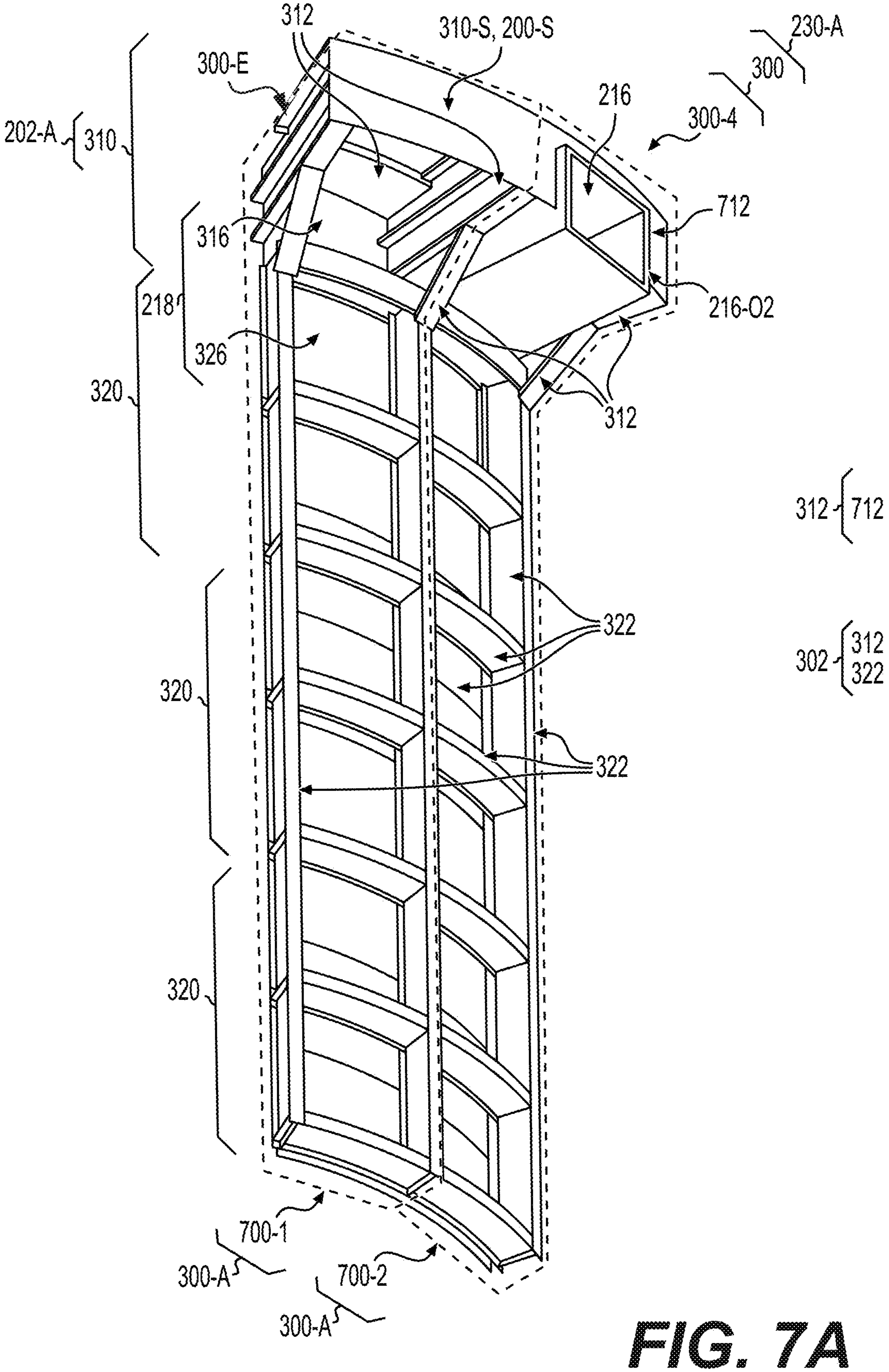
FIGS. 7A and 7B are perspective views of a MIRSS module, according to some example embodiments.
Figure 7B:
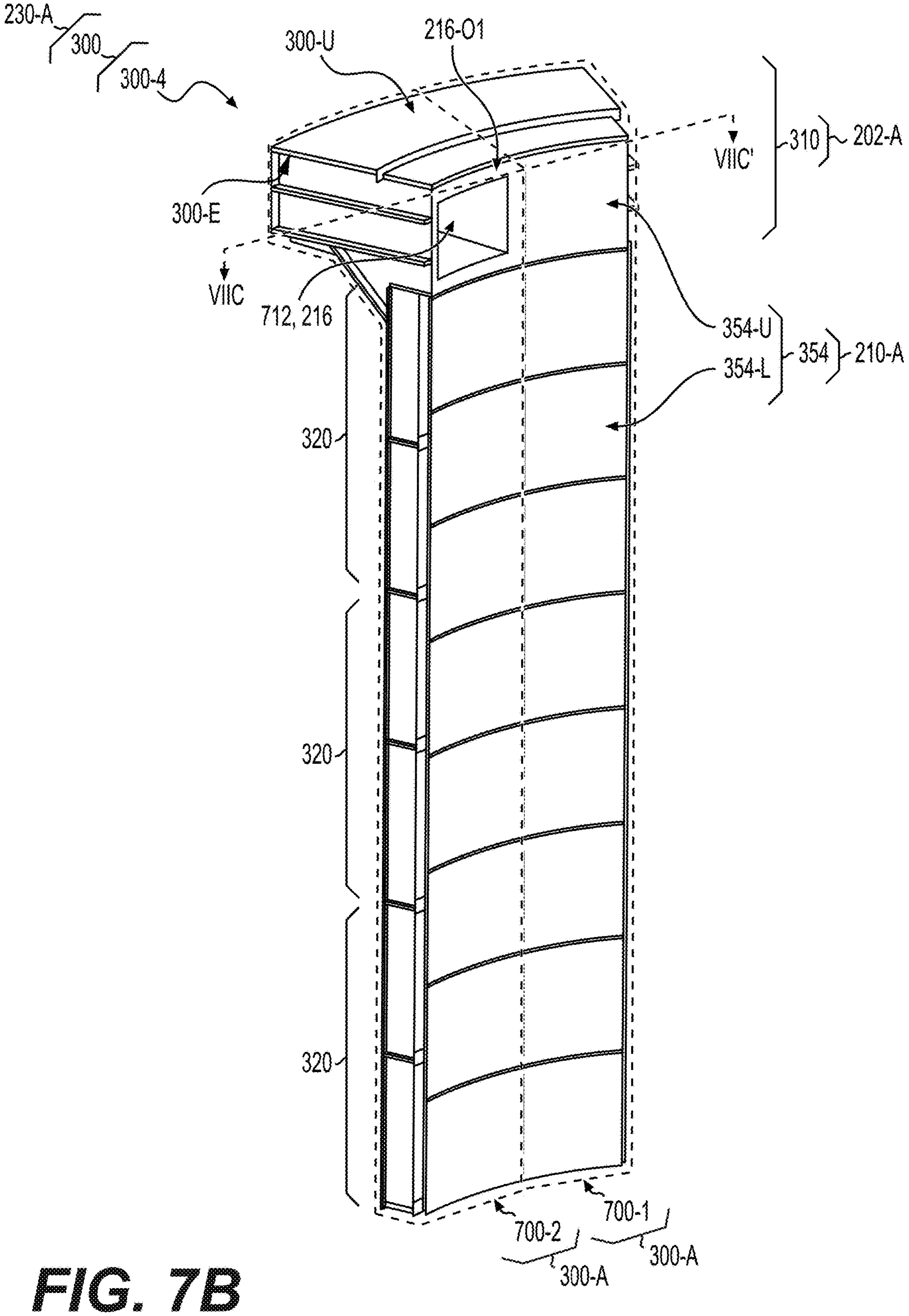
Figure 7C:
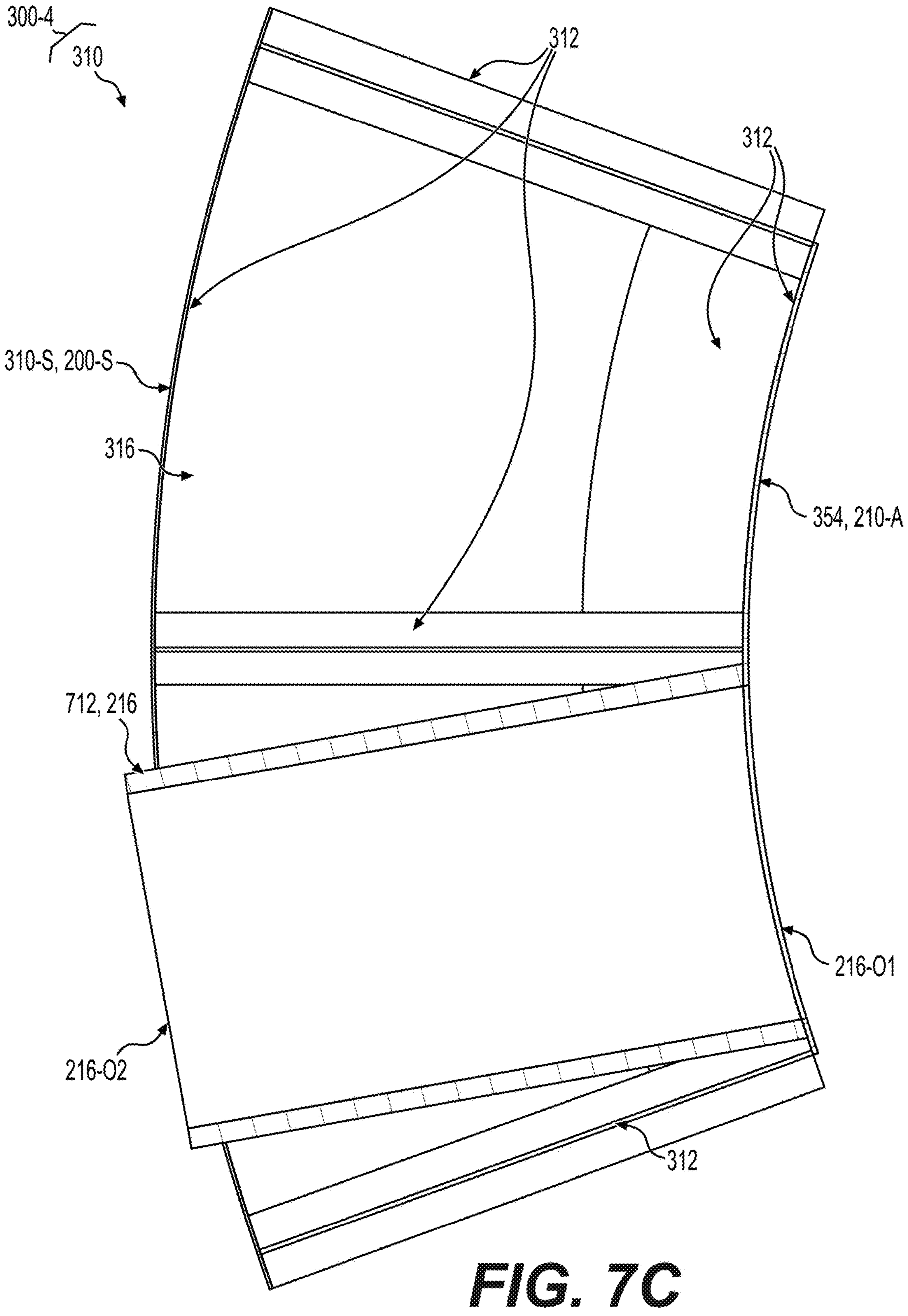
FIG. 7C is a cross-sectional elevation view of the MIRSS module of FIG. 7A along cross-sectional view line VIIC-VIIC' in FIG. 7B, according to some example embodiments.

FIGS. 7A and 7B are perspective views of a MIRSS module 300, according to some example embodiments. FIG. 7C is a cross-sectional elevation view of the MIRSS module of FIG. 7A along cross-sectional view line VIIC-VIIC' in FIG. 7B, according to some example embodiments.

Figure 8A:
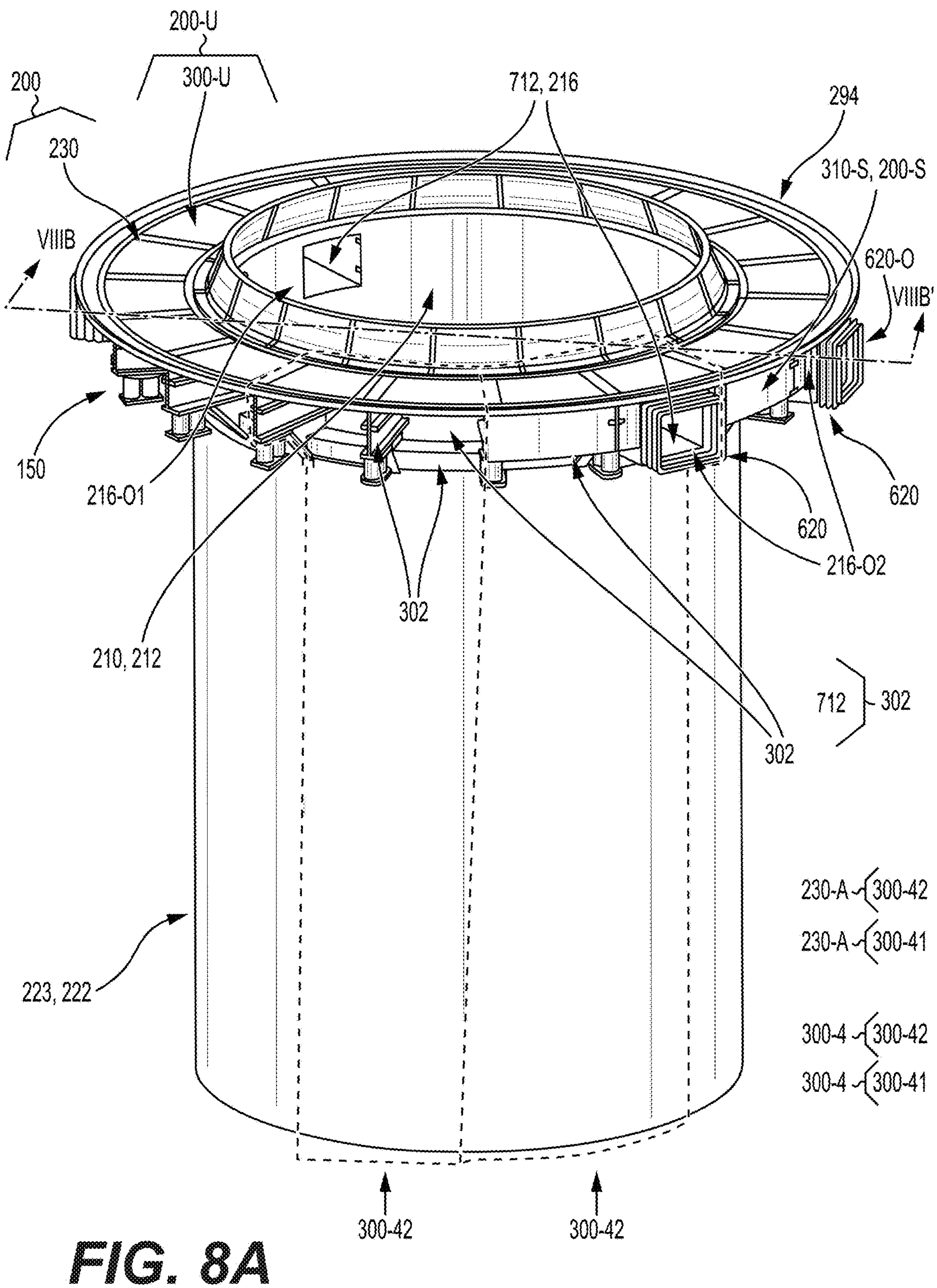
FIG. 8A is a perspective view of a MIRSS assembly, according to some example embodiments.
Figure 8B:
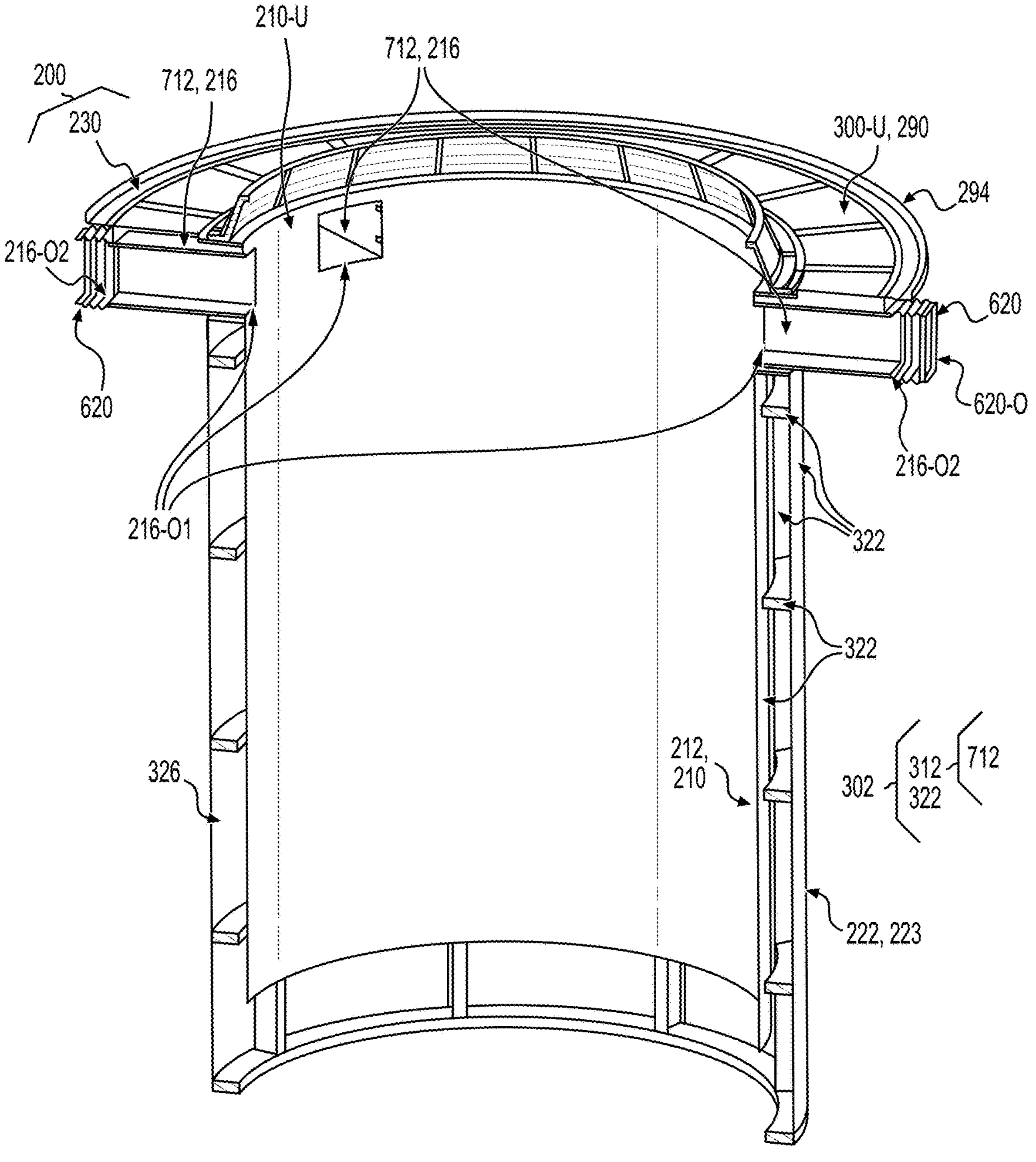
FIG. 8B is a cross-sectional perspective view of the MIRSS assembly of FIG. 8A along cross-sectional view line VIIIB-VIIIB' in FIG. 8A, according to some example embodiments.

FIG. 8A is a perspective view of a MIRSS assembly 200, according to some example embodiments. FIG. 8B is a cross-sectional perspective view of the MIRSS assembly 200 of FIG. 8A along cross-sectional view line VIIIB-VIIIB' in FIG. 8A, according to some example embodiments.

Figure 9A:
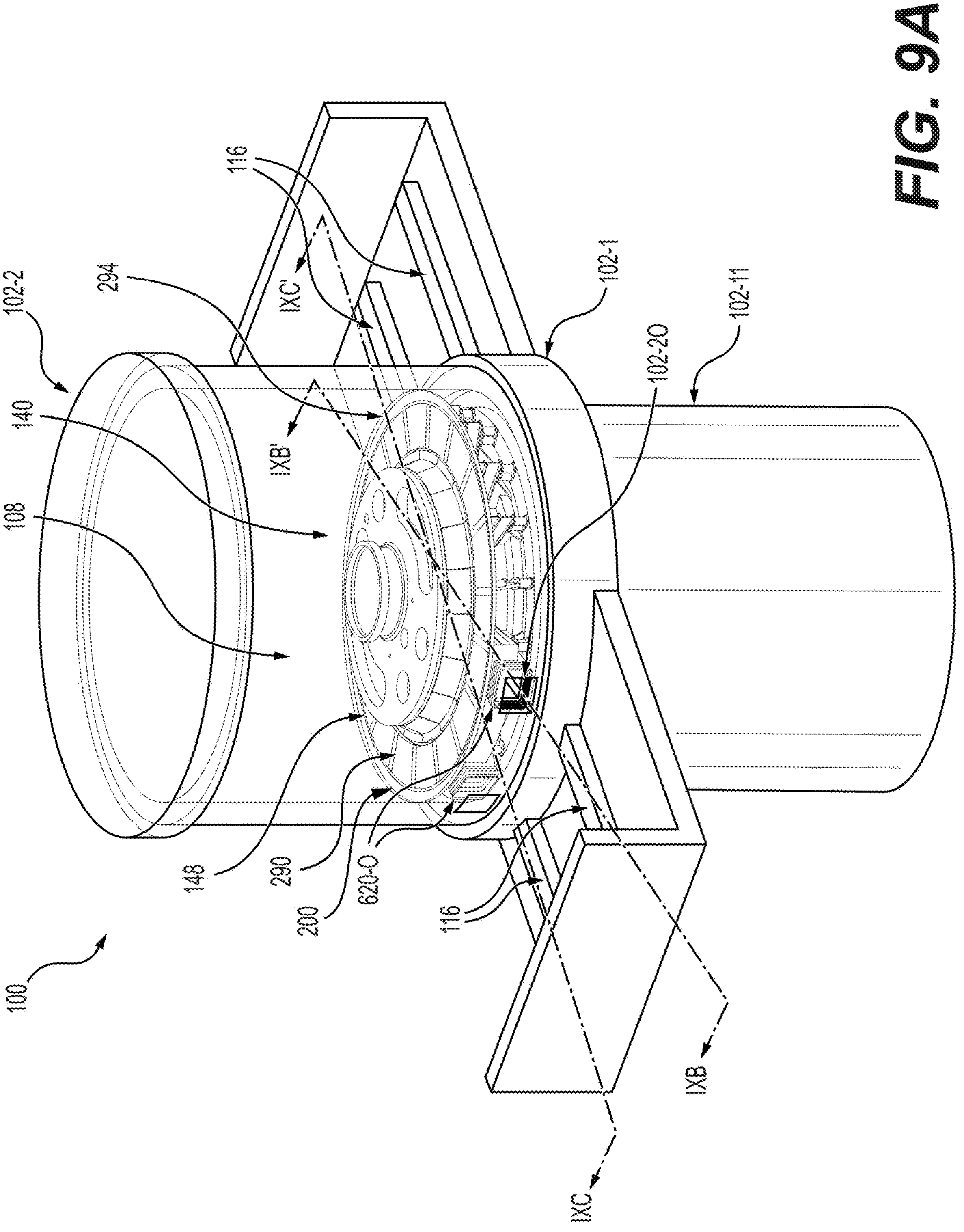
FIG. 9A is a perspective view of a reactor building including the MIRSS assembly of FIG. 8A, according to some example embodiments.
Figure 9B:
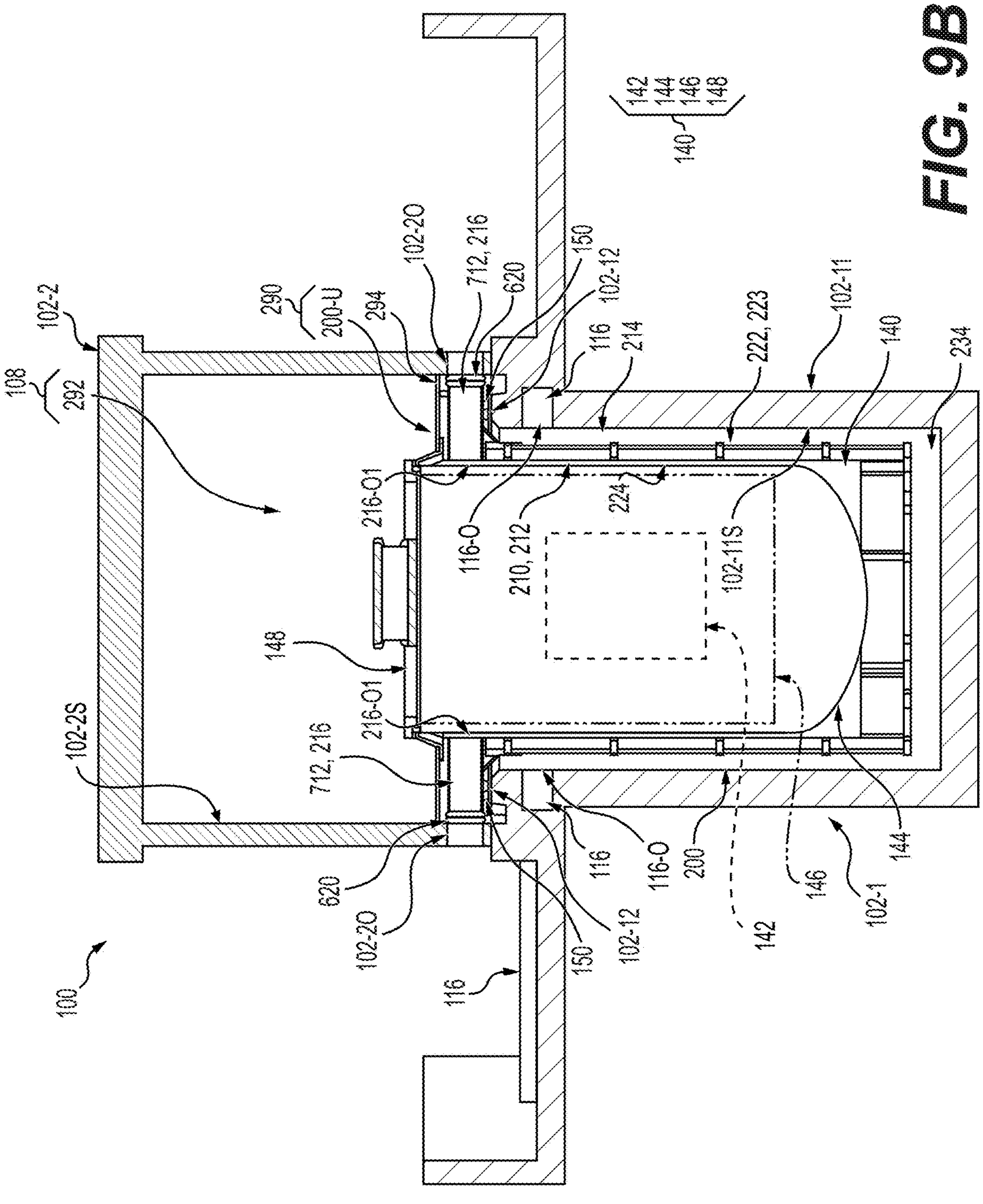
FIG. 9B is a cross-sectional elevation view of the reactor building of FIG. 9A along cross-sectional view line IXB-IXB' in FIG. 9A, according to some example embodiments.
Figure 9C:
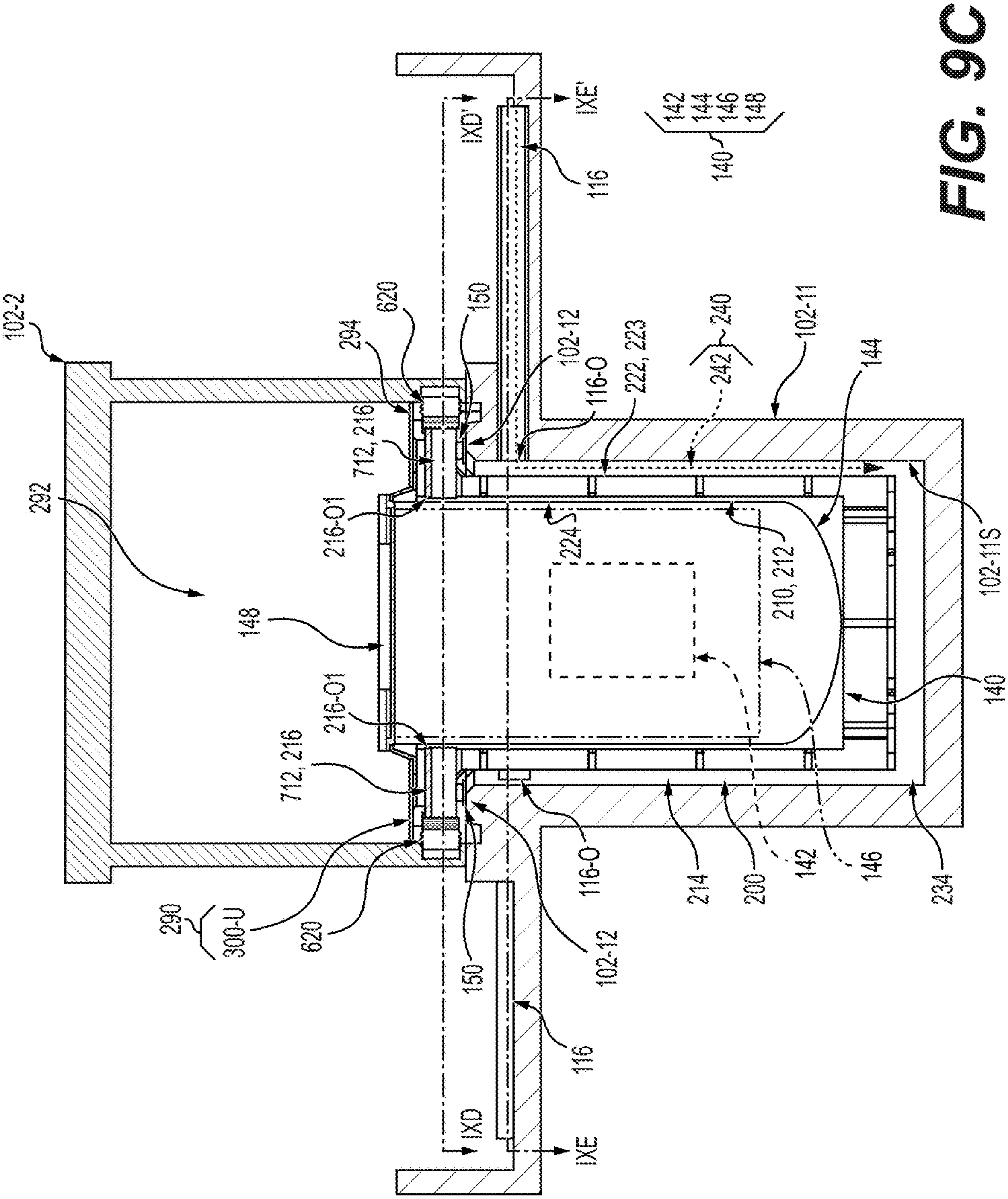
FIG. 9C is a cross-sectional elevation view of the reactor building of FIG. 9A along cross-sectional view line IXC-IXC' in FIG. 9A, according to some example embodiments.
Figure 9D:
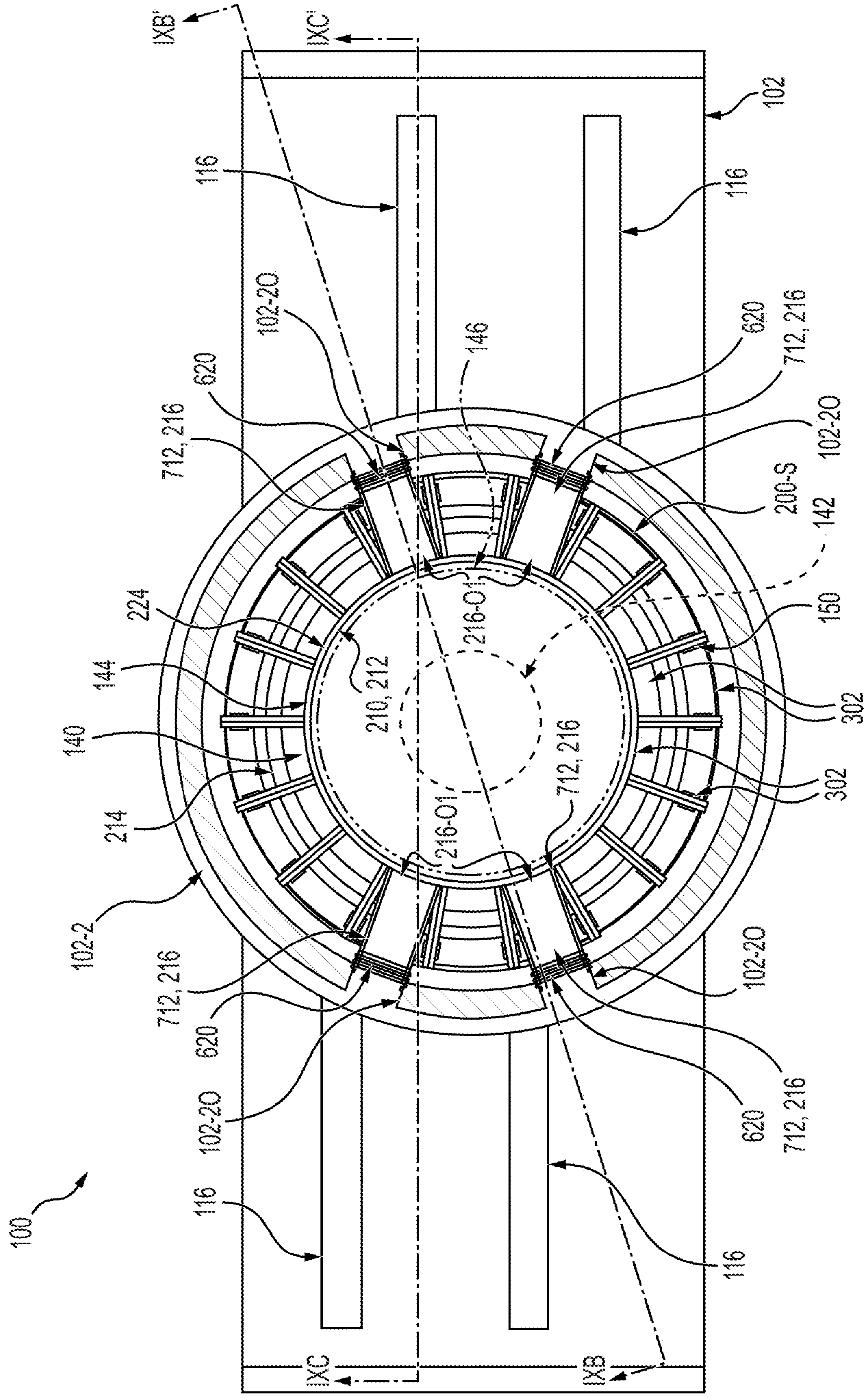
FIG. 9D is a cross-sectional top plan view of the reactor building of FIG. 9A along cross-sectional view line IXD-IXD' in FIG. 9C, according to some example embodiments.
Figure 9E:
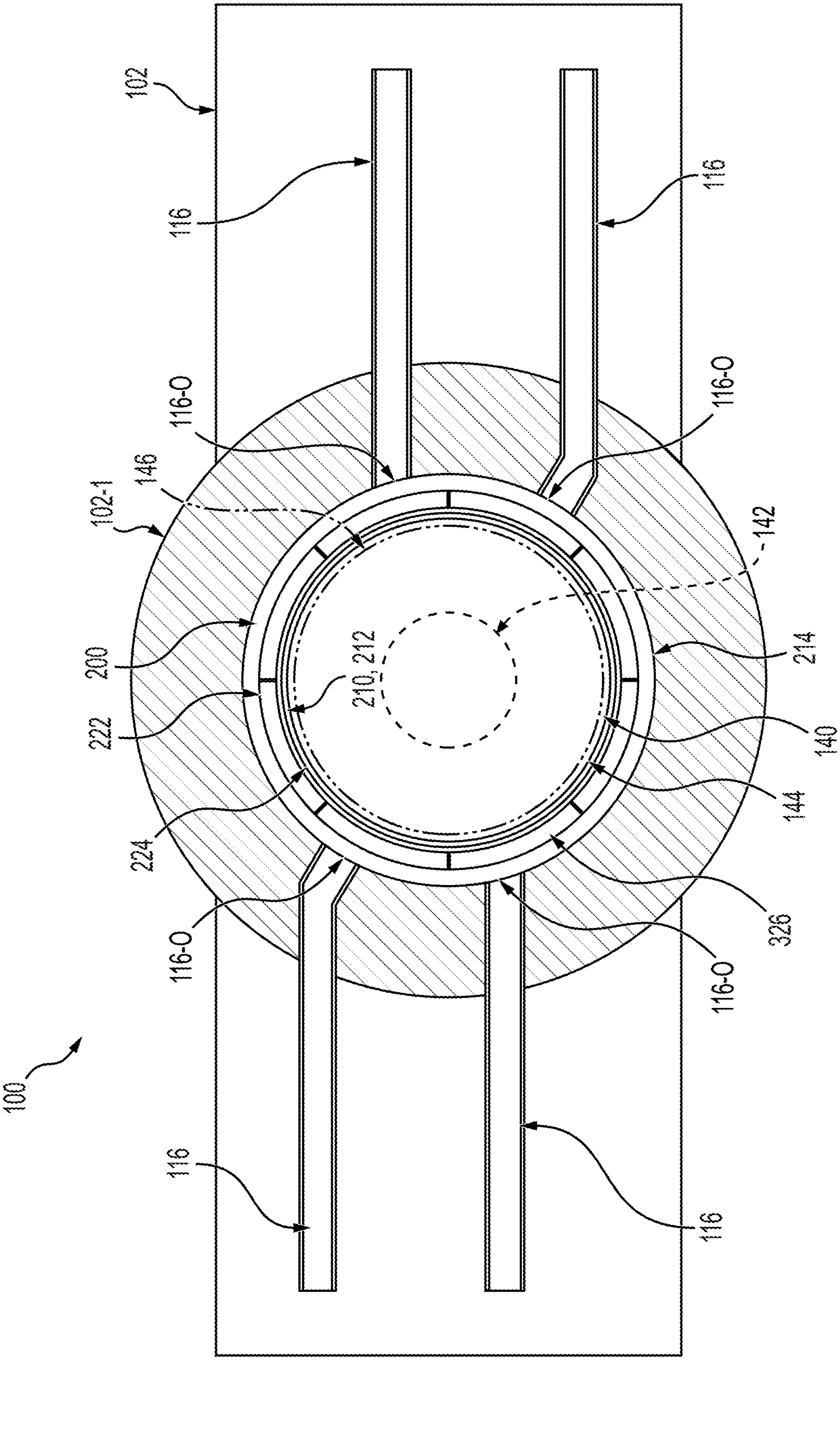
FIG. 9E is a cross-sectional top plan view of the reactor building of FIG. 9A along cross-sectional view line IXE-IXE' in FIG. 9C, according to some example embodiments.

FIG. 9A is a perspective view of a reactor building including the MIRSS assembly of FIG. 8A, according to some example embodiments. FIG. 9B is a cross-sectional elevation view of the reactor building of FIG. 9A along cross-sectional view line IXB-IXB' in FIG. 9A and FIG. 9D, according to some example embodiments. FIG. 9C is a cross-sectional elevation view of the reactor building of FIG. 9A along cross-sectional view line IXC-IXC' in FIG. 9A and FIG. 9D, according to some example embodiments. FIG. 9D is a cross-sectional top plan view of the reactor building of FIG. 9A along cross-sectional view line IXD-IXD' in FIG. 9C, according to some example embodiments. FIG. 9E is a cross-sectional top plan view of the reactor building of FIG. 9A along cross-sectional view line IXE-IXE' in FIG. 9C, according to some example embodiments.

Figure 10A:
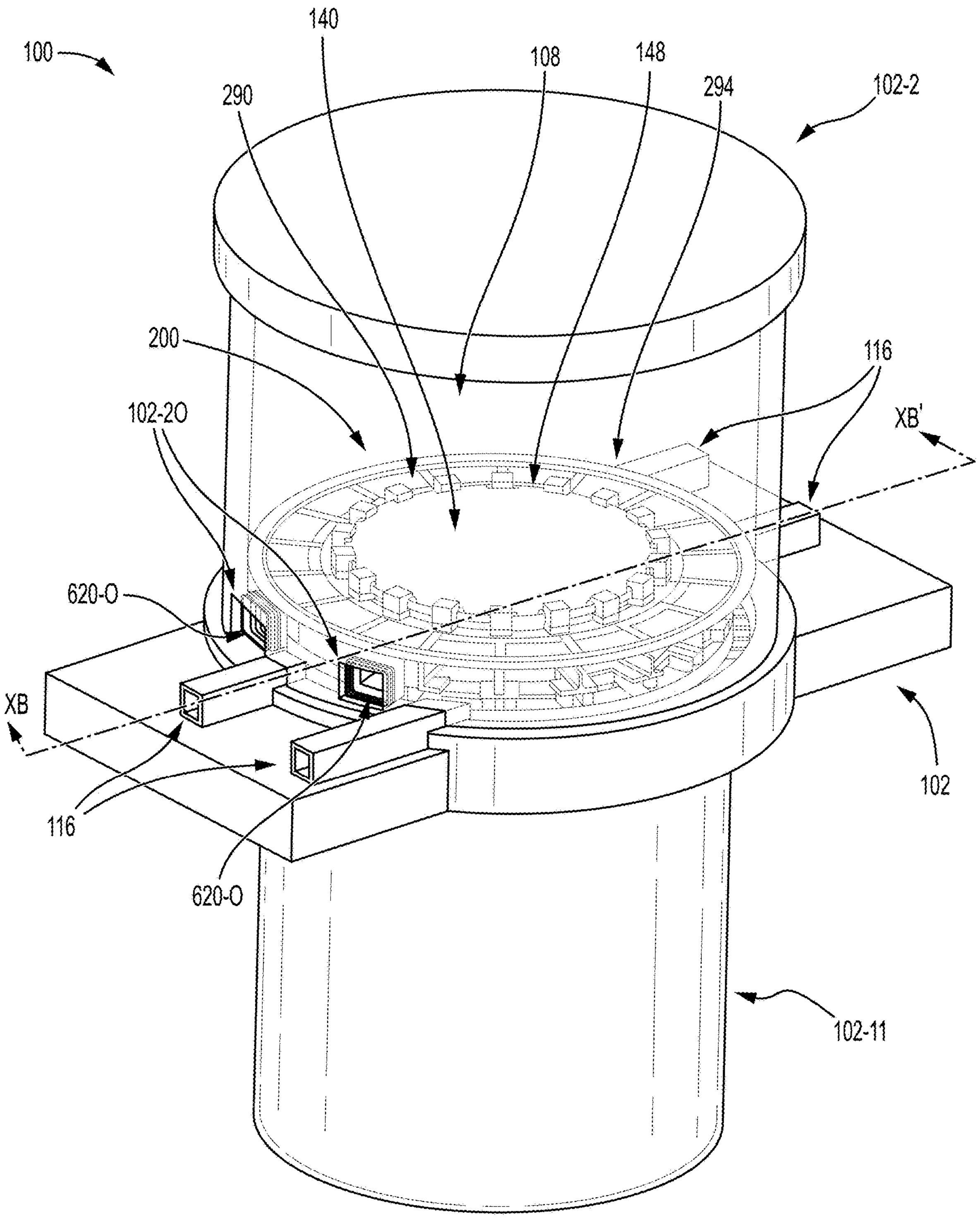
FIG. 10A is a perspective view of a reactor building including the MIRSS assembly of FIG. 8A, according to some example embodiments.
Figure 10B:
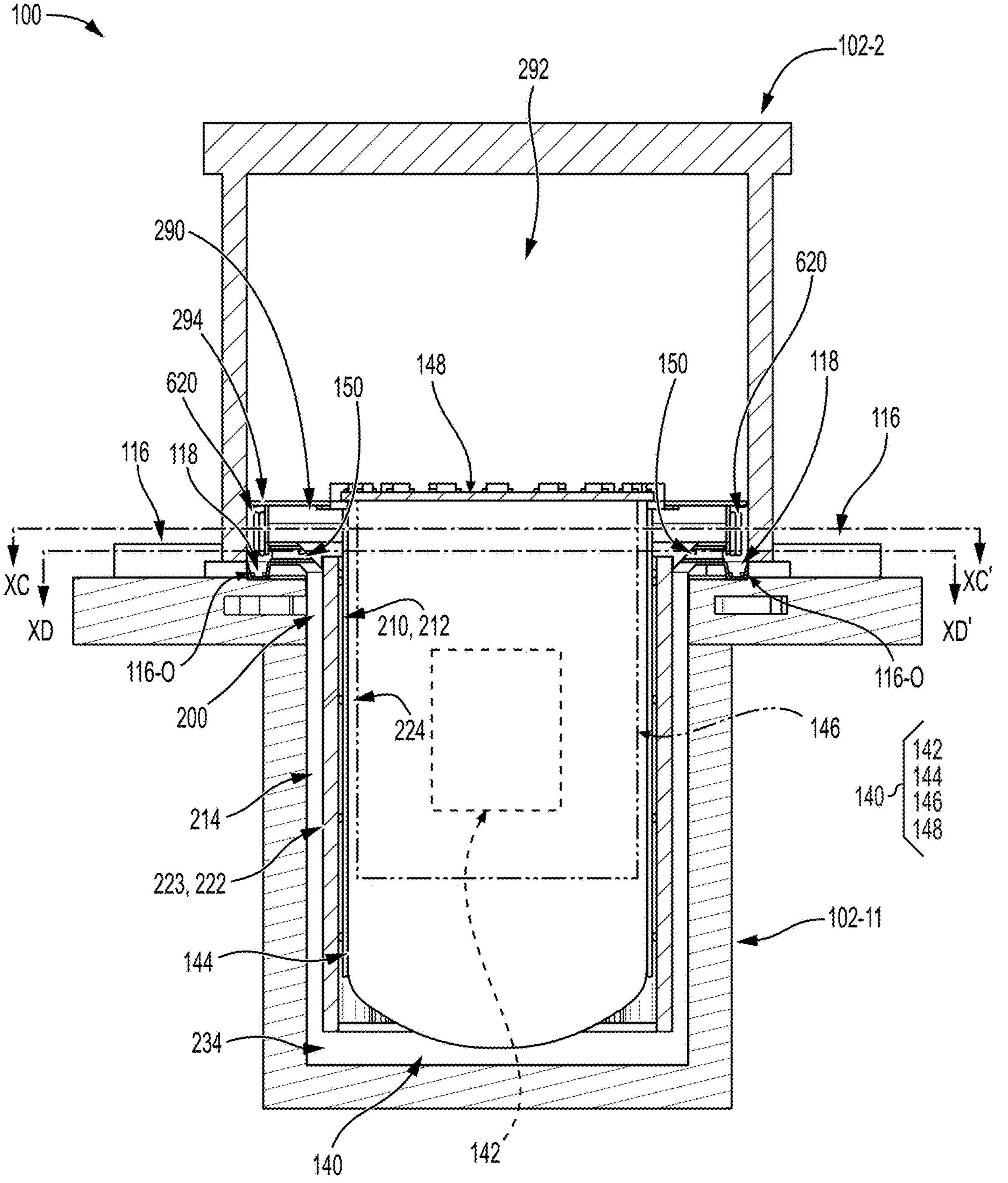
FIG. 10B is a cross-sectional elevation view of the reactor building of FIG. 10A along cross-sectional view line XB-XB' in FIG. 10A, according to some example embodiments.
Figure 10C:
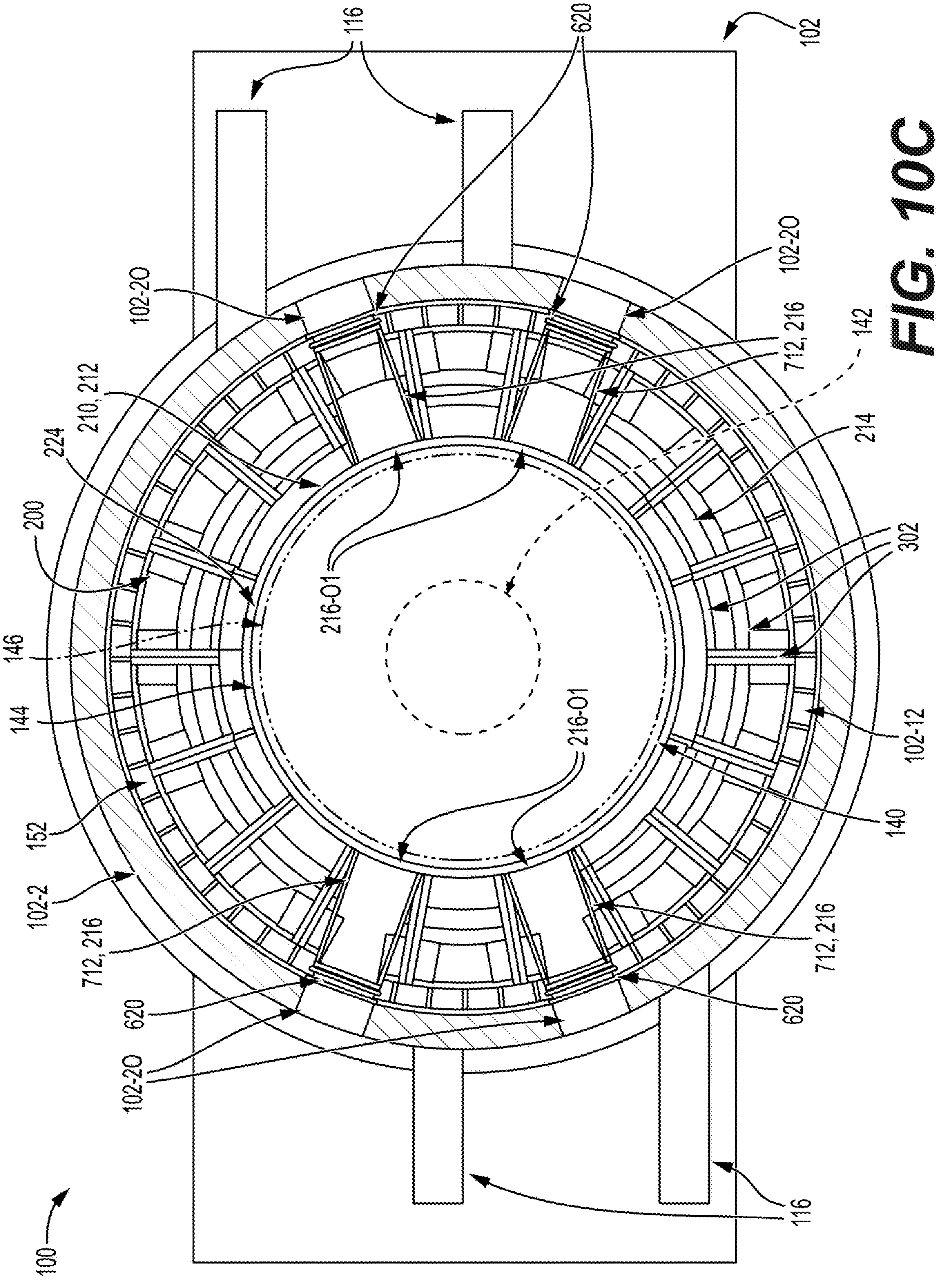
FIG. 10C is a cross-sectional top plan view of the reactor building of FIG. 10A along cross-sectional view line XC-XC' in FIG. 10B, according to some example embodiments.
Figure 10D:
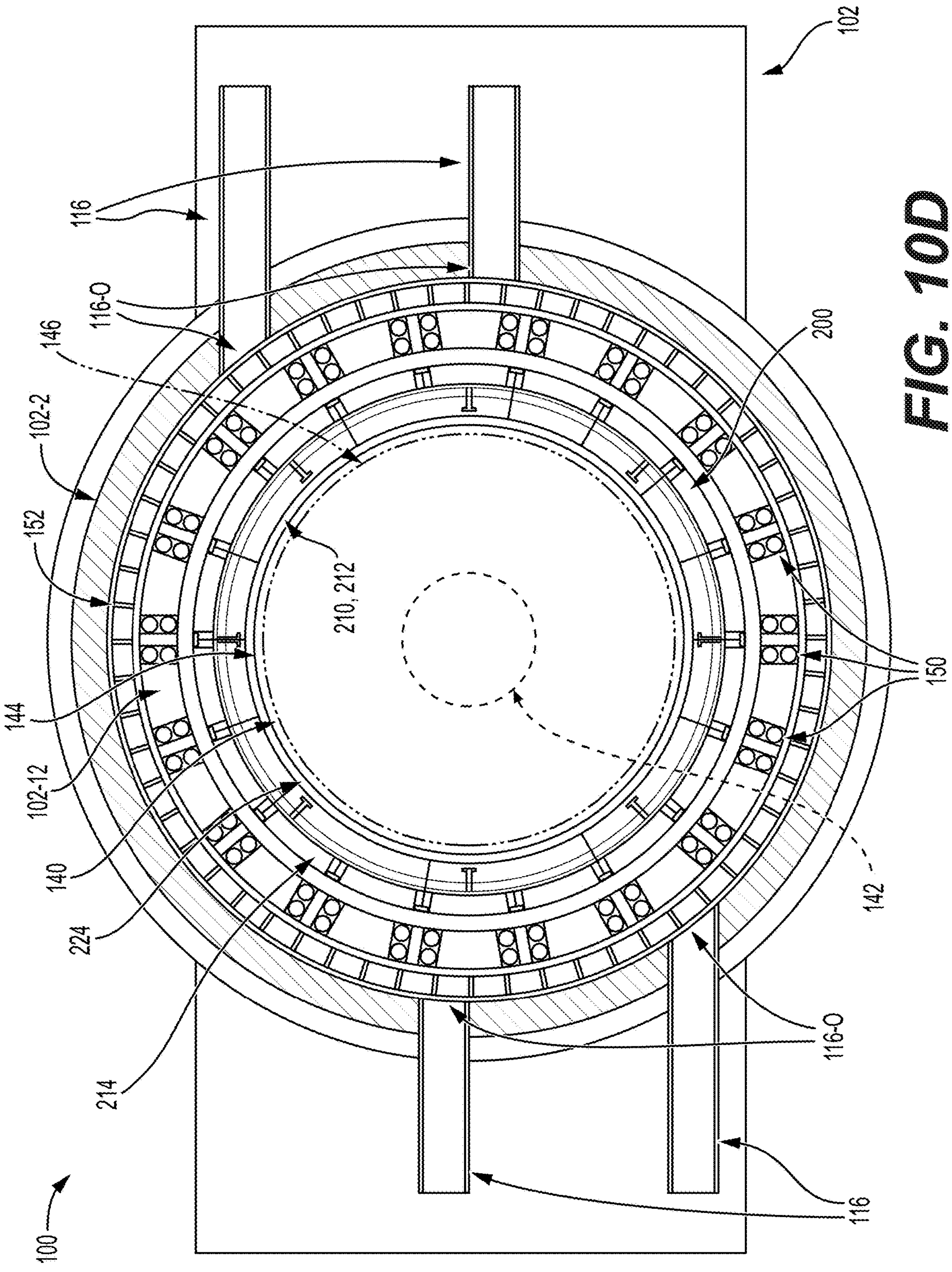
FIG. 10D is a cross-sectional top plan view of the reactor building of FIG. 10A along cross-sectional view line XD-XD' in FIG. 10B, according to some example embodiments.

FIG. 10A is a perspective view of a reactor building including the MIRSS assembly of FIG. 8A, according to some example embodiments. FIG. 10B is a cross-sectional elevation view of the reactor building of FIG. 10A along cross-sectional view line XB-XB' in FIG. 10A, according to some example embodiments. FIG. 10C is a cross-sectional top plan view of the reactor building of FIG. 10A along cross-sectional view line XC-XC' in FIG. 10B, according to some example embodiments. FIG. 10D is a cross-sectional top plan view of the reactor building of FIG. 10A along cross-sectional view line XD-XD' in FIG. 10B, according to some example embodiments.

Referring to FIGS. 7A to 7C, in some example embodiments, a MIRSS module 300 may be a MIRSS module 300-4 that may include structural members (e.g., beams, plates, etc.) 300, for example at least some of the upper structural members 312 of the MIRSS module 300-4, which define an exhaust duct structure 712 extending through the MIRSS module 300 between, and at least partially defining opposite inlet and outlet openings, 216-O1 and 216-O2, to define at least one exhaust duct 216 in the MIRSS module 300 (e.g., to define at least the one or more duct sidewalls of the exhaust duct 216). As a result, a MIRSS module 300 may be configured to include an exhaust duct 216 without any additional exhaust manifold structure 610 being coupled to the MIRSS module 300. For example, unlike some example embodiments of a MIRSS assembly 200, such as example embodiments shown in FIGS. 1A-2G, which may include MIRSS modules 300 and exhaust manifold structures 610 as separately-fabricated structures that are coupled together to establish the annular structure 230 and at least partially define the exhaust ducts 216 (e.g., to define at least the one or more duct sidewalls of the exhaust duct 216), in some example embodiments the MIRSS modules 300 may include structural members 302 that define exhaust duct structures 712 as a part of the integral structure of one or more fabricated MIRSS modules 300, where the exhaust duct structures 712 define at least the one or more duct sidewalls of separate, respective exhaust ducts 216 in the one or more MIRSS modules 300. As a result, in some example embodiments, MIRSS modules 300 such as shown in FIGS. 7A to 7C may be configured to define one or more exhaust ducts 216 without being coupled to a separately-fabricated exhaust manifold structure 610 and therefore may enable formation (e.g., construction) of a MIRSS assembly 200 that does not include any separately-fabricated exhaust manifold structures 610 that are coupled to the MIRSS modules 300 via insertion of exhaust duct structures 612 of the exhaust manifold structures 610 into the module interiors 308 of the MIRSS modules 300.

While FIGS. 7A-7C illustrate a MIRSS module 300 having structural members 302 defining an exhaust duct 216 having one or more duct sidewalls defined by an exhaust duct structure 712 extending between openings 216-O1 and 216-O2 in the MIRSS module 300, and FIGS. 3A-5D illustrate a MIRSS module 300 having structural members 302 defining openings 216-O1 and 216-O2 and configured to define an exhaust duct 216 based on a separate exhaust manifold structure 610 being coupled to the MIRSS module 300 such that an exhaust duct structure 612 extends through opening 216-O2 and extends at least to inlet opening 216-O1 to define one or more duct sidewalls of the exhaust duct 216, it will be understood that example embodiments of exhaust ducts 216 in a MIRSS module 300 and/or MIRSS assembly 200 are not limited thereto. For example, in some example embodiments, a MIRSS module 300 of FIGS. 3A-3F, FIG. 4A-4D, or the like may include structural members 302, such as upper structural members 312, which define at least bottom and side walls of an upper shielding chamber 316 within an interior of the upper modular structure 310 and further define openings 216-O1 and 216-O2 at opposite sides of the upper shielding chamber 316, and an upper shielding material 318 that may be inserted into the shielding chamber may include a pre-formed structure (e.g., a pre-formed high-density concrete structure) having an outer shape that corresponds (e.g., approximates, matches dimensions within a manufacturing tolerance and/or 10% margin, etc.) to the shape of the upper shielding chamber 316 and further includes one or more inner surfaces defining a cylindrical conduit extending through an interior of the pre-formed structure between opposite openings. The pre-formed structure may be inserted into the upper shielding chamber 316 so that the opposite openings of the pre-formed structure are aligned (e.g., cause to overlap) with separate, respective openings 216-O1 or 216-O2, such that the cylindrical space extending through the interior of the pre-formed structure between openings 216-O1 and 216-O2 completes the definition of the duct sidewalls of an exhaust duct 216 extending between openings 216-O1 and 216-O2 in the MIRSS module 300. As a result, in some example embodiments an exhaust duct 216 may be at least partially defined (e.g., have duct sidewalls define) by the upper shielding material 318 in the upper shielding chamber 316 instead of having duct sidewalls defined by structural members 302 or duct structures of a separate coupled exhaust manifold structure. The pre-formed structure could be inserted into the upper shielding chamber 316 prior to coupling of structural members 302 to the upper modular structure 310 to complete the top wall of the shielding chamber 316 enclosure. The pre-formed structure could be inserted into the upper shielding chamber 316 prior to or subsequent to the MIRSS modules 300 being coupled together to at least partially construct a MIRSS assembly 200, for example subsequently to the MIRSS assembly 200 being constructed and mounted on seismic isolators 150. It will also be understood that duct sidewalls of an exhaust duct 216 may be defined by a combination of structural members 302 of the MIRSS module and one or more surfaces of shielding material 318 in the upper shielding chamber 316.

In some example embodiments, a MIRSS module 300 includes one or more exhaust duct structures 712 defining one or more exhaust ducts 216 extending through the MIRSS module 300 between opposite outer surfaces thereof, where the MIRSS module 300-4 may comprise multiple azimuthally-offset portions 700-1, 700-2 that are separate azimuthal segments 300-A of the MIRSS module 300-4, and where an exhaust duct structure 712 may be present in one or more of the azimuthal portions 700-1, 700-2 of a single MIRSS module 300-4, may be present in one azimuthal portion 700-1 and not present in one or more other azimuthal portions 700-2 of the single MIRSS module 300, or may be absent from all azimuthal portions of the MIRSS module 300.

For example, as shown in FIGS. 7A to 7C, a MIRSS module 300 may be a MIRSS module 300-4 that may comprise multiple azimuthal portions 700-1, 700-2 defined by same, azimuthally offset arrangements of structural members 302 except for the upper structural members 312 including plates defining portions of the upper inner sidewall surface 354-U and the opposite convex outer MIRSS module surface 310-S. As shown, azimuthal portion 700-1 does not include any exhaust duct structure 712 extending between the opposite surfaces 354-U and 310-S and thus the plates defining such surfaces omit openings 216-O1 or 216-O2 in the azimuthal portion 700-1. As further shown, azimuthal portion 700-2 has a same arrangement of structures, defining the same or similar internal structure of internal upper and lower shielding chambers 316 and 326 except that azimuthal portion 700-2 includes an exhaust duct structure 712 and the upper structural members 312 defining surfaces 354-U and 310-S define respective openings 216-O1 and 216-O2 in the second azimuthal portion such that the exhaust duct structure 712 at least partially defines an exhaust duct 216 extending between the openings 216-O1 and 216-O2 in the azimuthal portion 700-2.

The structure of the MIRSS module 300-4 as shown in FIGS. 7A to 7C may enable ease of fabrication of different MIRSS modules 300 having different arrangements of exhaust ducts 216 without requiring separate exhaust manifold structures 610 to be coupled to (e.g., inserted into) the MIRSS modules 300. Such different arrangements may enable otherwise similarly structured MIRSS modules 300 to be fabricated to be coupled together to establish a MIRSS assembly 200 defining a particular arrangement of one or more exhaust ducts 216 to define various flow paths of hot working fluid 244 out of the collector cylinder 210 as described herein. As a result, the MIRSS module 300-4 structure may enable rapid fabrication of multiple MIRSS modules 300-4 that may be coupled together to establish a MIRSS assembly 200 that defines a particular arrangement of one or more flow paths of hot working fluid 244 out of the collector cylinder 210.

As shown in FIGS. 7A-7C and as further shown in FIGS. 8A-10D, an exhaust duct structure 712 may have a square cross section, such that the exhaust duct structure 712 may be considered to be a square duct and thus may define the exhaust duct 216 to have a square duct sidewall. But example embodiments are not limited thereto, and in some example embodiments an exhaust duct structure 712 may have a circular cross section, a polygon cross section that is different from a square (e.g., any polygon, including for example a nonagon, decagon, or the like), any non-circular cross section, or the like.

Referring to FIGS. 8A and 8B, in some example embodiments, a MIRSS assembly 200 may comprise multiple MIRSS modules 300 coupled together to establish a annular structure 230, where the coupled MIRSS modules 300 are the same as the MIRSS module 300-4 shown in FIGS. 7A to 7C except the various coupled MIRSS modules 300 include different arrangements and/or inclusions of one or more exhaust duct structures 712 to establish (e.g., define) a particular azimuthal (e.g., circumferential) arrangement of exhaust ducts 216 extending at least partially radially through the MIRSS assembly 200 that define a particular arrangement of flow paths of hot working fluid 244 out of the collector cylinder 210.

For example, as shown in at least FIG. 8A, the MIRSS assembly 200 may comprise at least MIRSS modules 300-41 and 300-42 coupled together to establish the annular structure 230, where the MIRSS modules 300-41 and 300-42 are distinguished by MIRSS module 300-41 including an exhaust duct structure 712 defining an exhaust duct 216 extending through an azimuthal portion of the MIRSS module 300-41 and another azimuthal portion that does not include any such exhaust duct 216, while MIRSS module 300-42 does not include any exhaust ducts 216 in any azimuthal portions thereof and thus does not include any exhaust duct structures 712 therein, and the structural members 302 defining the opposite surfaces 354-U and 310-S of the MIRSS module 300-42 do not define either of openings 216-O1 or 216-O2 in the MIRSS module 300-42. Such different MIRSS modules 300-41 and 300-42 can be fabricated rapidly at a common site (e.g., a same remote site), using common materials and tooling, due to the relative similarities in the structures of the azimuthal portions of the MIRSS modules 300-41 with the exception of the exhaust duct structures 712 and the openings 216-O1 and 216-O2 defined in the surfaces 354-U and 310-S of the MIRSS modules 300-4. As a result, the MIRSS modules 300-4 can be easily and efficiently fabricated and coupled together to construct a MIRSS assembly 200 that omits separate exhaust manifold structures.

As shown in FIGS. 8A-8B, in some example embodiments a flexible duct 620 may be coupled (e.g., coupled directly) with the outlet opening 216-O2 of a MIRSS assembly 200 and/or the MIRSS modules 300-4 thereof, to establish an interface between the seismically isolated exhaust portion 232 of the reactor cooling system 130, which is at least partially defined by the exhaust duct(s) 216 including exhaust duct structure(s) 712, and a seismically non-isolated exhaust portion 120 of the reactor cooling system 130. As a result, the MIRSS assembly 200 may have improved radial compactness and may be located in a smaller-diameter reactor building 102.

Referring to FIGS. 9A-9E and 10A-10D, the MIRSS assembly 200 shown therein may be the MIRSS assembly 200 shown in FIGS. 8A-8B. As shown in FIGS. 9A-9E and 10A-10D, a MIRSS assembly 200 that includes exhaust ducts 216 having exhaust duct structures 712 that are coupled (e.g., coupled directly) to respective flexible ducts 620 and the respective outlet openings 216-O2 thereof, may be located within a reactor building 102 that includes openings 102-2O that are open to separate, respective flexible ducts 620 to enable the flexible ducts 620 to be coupled, at respective openings 620-O thereof, to respective openings 126-O1 of respective seismically non-isolated exhaust conduits 126 to establish fluid communication between the seismically-isolated exhaust ducts 216 of the MIRSS assembly 200 with one or more seismically non-isolated exhaust systems 122 (e.g., one or more chimneys) which are open to the ambient environment and thus are configured to direct hot working fluid 244 received from the exhaust ducts 216 via the flexible ducts 620 to flow to the ambient environment 123.

The flexible duct 620, as shown in FIGS. 9A-10D and as further shown in FIGS. 1A-2G and 6A-6C, may include a bellows, flexible seal, expandable seal, or the like which is configured to flex (e.g., elastically flex) in response to movement of a coupled exhaust duct 216 (e.g., exhaust duct structure 712) of a MIRSS assembly 200 in relation to the seismically non-isolated exhaust conduit 126 without compromising the sealing of the flow path extending through the flexible duct 620 between the exhaust duct 216 (e.g., exhaust duct structure 712) and the seismically non-isolated exhaust conduit 126, thereby to maintain integrity of the reactor cooling system circulation path 236, and thus integrity of the reactor cooling system 130 of a nuclear plant 100, during movement of the seismically isolated assembly 190 with seismically isolated exhaust portion 232 independently of the reactor building 102 and seismically non-isolated exhaust portion 120.

Referring to FIGS. 9A-9E, in some example embodiments a MIRSS assembly 200 that includes coupled MIRSS modules 300 such as the MIRSS modules 300-4 shown in FIGS. 7A-7C and 8A-8B, may be configured to be mounted on seismic isolators 150 in a reactor building 102 that defines one or more seismically non-isolated intake conduits 116 that extend directly into the downcomer annulus 214 (e.g., the intake openings 116-O are directly open to the downcomer annulus 214) that is at least partially defined between the MIRSS assembly 200 and the lower building structure 102-1 (e.g., between the divider wall 222 and the inner containment pit surface 102-11S), such that the nuclear plant 100 is configured to direct a working fluid 240 to flow through the reactor cooling system 130 at least partially isolated from the seismic isolators 150. For example, as shown in FIGS. 9A-9E, one or more of the seismically non-isolated intake conduits 116 may extend to separate, respective intake openings 116-O that are directly open to the downcomer annulus 214 at a location in the downcomer annulus 214 that is between (e.g., vertically between) the bottom opening 214-B of the downcomer annulus 214 and the seismic isolators 150, such that cold working fluid 242 may flow from the intake openings 116-O downwards to the bottom opening 214-B of the downcomer annulus 214 without flowing in a heat transfer path (e.g., a convective heat transfer path, a conductive heat transfer path, a radiative heat transfer path, or any combination thereof) passing the seismic isolators 150. Restated, the seismic isolators 150 may be located "upstream" of the intake openings 116-O and thus may be external to the intake flow path of the cold working fluid 242 and may be external to the circulation path 236 via which working fluid 240 circulates through the reactor cooling system 130. The seismic isolators 150 may be exposed to the downcomer annulus 214 or may be physically isolated from the downcomer annulus 214 (e.g., by an annular barrier and/or seal structure). As a result, the MIRSS assembly 200 and/or the reactor building 102 may be configured to at least partially thermally isolate (e.g., thermally insulate) the seismic isolators 150 from the working fluid 240 (e.g., the cold working fluid 242) that is circulating through the circulation path 236 of the reactor cooling system 130 (e.g., thermally isolated from at least the cold working fluid directed toward the downcomer annulus), thereby reducing, minimizing, or preventing heat transfer from the seismic isolators 150 to the cold working fluid 242. Such an arrangement may be configured to mitigate (e.g., reduce, minimize, or prevent) excessive cooling of seismic isolators 150 by the working fluid 240 (e.g., the cold working fluid 242), for example in nuclear plants 100 located in relatively cold environments where the cold working fluid 242 may be at a relatively low temperature.

Referring to FIGS. 10A-10D, in some example embodiments a MIRSS assembly 200 that includes coupled MIRSS modules 300 such as the MIRSS modules 300-4 shown in FIGS. 7A-7C and 8A-8B, may be configured to be mounted on seismic isolators 150 in a reactor building 102 such that the MIRSS assembly 200, together with one or more structures of the lower building structure 102-1, at least partially define an intake flow channel, including for example an intake conduit 118, that is in fluid communication between the seismically non-isolated intake conduits 116 and the downcomer annulus 214. The MIRSS assembly 200 may thus be configured to direct cold working fluid 242 to flow in a heat transfer path passing one or more of the seismic isolators 150, thereby enabling cooling of the one or more seismic isolators to mitigate potential damage to the seismic isolators 150 due to thermal loads. The nuclear plant 100 may further include one or more heaters 154 that are configured to provide "local heating" of one or more of the seismic isolators 150 to mitigate or minimize potentially over-cooling of seismic isolators 150 by the cold working fluid 242, for example in example embodiments where the nuclear plant 100 is exposed to relatively cold environmental conditions such that the cold working fluid 242 is relatively cold for extended periods (e.g., below 0 degrees Fahrenheit). In some example embodiments, the one or more heaters 154 may be coupled to one or more seismic isolators 150 and configured to directly heat the one or more seismic isolators 150 via conduction; for example the one or more heaters 154 may comprise one or more electrical resistance heaters. In some example embodiments, the one or more heaters 154 may be configured to provide local heating of the seismic isolators 150 via radiative, conductive, or convective heating. For example, one or more heaters 154 may not be directly connected to one or more seismic isolators 150 and may be configured to heat the cold working fluid 242 prior to the cold working fluid 242 flowing in a heat transfer path passing one or more seismic isolators 150. For example, one or more heaters 154 may be located between the one or more seismic isolators 150 and an openings 116-O of one or more seismically non-isolated intake conduits 116 and thus may be "upstream" of the one or more seismic isolators 150 with regard to the working fluid 242 flow and may be configured to "pre-heat" the cold working fluid 242 prior to the cold working fluid 242 passing over one or more seismic isolators 150. In some example embodiments, one or more heaters 154 may include one or more space heaters, for example one or more electrical resistance heaters configured to heat the cold working fluid 242 passing across and/or through the one or more heaters 154 "upstream" of the one or more seismic isolators 150.

Figure 11:
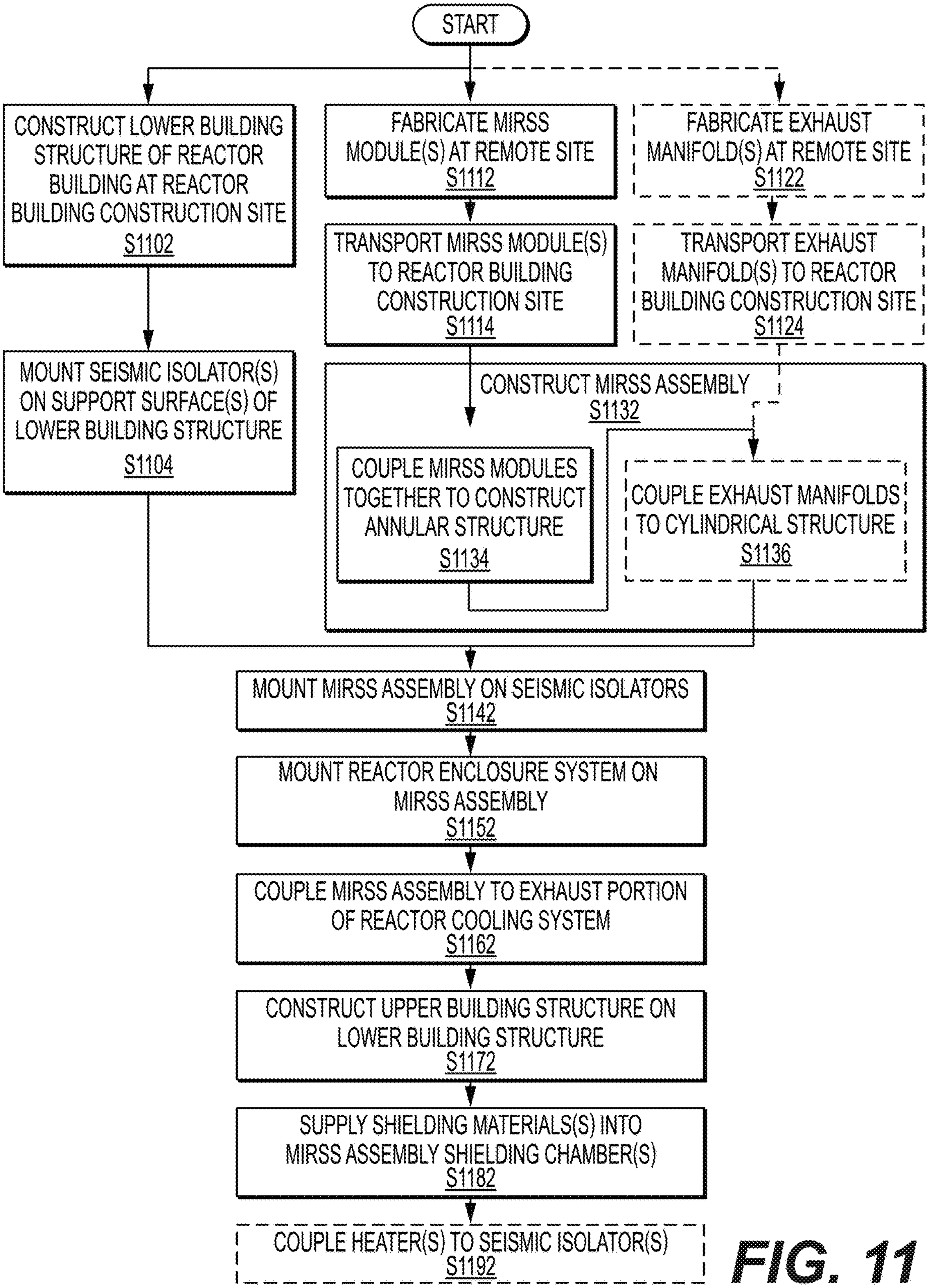
FIG. 11 is a flowchart that illustrates a method of constructing a nuclear plant, according to some example embodiments.

FIG. 11 is a flowchart that illustrates a method of constructing a nuclear plant, according to some example embodiments. The method shown in FIG. 11 may be performed with regard to any of the example embodiments of MIRSS assembly 200, MIRSS modules 300, reactor buildings 102, nuclear plants 100, any combination thereof, or the like as described herein, including any of the example embodiments shown in FIGS. 1A-10D.

At S1102, the method may include constructing, at a reactor building construction site at a nuclear plant 100, at least a lower building structure 102-1 of a reactor building 102 that is configured to structurally support and enclose a reactor enclosure system 140 that includes a nuclear reactor 142. The lower building structure 102-1 constructed at S1102 may include at least one structural support surface 102-12 configured to support a structural load of the reactor enclosure system 140 on a foundation 170. In some example embodiments, the construction at S1102 includes constructing a foundation 170 and further constructing the lower building structure 102-1 on the foundation 170. In some example embodiments, the lower building structure 102-1 includes the foundation 170 as an integral part of the lower building structure 102-1, such that constructing the lower building structure 102-1 includes constructing the foundation 170.

In some example embodiments, for example the example embodiments shown in FIGS. 1A-1H, the lower building structure 102-1 includes a containment pit 102-11, also referred to as a containment pit, that is configured to at least partially accommodate the reactor enclosure system 140 of the nuclear plant 100 within the reactor building 102. Accordingly, in some example embodiments, the method at S1102 may include constructing the containment pit 102-11. The lower building structure 102-1 may include one or more structural support surfaces 102-12 that are configured to support a structural load (e.g., the weight) of a seismically isolated assembly 190 that includes the reactor enclosure system 140 that is to be included in the reactor building 102 being constructed. Accordingly, the method at S1102 may include forming the one or more structural support surfaces 102-12 for example forming the one or more structural support surfaces 102-12 to at least partially surround a containment pit 102-11. In some example embodiments, the lower reactor structure 102-1 may include a concrete structure, a reinforced (e.g., steel-reinforced) concrete structure, or the like. Accordingly, the construction of the lower building structure 102-1 at S1102 may include pouring concrete into a mold, which may include or exclude a metal (e.g., steel) reinforcement structure herein, to form one or more portions of the lower building structure 102-1.

At S1104, the method may include mounting (e.g., coupling) a plurality of seismic isolators 150 on the at least one structural support surface 102-12. The plurality of seismic isolators 150 may be mounted on the at least one structural support surface 102-12 based on embedding one or more steel structures of the seismic isolators 150 in a concrete structure of the lower building structure 102-1. Accordingly, in some example embodiments, the mounting at S1104 may be performed concurrently with and/or as part of the constructing of the lower building structure at S1102. The seismic isolators 150 may include any known seismic isolators that may be configured to enable two-dimensional or three-dimensional translational and/or rotational movement of a structure that is supported by the seismic isolators 150 independently of the lower building structure 102-1. Seismic isolators 150 configured to enable three-dimensional (e.g., horizontal and/or vertical) translational and/or rotational movement of a structure that is supported by the seismic isolators 150 may be referred to herein as three-dimensional isolators, 3D isolators, or the like. The seismic isolators 150, including for example 3D isolators, may include one or more springs, laminated rubber bearings, or the like, and which are flexible and configured to enable flexible structural support of a support structure such that the supported structure is at least partially seismically isolated from the structure upon which the seismic isolators 150 are resting (e.g., are mounted).

At S1112, the method may include manufacturing (also referred to herein as "fabricating") one or more MIRSS modules 300 according to any of the example embodiments. The one or more MIRSS modules 300 may be fabricated at S1112 at a remote site that is separate from (e.g., remote from) the reactor building construction site at which the reactor building 102 is being constructed (e.g., external to the boundary of a nuclear plant 100 at which the reactor building construction site is located). For example, separate MIRSS modules 300 may be fabricated at multiple, separate remote sites that may be located in different cities, geographic regions, countries, or the like in relation to the location of the nuclear plant and thus the reactor building construction site. Each MIRSS module 300 may be constructed using various fabrication processes, using various types of feedstock material, including steel plate girders, plate steel, steel beams, I-beams, or the like to fabricate one or more MIRSS modules 300 according to any of the example embodiments. In some example embodiments, various MIRSS modules 300, including any of the MIRSS modules 300-1, 300-2, 300-3, and/or 300-4 may be independently fabricated using one or more fabrication jigs, using metal structural members, including for example steel beams that comprise the structural members 302 of the MIRSS modules 300 and thus of the MIRSS assembly 200 at least partially comprising such MIRSS modules 300 coupled together. At S1114, the MIRSS modules 300 may be transported, collectively or independently, from the fabrication location(s) to the reactor building construction site (e.g., on one or more flatbed trucks).

It will be understood that, in some example embodiments, one or more MIRSS modules 300 may be fabricated "on-site" (e.g., within the boundary of a nuclear plant at which the reactor building construction site is located), and thus the transporting at S1114 may be mitigated or omitted.

At S1132, a MIRSS assembly 200 is constructed based at least in upon, at S1134, coupling the MIRSS modules 300 together to collectively define a cylindrical reactor support structure 202 that is configured to structurally support a reactor enclosure system 140 on a plurality of seismic isolators 150 such that the MIRSS assembly 200 is configured to define a seismically isolated assembly within the nuclear plant 100 that includes the reactor enclosure system 140 and is seismically isolated from the reactor building 102, a collector cylinder 210 configured to at least partially receive the reactor enclosure system 140 (e.g., receive at least a guard vessel 144 of the reactor enclosure system 140) based on the reactor enclosure system 140 being structurally supported by the cylindrical reactor support structure 202, such that the collector cylinder 210 is configured to at least partially define a riser annulus 224 between an inner cylindrical surface 212 of the collector cylinder 210 and an outer sidewall surface 140-S of the reactor enclosure system 140 (e.g., an outer sidewall 144-S of the guard vessel 144, an outer sidewall surface of the primary vessel 146 in example embodiments where the reactor enclosure system 140 does not include any guard vessel, etc.), a divider wall 222 configured to at least partially define a downcomer annulus 214 between an outer cylindrical surface of the divider wall 222 and the reactor building 102, and to at least partially define a plurality of exhaust ducts 216 extending through an interior 204 of the cylindrical reactor support structure 202 from the collector cylinder 210 (e.g., to an outer sidewall surface 200-S of the MIRSS assembly 200 that is opposite to the inner cylindrical surface 212 of the collector cylinder 210).

In example embodiments where the MIRSS assembly 200 being constructed at S1132 includes one or more exhaust manifold structures 610 (also referred to herein interchangeably as exhaust manifolds), the method may include, at S1122, manufacturing (e.g., fabricating) such exhaust manifold structures 610 at one or more remote sites. Such exhaust manifold structures 610 may be fabricated at the same remote location as one or more MIRSS modules 300 are fabricated at S1112 or may be fabricated at one or more different remote locations from one or more remote locations at which one or more MIRSS modules 300 are fabricated at S1112. The method may further include, at S1124, transporting the one or more exhaust manifold structures to the reactor building construction site (e.g., on one or more flatbed trucks).

The method may further include, at S1132 and S1136, constructing the MIRSS assembly 200 based on coupling the one or more exhaust manifold structures 610 to one or more MIRSS modules 300 and/or to the annular structure 230 that is at least partially defined by the MIRSS modules 300 that are coupled together at S1134, so that the constructed MIRSS assembly 200 includes one or more exhaust manifold structures 610 according to some example embodiments. Such coupling at S1136 may include inserting one or more exhaust duct structures 612 of an exhaust manifold structure 610 into and at least partially through the cylindrical reactor support structure 202 (e.g., the interior 204), which may include inserting at least one exhaust duct structure 612 through an interior space of one or more upper modular structures 310 of one or more MIRSS modules 300 of the MIRSS assembly 200, such that an inlet opening 610-O1 defined by at least one exhaust duct structure 612 is in fluid communication with (e.g., directly open to) a top 210-U of the collector cylinder 210, such that the at least one exhaust duct structure 612 at least partially defines the at least one exhaust duct 216 (e.g., defines at least the duct sidewalls of the at least one exhaust duct 216). As a result of such coupling at S1136, at least one exhaust duct structure 612 of the exhaust manifold structure 610 may at least partially define the one or more exhaust ducts 216 (e.g., such that an inlet duct opening 610-O1 of the exhaust manifold structure 610 that is defined by the at least one exhaust duct structure 612 extends to and/or through a first opening 216-O1 defined by one or more MIRSS modules 300) to be configured to be in fluid communication with a top 224-U of the riser annulus 224 that is at least partially defined by a top 210-U of the collector cylinder 210 of the MIRSS assembly 200.

In some example embodiments, the coupling of one or more exhaust manifold structures 610 to one or more MIRSS modules 300 at S1136 may be performed subsequently to coupling the MIRSS modules 300 together to establish the annular structure 230 at S1134, but example embodiments are not limited thereto. For example, in some example embodiments one or more exhaust manifold structures 610 may be coupled to one or more MIRSS modules 300 prior to the MIRSS modules 300 being coupled together at S1134. In some example embodiments, the coupling at S1136 may be performed at a later time, for example after the MIRSS assembly 200 is mounted (e.g., installed) at the reactor building construction site as described further below.

In some example embodiments, the construction at S1132 may further include coupling a HAA seal 294 to the outer sidewall surface 200-S of the MIRSS assembly 200, coupling one or more flexible ducts 620 to separate, respective outlet openings 610-O2 and/or 216-O2 of the MIRSS assembly 200, coupling well seal 298 to an inner cylindrical surface 212 of the cylindrical reactor support structure 202 of the MIRSS assembly 200, or the like.

In some example embodiments, for example as shown in FIGS. 7A-10D, the MIRSS modules 300 may include exhaust duct structures 712 extending between the opposite openings 216-O1 and 216-O2 of the MIRSS modules 300 to at least partially define one or more exhaust ducts 216 of the MIRSS assembly 200, and the exhaust manifold structures 610 may be omitted from the MIRSS assembly 200, such that operations S1122, S1124, S1136 may be omitted.

At S1142, the method includes mounting the MIRSS assembly 200 on the seismic isolators 150 such that the MIRSS assembly 200 is structurally supported on the seismic isolators 150 (e.g., the seismic isolators 150 support the structural load of the MIRSS assembly 200 on the lower building structure 102-1 and further transfer the structural load of the MIRSS assembly 200 to the lower building structure 102-1. Such a mounting may include lifting (e.g., hoisting) and lowering the MIRSS assembly 200 as a single piece structure via a crane onto the seismic isolators 150 (e.g., via a single lift operation). As a result of the MIRSS assembly 200 being mounted on the seismic isolators 150, the MIRSS assembly 200 may define a seismically isolated assembly 190 within the nuclear plant 100 that is seismically isolated from the reactor building 102. In some example embodiments, the seismically isolated assembly 190 may include the MIRSS assembly 200 and the reactor enclosure system 140. In some example embodiments, the seismically isolated assembly 190 may be limited to the MIRSS assembly 200 and the reactor enclosure system 140, thereby reducing the structural load of the seismically isolated assembly 190 on the seismic isolators 150.

In some example embodiments, the mounting of the MIRSS assembly 200 on the seismic isolators 150 at S1142 includes lowering the MIRSS assembly 200 at least partially into a containment pit 102-11 of the lower building structure 102-1 such that the MIRSS assembly 200 is structurally supported on a plurality of seismic isolators 150 that extend in a circumferential pattern around the containment pit 102-11, to extend downwards at least partially into the containment pit 102-11 through the top opening 102-110 of the containment pit 102-11. The cylindrical reactor support structure 202 may be mounted directly on the seismic isolators 150 to structurally support a remainder of the MIRSS assembly 200 and the reactor enclosure system 140 on the seismic isolators 150. The MIRSS assembly 200 may, as a result, structurally support the reactor enclosure system 140 in the collector cylinder 210 to extend downwards at least partially within the containment pit 102-11.

At S1152, the method includes mounting at least a portion of the reactor enclosure system 140 on the MIRSS assembly 200, such that the MIRSS assembly 200 (e.g., the cylindrical reactor support structure 202 thereof) structurally supports at least the portion of the reactor enclosure system 140 on the plurality of seismic isolators 150, and the seismically isolated assembly 190 thus includes the reactor enclosure system 140. In some example embodiments, the reactor enclosure system 140 includes a nuclear reactor 142 within an interior (e.g., enclosure) of the reactor enclosure system 140 that is defined by the guard vessel 144, the primary vessel 146, and the head 148, concurrently with the reactor enclosure system 140 being mounted on the MIRSS assembly at S1152, but example embodiments are not limited thereto. In some example embodiments, a portion of the reactor enclosure system 140 (e.g., the guard vessel 144) may be mounted on the MIRSS 200 prior to the MIRSS assembly 200 being mounted on the seismic isolators 150 at S1142, and a remainder of the reactor enclosure system 140 (e.g., the primary vessel 146, the nuclear reactor 142, etc.) may be coupled to the mounted portion of the reactor enclosure system 140 at S1152, to complete construction of the reactor enclosure system 140, subsequent to the MIRSS assembly 200 being mounted on the seismic isolators 150 at S1142. It will be understood that mounting the reactor enclosure system 140 on the MIRSS assembly 200 results in the reactor enclosure system 140 transferring some or an entirety of the structural load (e.g., weight) of the reactor enclosure system 140 to the MIRSS assembly 200, such that the MIRSS assembly 200 (e.g., the cylindrical reactor support structure 202) structurally supports the reactor enclosure system 140 (e.g., structurally supports the reactor enclosure system 140 on a foundation 170 via the seismic isolators 150 that are mounted on the lower building structure 102-1). In some example embodiments, the mounting at S1152 may include hoisting the reactor enclosure system 140 (e.g., hoisting the entire reactor enclosure system 140 as a single unit) via a crane and lowering the reactor enclosure system 140 into the collector cylinder 210 defined by the annular structure 230 of the MIRSS assembly 200 until structural elements of the reactor enclosure system 140 contact and are structurally supported by the cylindrical reactor support structure 202 of the MIRSS assembly 200. In some example embodiments, the mounting at S1152 may be performed prior to mounting the MIRSS assembly 200 on the seismic isolators 150, such that the mounting at S1142 mounts the combined MIRSS assembly 200 and reactor enclosure system 140 structurally supported thereon on to the seismic isolators 150.

At S1162, the method includes coupling the MIRSS assembly 200 to the seismically non-isolated exhaust portion 120 of the reactor cooling system 130. Such coupling may include coupling the one or more exhaust ducts 216 of the MIRSS assembly 200 (e.g., the opening 216-O2 defined by one or more exhaust duct structures 712 extending through and or at least partially defining the one or more exhaust ducts 216, the opening 610-O2 of an exhaust manifold structure 610 coupled with the annular structure 230, etc.) with an opening 126-O1 of a seismically non-isolated exhaust conduit 126 of a seismically non-isolated exhaust portion 120 of the reactor cooling system 130 that is configured to direct the hot working fluid 244 to an ambient environment 123.

In some example embodiments, the MIRSS assembly 200 includes one or more exhaust manifold structures 610, and the coupling at S1162 may include coupling an outlet duct 614 of the one or more exhaust manifold structures 610 (e.g., outlet opening 610-O2) with a seismically non-isolated exhaust conduit 126 that is part of the seismically non-isolated exhaust portion 120 for the reactor cooling system 130 and is in fluid communication with an exhaust system 122 of the nuclear plant 100 (e.g., a chimney that is open to the ambient environment 123). In some example embodiments, such coupling at S1162 may include coupling the outlet duct 614 (e.g., the outlet opening 610-O2) with a flexible duct 620 and further coupling the flexible duct 620 (e.g., coupling an opening 620-O of the flexible duct 620) to the seismically non-isolated exhaust conduit 126 (e.g., to an opening 126-O1 of the seismically non-isolated exhaust conduit 126), such that the flexible duct 620 is coupled between the opening 610-O2 defined by the outlet duct 614 of the exhaust manifold structure 610 and the opening 126-O1 of the seismically non-isolated exhaust conduit 126 of the seismically non-isolated exhaust portion 120 to establish fluid communication between the seismically isolated exhaust portion 232 and the seismically non-isolated exhaust portion 120 of the reactor cooling system 130. In some example embodiments, the flexible duct 620 is coupled to opening 610-O2 of the outlet duct 614 as part of constructing the exhaust manifold structure 610 at S1122. In some example embodiments, where the exhaust manifold structure 610 is part of an exhaust manifold assembly 600 that is fabricated at S1122 and further includes the seismically non-isolated exhaust conduit 126 already coupled to the outlet duct 614 via a flexible duct 620 at S1122, the coupling at S1162 may include coupling the seismically non-isolated exhaust conduit 126 to a portion of the seismically non-isolated exhaust portion 120 of the reactor cooling system 130, including for example the exhaust system 122, to establish fluid communication from the exhaust manifold structure 610 to the exhaust system 122 and the ambient environment 123 to which the exhaust system 122 is open.

In some example embodiments, where the MIRSS assembly 200 omits exhaust manifold structures 610 (e.g., where the method omits S1122, S1124, and S1136), the coupling at S1162 may include coupling a flexible duct 620 to an outlet opening 216-O2 of an exhaust duct 216 (e.g., to an outlet opening 216-O2 of an exhaust duct 216 at least partially defined by an exhaust duct structure 712 shown in FIGS. 7A-7C) of at least one of the MIRSS modules 300 comprising the MIRSS assembly 200 and further coupling the flexible duct 620 to a seismically non-isolated exhaust conduit 126 to establish fluid communication between the exhaust duct 216 and the seismically non-isolated exhaust conduit 126.

At S1172, the method may include constructing an upper building structure 102-2 on the lower building structure 102-1, for example such that the upper building structure 102-2 is structurally supported on the lower building structure 102-1 independently of the seismically isolated assembly 190 and thus the seismically isolated assembly 190 is seismically isolated from both the lower and upper building structures 102-1 and 102-2.

The construction of the upper building structure 102-2 on the lower building structure 102-1 may establish an enclosure of the interior 108 of the reactor building 102 and to at least partially define the HAA 292 between one or more inner surfaces of the upper building structure 102-2 and the floor structure 290 of the seismically isolated assembly 190. As a result, the construction at S1172 may cause the seismically isolated assembly 190 to be seismically isolated from the lower building structure 102-1 and the upper building structure 102-2. The MIRSS assembly 200 may include a HAA seal 294 that a seal between the floor structure 290 and the upper building structure 102-2 that is constructed at S1172, thereby sealing (e.g., isolating) the HAA 292 from the intake conduit 118 located at least partially axially beneath the floor structure 290 of the MIRSS assembly 200. In some example embodiments, the MIRSS assembly 200 may include a well seal 298 that is a seal between the cylindrical reactor support structure 202 and the reactor enclosure system 140 (e.g., between the cylindrical reactor support structure 202 and the guard vessel 144), thereby at least partially defining a top 224-U of the riser annulus 224 and further thereby sealing (e.g., isolating) the HAA 292 from the riser annulus 224 located at least partially axially beneath the floor structure 290 of the MIRSS assembly 200.

At S1182, the method may include supplying one or more shielding materials 390 into one or more shielding chambers 296 of the mounted MIRSS assembly 200 (e.g., one or more shielding chambers 390 of one or more MIRSS modules 300 of the MIRSS assembly 200) to configure the MIRSS assembly 200 to provide shielding (e.g., radiation and/or thermal shielding) to structures, equipment, and/or passages that are external to the MIRSS assembly 200 from the reactor enclosure system 140, the riser annulus 224, or the like. In some example embodiments, the supplying at S1182 may be implemented via pouring one or more shielding materials 390 (via for example a boom crane) into one or more shielding chambers 296 of the MIRSS assembly 200, subsequent to the mounting at S1152. In some example embodiments, different shielding materials 390 may be supplied into different shielding chambers 296 to configure the MIRSS assembly 200 to provide different types and/or magnitudes of shielding to different areas. For example, supplying one or more shielding materials 390 at S1182 may include supplying a first lower shielding material 328-1 that includes thermal shielding (e.g., insulation) material into the inner lower shielding chamber 326-1 to provide a thermal expanding break between the riser annulus 224 and the downcomer annulus 214 and further supplying an upper shielding material 318 that includes a high density concrete radiation shielding material into the upper shielding chambers 316 of the upper modular structures 310 of the MIRSS modules 300 that collectively define the cylindrical reactor support structure 202, to provide radiation shielding of seismic isolators 150 that are radially external to the cylindrical reactor support structure 202. In some example embodiments, the supplying at S1182 may be performed as part of the constructing of the MIRSS assembly at S1132, prior to mounting the MIRSS assembly 200 on the seismic isolators 150 (e.g., prior to hoisting and lowering the MIRSS assembly 200 at least partially into the containment pit 102-110 to rest the MIRSS assembly 200 on the seismic isolators 150). In some example embodiments, the supplying at S1182 may be performed separately for each separate MIRSS modules 300 as part of fabricating the MIRSS modules at S1112, such that the MIRSS modules 300 that are transported at S1114 and coupled together at S1134, may already include one or more shielding materials 390 in one or more shielding chambers 392 thereof.

At S1192, the method may include coupling one or more heaters 154 (e.g., one or more electrical resistance heaters) to one or more of the seismic isolators 150 or to a portion of the reactor building 102 or MIRSS assembly 200 to configure the one or more heaters 154 to provide "local heating" of one or more seismic isolators 150.

While the fabricating at S1112 may include fabricating manufacture MIRSS module(s) 300 based on fabricating at least one upper modular structure 310 and one or more lower modular structures 320 stacked axially beneath and coupling such modular structures together to fabricate a MIRSS module 300, it will be understood that example embodiments are not limited thereto. For example, in some example embodiments, the fabricating at S1112 may include fabricating (e.g., constructing) a MIRSS module 300 as a single piece structure, instead of independently fabricating and coupling separate upper and/or lower modular structures 310 and/or 320.

While the method shown in FIG. 11 includes operations S1112, S1114, and S1134 to fabricate one or more MIRSS modules 300, transport the one or more MIRSS modules to the reactor building construction site, and couple the MIRSS modules together to establish (e.g., define) the annular structure of the MIRSS assembly 200, it will be understood that example embodiments are not limited thereto. For example, in some example embodiments, the MIRSS assembly 200 may be a non-modular Isolated Reactor Support System (IRSS) that is at least partially constructed as a single piece structure at S1132, instead of being constructed based on coupling multiple MIRSS modules 300 together, and therefore operations at S1112, S1114, and S1134 may be omitted. In some example embodiments, the MIRSS modules 300 may be omitted entirely, and the IRSS may be constructed "on-site," either on the lower building structure 102-1 (e.g., at least partially within the containment pit 102-11) or adjacent to the reactor building 102 construction site, or the like, as a single structure that is then mounted on the seismic isolators 150. As a result, in some example embodiments, in some example embodiments operations at S1112, S1114, and S1134 may be omitted from the method shown in FIG. 11.

In some example embodiments, the fabricating at S1112 may include fabricating separate upper modular structures 310 and lower modular structures 320 without coupling such modular structures together to form azimuthal segments 230-A of the annular structure 230, and the independently fabricated upper modular structures 310 and lower modular structures 320 may be transported at S1114 independently or together (without being coupled together) to the reactor building 102 construction site. In such example embodiments, the MIRSS assembly 200 may be constructed at S1132 based on, at S1134 axially stacking and coupling separate groups (e.g., rings) of lower modular structures 320 on top of each other (e.g., within the containment pit 102-1 or externally to the reactor building 102 construction site) and then coupling the upper modular structures 310 (e.g., individually or as a constructed cylindrical reactor support structure 202) on the coupled sets (e.g., rings) of lower modular structures 320 to at least construct the annular structure 230 and to at least partially construct the MIRSS assembly 200. The MIRSS assembly 200 so constructed may then be mounted on the seismic isolators at S1142.

In some example embodiments, the MIRSS assembly 200 may be constructed at S1142 on the lower building structure 102-1 (e.g., at least partially within the containment pit 102-11) based on coupling MIRSS modules 300 together or constructing the MIRSS assembly 200 as a single constructed structure. As a result, in some example embodiments, the mounting at S1142 may be partially or entirely omitted from the method shown in FIG. 11, as the MIRSS assembly 200 may be constructed "in place" on the seismic isolators 150 or adjacently above the locations at which the seismic isolators 150 are mounted such that the mounting at S1142 may simply involve lowering a MIRSS assembly 200 that is constructed at S1132 adjacently above the location at which the seismic isolators 150 are to be mounted (before or after the seismic isolators 150 are mounted at S1104), for example on hydraulic jacks which are lowered to mount the MIRSS assembly 200 on the seismic isolators at S1142.

According to some example embodiments, a nuclear plant according to any of the example embodiments may be operated to cause a nuclear reactor thereof to generate power (e.g., heat, electrical power, or the like). Such a nuclear plant may include a nuclear plant 100 as shown in FIGS. 1A-1H but may include a nuclear plant according to any of the example embodiments. Such a nuclear plant may include a nuclear plant constructed according to the method shown in FIG. 11. Such a nuclear plant may include a nuclear plant constructed according to any of the example embodiments. Accordingly, it will be understood that a method according to some example embodiments may include a method of operating a nuclear plant according to any of the example embodiments, where the method includes generating power (e.g., heat, electrical power, or the like) using a nuclear reactor of a nuclear plant according to any of the example embodiments, a nuclear plant constructed according to a method of any of the example embodiments, or the like.

While a number of example embodiments have been disclosed herein, it should be understood that other variations may be possible. Such variations are not to be regarded as a departure from the spirit and scope of the present inventive concepts, and all such modifications as would be obvious to one skilled in the art are intended to be included within the scope of the following claims. In addition, while processes have been disclosed herein, it should be understood that the described elements of the processes may be implemented in different orders, using different selections of elements, some combination thereof, etc. For example, some example embodiments of the disclosed processes may be implemented using fewer elements than that of the illustrated and described processes, and some example embodiments of the disclosed processes may be implemented using more elements than that of the illustrated and described processes.

The invention claimed is:

1. A nuclear plant, comprising:

a reactor building;

a plurality of seismic isolators coupled to the reactor building; and a seismically isolated assembly, the seismically isolated assembly seismically isolated from the reactor building, the seismically isolated assembly including, a reactor enclosure system including a nuclear reactor, and a reactor support assembly, the reactor support assembly including, a cylindrical reactor support structure that is configured to structurally support the reactor enclosure system on the plurality of seismic isolators, a collector cylinder configured to at least partially receive the reactor enclosure system based on the reactor enclosure system being structurally supported by the cylindrical reactor support structure, such that the collector cylinder is configured to at least partially define a riser annulus between an inner cylindrical surface of the collector cylinder and an outer sidewall surface of the reactor enclosure system, a divider wall configured to at least partially define a downcomer annulus between an outer cylindrical surface of the divider wall and the reactor building, wherein a bottom opening of the downcomer annulus is in fluid communication with a bottom opening of the riser annulus, and a plurality of exhaust ducts extending through an interior of the cylindrical reactor support structure from the collector cylinder, wherein, the reactor building is configured to structurally support the reactor enclosure system on a foundation and to enclose the reactor enclosure system within an interior of the reactor building, an upper surface of the reactor support assembly and an upper surface of the reactor enclosure system at least partially define a floor structure of a head access area (HAA) that is enclosed above the floor structure by an upper building structure of the reactor building, the floor structure configured to move independently of the upper building structure such that the floor structure is seismically isolated in relation to the upper building structure that encloses the HAA above the floor structure, and the reactor support assembly further includes an HAA seal configured to establish a seal between the floor structure and the upper building structure.

2. The nuclear plant of claim 1, wherein the reactor support assembly is configured to direct a working fluid to flow:

downwards through the downcomer annulus to the bottom opening of the downcomer annulus, from the bottom opening of the downcomer annulus to the bottom opening of the riser annulus, upwards through the riser annulus to a top of the riser annulus according to a change in air density based on the working fluid absorbing heat from both the reactor enclosure system and the collector cylinder, and through one or more exhaust ducts of the plurality of exhaust ducts, from the top of the riser annulus and through the interior of the reactor support assembly to be discharged from the seismically isolated assembly.

3. The nuclear plant of claim 2, wherein the reactor support assembly is configured to couple the one or more exhaust ducts with an opening of a seismically non-isolated exhaust portion of a reactor cooling system that is configured to direct the working fluid to an ambient environment.

4. The nuclear plant of claim 3, wherein the reactor support assembly includes a flexible duct that is coupled between the one or more exhaust ducts and the opening of the seismically non-isolated exhaust portion of the reactor cooling system, the flexible duct configured to establish fluid communication between a seismically isolated portion of the reactor cooling system and the seismically non-isolated exhaust portion of the reactor cooling system.

5. The nuclear plant of claim 4, wherein the reactor support assembly includes an exhaust manifold structure, the exhaust manifold structure at least partially defining the one or more exhaust ducts and an outlet duct coupled to the one or more exhaust ducts, the outlet duct configured to be coupled between the one or more exhaust ducts and the flexible duct.

6. The nuclear plant of claim 5, wherein the exhaust manifold structure at least partially defines at least two exhaust ducts coupled in parallel to the outlet duct.

7. The nuclear plant of claim 2, wherein the reactor support assembly includes a plurality of modules that are coupled together to collectively define the cylindrical reactor support structure, the collector cylinder, the divider wall, and the plurality of exhaust ducts.

8. The nuclear plant of claim 7, wherein each module of the plurality of modules defines a separate azimuthal segment of the cylindrical reactor support structure, a separate azimuthal segment of the collector cylinder, and a separate azimuthal segment of the divider wall.

9. The nuclear plant of claim 7, wherein the plurality of modules includes, a plurality of upper modular structures that collectively define the cylindrical reactor support structure, and a plurality of lower modular structures stacked axially under the plurality of upper modular structures such that the plurality of lower modular structures collectively define the divider wall, wherein the plurality of upper modular structures and the plurality of lower modular structures collectively define the collector cylinder.

10. The nuclear plant of claim 9, wherein, at least one upper modular structure of the plurality of upper modular structures at least partially defines the one or more exhaust ducts.

11. The nuclear plant of claim 1, wherein the reactor support assembly is configured to define at least one shielding chamber within an interior of the reactor support assembly and radially outward in relation to the collector cylinder, the at least one shielding chamber configured to hold at least one shielding material.

12. The nuclear plant of claim 2, wherein the reactor support assembly is configured to direct the working fluid to flow to the downcomer annulus via a heat transfer path passing at least one seismic isolator of the plurality of seismic isolators, such that the reactor support assembly is configured to cause the working fluid to remove heat from the at least one seismic isolator.

13. The nuclear plant of claim 12, further comprising:

a heater configured to heat the at least one seismic isolator.

14. The nuclear plant of claim 2, wherein the plurality of seismic isolators are at least partially thermally isolated from the working fluid directed into the downcomer annulus.

15. A reactor support assembly for a nuclear plant, the reactor support assembly-comprising:

a cylindrical reactor support structure that is configured to structurally support a reactor enclosure system on a plurality of seismic isolators, the reactor enclosure system including a nuclear reactor, the plurality of seismic isolators coupled to a reactor building of the nuclear plant, a collector cylinder configured to at least partially receive the reactor enclosure system based on the reactor enclosure system being structurally supported by the cylindrical reactor support structure, such that the collector cylinder is configured to at least partially define a riser annulus between an inner cylindrical surface of the collector cylinder and an outer sidewall surface of the reactor enclosure system, a divider wall configured to at least partially define a downcomer annulus between an outer cylindrical surface of the divider wall and the reactor building, wherein a bottom opening of the downcomer annulus is in fluid communication with a bottom opening of the riser annulus, and a plurality of exhaust ducts extending through an interior of the cylindrical reactor support structure from the collector cylinder, wherein, the reactor support assembly is configured to structurally support the reactor enclosure system on the plurality of seismic isolators such that an upper surface of the reactor support assembly and a top surface of the reactor enclosure system at least partially define a floor structure of a head access area (HAA) that is enclosed above the floor structure by an upper building structure of the reactor building, the floor structure configured to move independently of the upper building structure such that the floor structure is seismically isolated in relation to the upper building structure that encloses the HAA above the floor structure, and the reactor support assembly further includes an HAA seal configured to establish a seal between the floor structure and the upper building structure.

16. The reactor support assembly of claim 15, comprising a plurality of modules, wherein the plurality of modules are coupled together to collectively define the cylindrical reactor support structure, the collector cylinder, the divider wall, and the plurality of exhaust ducts.

17. The reactor support assembly of claim 15, wherein the reactor support assembly is configured to direct a working fluid to flow:

downwards through the downcomer annulus to the bottom opening of the downcomer annulus, from the bottom opening of the downcomer annulus to the bottom opening of the riser annulus, upwards through the riser annulus to a top of the riser annulus according to a change in working fluid density based on the working fluid absorbing heat from both the reactor enclosure system and the collector cylinder, and through one or more exhaust ducts of the plurality of exhaust ducts, from the top of the riser annulus and through the interior of the reactor support assembly to be discharged from the reactor support assembly.

18. The reactor support assembly of claim 17, wherein the reactor support assembly is configured to couple the one or more exhaust ducts with an opening of a seismically non-isolated exhaust portion of a reactor cooling system that is configured to direct the working fluid to an ambient environment.

19. The reactor support assembly of claim 18, wherein the reactor support assembly includes a flexible duct that is coupled between the one or more exhaust ducts and the opening of the seismically non-isolated exhaust portion of the reactor cooling system, the flexible duct configured to establish fluid communication between a seismically isolated portion of the reactor cooling system and the seismically non-isolated exhaust portion of the reactor cooling system.

20. The reactor support assembly of claim 19, wherein the reactor support assembly includes an exhaust manifold structure, the exhaust manifold structure at least partially defining the one or more exhaust ducts and an outlet duct coupled to the one or more exhaust ducts, the outlet duct configured to be coupled between the one or more exhaust ducts and the flexible duct.

21. The reactor support assembly of claim 20, wherein the exhaust manifold structure at least partially defines at least two exhaust ducts coupled in parallel to the outlet duct.

22. A method for constructing the nuclear plant of claim 1, the method comprising:

constructing a lower building structure of the reactor building, the lower building structure including at least one reactor building support surface configured to support a structural load of the reactor enclosure system on a foundation;

mounting the plurality of seismic isolators on the at least one reactor building support surface;

constructing the reactor support assembly;

mounting the reactor support assembly on the plurality of seismic isolators;

mounting the reactor enclosure system on the reactor support assembly, such that, the reactor support assembly structurally supports the reactor enclosure system on the plurality of seismic isolators, and the nuclear plant includes the seismically isolated assembly that includes the reactor enclosure system and the reactor support assembly, and the reactor building is configured to structurally support the reactor enclosure system on the foundation and to enclose the reactor enclosure system within an interior of the reactor building; and constructing the upper building structure of the reactor building on the lower building structure to complete the reactor building that is configured to structurally support the reactor enclosure system on the foundation and to enclose the reactor enclosure system within the reactor building, wherein the seismically isolated assembly is seismically isolated from the lower building structure and the upper building structure, such that, the upper surface of the reactor support assembly and the upper surface of the reactor enclosure system at least partially define the floor structure of the head access area (HAA) that is enclosed above the floor structure by the upper building structure, the floor structure configured to move independently of the upper building structure such that the floor structure is seismically isolated in relation to the upper building structure, and the HAA seal is configured to establish the seal between the floor structure and the upper building structure.

23. The method of claim 22, wherein, the lower building structure includes a containment pit that is configured to at least partially receive the reactor enclosure system, the at least one reactor building support surface at least partially surrounds the containment pit at a top opening of the containment pit, such that the plurality of seismic isolators are mounted on the at least one reactor building support surface to extend in a circumferential pattern at least partially around the top opening of the containment pit, and the mounting of the reactor support assembly on the plurality of seismic isolators includes lowering the reactor support assembly at least partially into the containment pit such that, the reactor support assembly is structurally supported on the plurality of seismic isolators to extend downwards at least partially into the containment pit through the top opening of the containment pit, and the reactor support assembly is configured to structurally support the reactor enclosure system in the collector cylinder to extend downwards at least partially within the containment pit.

24. The method of claim 22, wherein, the reactor support assembly is configured to define at least one shielding chamber within an interior of the reactor support assembly and radially outward in relation to the collector cylinder, the at least one shielding chamber configured to hold at least one shielding material.

25. The method of claim 22, wherein the constructing of the reactor support assembly includes coupling a plurality of modules together to collectively define the cylindrical reactor support structure, the collector cylinder, the divider wall, and the plurality of exhaust ducts.

26. The method of claim 25, wherein each module of the plurality of modules defines a separate azimuthal segment of the cylindrical reactor support structure, a separate azimuthal segment of the collector cylinder, and a separate azimuthal segment of the divider wall, such that the constructing of the reactor support assembly includes azimuthally coupling the plurality of modules together.

27. The method of claim 25, further comprising:

fabricating the plurality of modules at one or more remote locations and transporting the plurality of modules from the one or more remote locations to the lower building structure, prior to coupling the plurality of modules together.

28. The method of claim 22, further comprising coupling the plurality of exhaust ducts of the reactor support assembly with an opening of a seismically non-isolated exhaust portion of a reactor cooling system that is in fluid communication with an ambient environment.

29. The method of claim 28, wherein the coupling of the plurality of exhaust ducts with the seismically non-isolated exhaust portion includes coupling a flexible duct between one or more exhaust ducts of the plurality of exhaust ducts and the opening of the seismically non-isolated exhaust portion of the reactor cooling system, such that the flexible duct establishes fluid communication between a seismically isolated portion of the reactor cooling system and the seismically non-isolated exhaust portion.

30. The method of claim 29, further comprising:

coupling an exhaust manifold structure to the cylindrical reactor support structure such that at least a portion of the exhaust manifold structure extends through the cylindrical reactor support structure to the collector cylinder to at least partially define the one or more exhaust ducts; and coupling an outlet duct of the exhaust manifold structure to the flexible duct.

* * * * *